US012309544B2

(12) United States Patent
Kim et al.

(10) Patent No.: US 12,309,544 B2
(45) Date of Patent: May 20, 2025

(54) SOUND APPARATUS AND SOUND SYSTEM INCLUDING THE SAME

(71) Applicant: LG Display Co., Ltd., Seoul (KR)

(72) Inventors: Daeho Kim, Paju-si (KR); YuSeon Kho, Paju-si (KR); Kyungyeol Ryu, Paju-si (KR); YeongRak Choi, Paju-si (KR); KwanHo Park, Paju-si (KR); MinKyu Choi, Paju-si (KR); Jeongbeom Lee, Paju-si (KR); Inchan Jeong, Paju-si (KR); MinHo Sohn, Paju-si (KR); Seungo Jeon, Paju-si (KR); Kwangho Kim, Paju-si (KR); SeungRyull Park, Paju-si (KR); JunSeok Oh, Paju-si (KR); Chiwan Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 452 days.

(21) Appl. No.: 17/851,644

(22) Filed: Jun. 28, 2022

(65) Prior Publication Data

US 2023/0007387 A1 Jan. 5, 2023

(30) Foreign Application Priority Data

Jun. 30, 2021 (KR) ........................ 10-2021-0086154

(51) Int. Cl.
*H04R 1/26* (2006.01)
*H04R 1/02* (2006.01)
(Continued)

(52) U.S. Cl.
CPC ............... *H04R 1/26* (2013.01); *H04R 1/025* (2013.01); *H04R 1/028* (2013.01); *H04R 1/323* (2013.01);
(Continued)

(58) Field of Classification Search
CPC .......... H04R 1/26; H04R 1/025; H04R 1/028; H04R 1/323; H04R 3/12; H04R 17/00;
(Continued)

(56) References Cited

U.S. PATENT DOCUMENTS 5,237,418 A * 8/1993 Kaneko .................... H04R 5/04 348/565
8,611,186 B2 * 12/2013 Enamito ................. H04S 3/002 367/99
(Continued)

FOREIGN PATENT DOCUMENTS

CN 111385723 A 7/2020
EP 1110426 B1 * 2/2004 ............... H04R 1/24
(Continued)

OTHER PUBLICATIONS

Extended European Search Report of Application No. 22181969.1, dated Mar. 9, 2023, 16 pages.
(Continued)

*Primary Examiner* — Oyesola C Ojo
(74) *Attorney, Agent, or Firm* — Morgan, Lewis & Bockius LLP

(57) ABSTRACT

A sound apparatus may include a vibration member, a housing configured to cover a rear surface of the vibration member, and a vibration apparatus including one or more vibration devices configured to vibrate the vibration member. The vibration member may include a non-planar structure.

43 Claims, 24 Drawing Sheets

(51) Int. Cl.
*H04R 1/32* (2006.01)
*H04R 3/12* (2006.01)
*H04R 17/00* (2006.01)

(52) U.S. Cl.
CPC ............... *H04R 3/12* (2013.01); *H04R 17/00* (2013.01); *H04R 2201/025* (2013.01); *H04R 2499/15* (2013.01)

(58) Field of Classification Search
CPC .......... H04R 2201/025; H04R 2499/15; H04R 1/026; H04R 1/2873; H04R 2440/01; H04R 2440/05; H04R 7/04; H04R 7/045; H04R 1/345; H04R 7/02; H04R 2217/03; H04R 2307/00; H04S 7/303
See application file for complete search history.

(56) References Cited

U.S. PATENT DOCUMENTS

| | | | | |
|---|---|---|---|---|
| 10,514,564 | B2* | 12/2019 | Kawasaki | H04N 5/642 |
| 12,085,995 | B2* | 9/2024 | Magi | G06F 1/1616 |
| 2012/0243719 | A1* | 9/2012 | Franklin | H04R 1/02 381/333 |
| 2015/0015513 | A1* | 1/2015 | Kwak | G06F 3/04886 345/173 |
| 2015/0029166 | A1* | 1/2015 | Park | G06F 1/1641 345/184 |
| 2015/0187262 | A1* | 7/2015 | Eom | G09G 3/3275 345/77 |
| 2016/0021454 | A1* | 1/2016 | Liang | H04R 1/403 381/333 |
| 2017/0280234 | A1* | 9/2017 | Choi | H04R 1/025 |
| 2017/0280243 | A1* | 9/2017 | Choi | H04R 1/028 |
| 2018/0307277 | A1* | 10/2018 | Yanagisawa | G06F 1/1624 |
| 2019/0196247 | A1* | 6/2019 | Shin | H04R 7/045 |
| 2019/0208299 | A1* | 7/2019 | Kim | H04R 1/028 |
| 2019/0208300 | A1* | 7/2019 | Lee | H04R 1/028 |
| 2020/0007967 | A1* | 1/2020 | Kim | H04R 1/028 |
| 2020/0014999 | A1* | 1/2020 | Ham | H04R 9/066 |
| 2020/0092650 | A1* | 3/2020 | Ham | H04R 5/02 |
| 2020/0097086 | A1* | 3/2020 | Bushnell | H10N 30/20 |
| 2020/0097244 | A1* | 3/2020 | Kim | H04R 1/24 |
| 2020/0162804 | A1* | 5/2020 | Lee | H04R 1/028 |
| 2020/0186916 | A1* | 6/2020 | Ham | H04R 1/2834 |
| 2020/0213764 | A1 | 7/2020 | Lee et al. | |
| 2020/0213768 | A1* | 7/2020 | Lee | H04R 17/00 |
| 2020/0295676 | A1* | 9/2020 | Ezawa | H10N 30/2047 |
| 2021/0141587 | A1* | 5/2021 | Cho | G02F 1/133305 |
| 2021/0176352 | A1* | 6/2021 | Chen | G08B 6/00 |
| 2024/0163614 | A1* | 5/2024 | Tabata | H04R 9/025 |

FOREIGN PATENT DOCUMENTS

| | | | | |
|---|---|---|---|---|
| EP | 2008546 | A1 | 12/2008 | |
| JP | 60230797 | A * | 11/1985 | H04R 1/02 |
| JP | S60-230797 | A | 11/1985 | |
| JP | S62-167498 | U | 10/1987 | |
| JP | 2002-524994 | A | 8/2002 | |
| JP | 2006-165923 | A | 6/2006 | |
| JP | 2007-082009 | A | 3/2007 | |
| JP | 2013-9127 | A | 1/2013 | |
| JP | 2013-51650 | A | 3/2013 | |
| JP | 2013-243550 | A | 12/2013 | |
| JP | 2021-76838 | A | 5/2021 | |
| TW | 201739267 | A * | 11/2017 | G06F 3/017 |
| WO | 00/15000 | A1 | 3/2000 | |
| WO | 01/74115 | A2 | 10/2021 | |

OTHER PUBLICATIONS

Taiwan Office Action for Application No. 111124371, dated Jul. 11, 2023, 17 pages.
Japan Office Action for Application No. 2022-102566, dated Jul. 6, 2023, 5 pages.
Partial European Search Report of Application No. 22181969.1, dated Nov. 21, 2022, 15 pages.
Anonymous: "Loudspeaker—Wikipedia", Mar. 26, 2021, pp. 1-33, XP055979231, Retrieved from the Internet: URL: https://en.wikipedia.org/wiki/Loudspeaker.
Office Action dated Jan. 9, 2024 for Japanese Patent Application No. 2022-102566 Note: US 2020/0213768 A1, JP 2013-243550 A, JP 2002-524994 A & JP 2007-082009 A were cited in a prior IDS.

* cited by examiner

SOUND APPARATUS AND SOUND SYSTEM INCLUDING THE SAME

CROSS-REFERENCE TO RELATED APPLICATION

This application claims the benefit of and priority to the Korean Patent Application No. 10-2021-0086154 filed on Jun. 30, 2021, the entirety of which is incorporated herein by reference for all purposes.

BACKGROUND

1. Technical Field

The present disclosure relates to an apparatus and a system and particularly to, for example, without limitation, a sound apparatus and a sound system including the same, and more particularly, to a sound apparatus and a sound system including the same which may prevent or minimize a reduction in sound characteristic caused by a reflected wave.

2. Discussion of the Related Art

Recently, the demand for sound bars or sound apparatuses outputting a sound through one or more speakers is increasing.

However, sound bars have a problem where a sound quality characteristic and/or a sound pressure level characteristic are/is reduced due to a sound interference between a plurality of speakers.

The description provided in the discussion of the related art section should not be assumed to be prior art merely because it is mentioned in or associated with that section. The discussion of the related art section may include information that describes one or more aspects of the subject technology.

SUMMARY

The inventors of the present disclosure have recognized the problems described above, have performed various experiments for preventing or minimizing a sound interference between a plurality of speakers, and have additionally performed various experiments for implementing a sound apparatus for outputting a stereo sound through sound separation for each channel or pitched sound band. In addition, the inventors have performed various experiments for implementing a sound apparatus that may prevent or minimize a reduction in sound characteristic caused by a reflected wave. The inventors have thus invented a new sound apparatus and a sound system including the same that may prevent or minimize a sound interference between a plurality of speakers, have invented a new sound apparatus and a sound system including the same that may output a stereo sound through sound separation for each channel or pitched sound band, and have invented a new sound apparatus and a sound system including the same that may prevent or minimize a reduction in sound characteristic caused by a reflected wave.

Accordingly, embodiments of the present disclosure are directed to providing a sound apparatus and a sound system including the same that substantially obviate one or more problems due to limitations and disadvantages of the related art.

One or more aspects of the present disclosure are directed to providing a sound apparatus and a sound system including the same that may prevent or minimize a reduction in sound characteristic caused by a reflected wave.

One or more aspects of the present disclosure are directed to providing a sound apparatus and a sound system including the same that may prevent or minimize a sound interference between a plurality of speakers.

One or more aspects of the present disclosure are directed to providing a sound apparatus and a sound system including the same that may output a stereo sound through sound separation for each channel or pitched sound band.

The objects of the present disclosure are not limited to the aforesaid, but other objects not described herein will be clearly understood by those skilled in the art from the descriptions herein.

Additional features and aspects of the present disclosure are set forth in part in the description that follows and in part will become apparent from the description or may be learned by practice of the inventive concepts provided herein. Other features and aspects of the inventive concepts may be realized and attained by the structures pointed out in the present disclosure, or derivable therefrom, and the claims hereof as well as the appended drawings.

To achieve these and other aspects of the present disclosure, as embodied and broadly described herein, in one or more aspects, a sound apparatus may include a vibration member, a housing configured to cover a rear surface of the vibration member, and a vibration apparatus including one or more vibration devices configured to vibrate the vibration member. The vibration member may include a non-planar structure.

In one or more aspects of the present disclosure, a sound apparatus may include a housing including an accommodation space, a vibration member configured to cover the accommodation space of the housing, the vibration member including first to $n^{th}$ (where n is a natural number of 3 or more) regions, and a vibration apparatus including one or more first to $n^{th}$ vibration devices configured to vibrate the first to $n^{th}$ regions of the vibration member. The housing may include a space separation portion separating the accommodation space into first to $n^{th}$ spaces respectively corresponding to the first to $n^{th}$ regions.

In one or more aspects of the present disclosure, a sound system may include a display apparatus configured to display an image, one or more first speaker apparatuses rotatably disposed near a first side of the display apparatus, each of the one or more first speaker apparatuses including a sound output apparatus, and one or more second speaker apparatuses rotatably disposed near a second side of the display apparatus, each of the one or more second speaker apparatuses including a sound output apparatus. The display apparatus may include a display panel and a display driving circuit configured to display different images at first and second regions of the display panel and configured to provide a screen division mode signal to each of the one or more first speaker apparatuses and the one or more second speaker apparatuses. The one or more first speaker apparatuses may rotate the sound output apparatus toward a first listener near the first region of the display panel in response to the screen division mode signal. The one or more second speaker apparatuses may rotate the sound output apparatus toward a second listener near the second region of the display panel in response to the screen division mode signal.

One or more example embodiments of the present disclosure may provide a sound apparatus and a sound system including the same for preventing or minimizing a reduction in sound characteristic caused by a reflected wave.

One or more example embodiments of the present disclosure may provide a sound apparatus and a sound system including the same for preventing or minimizing a sound interference between a plurality of speakers.

One or more example embodiments of the present disclosure may provide a sound apparatus and a sound system including the same for outputting a stereo sound through sound separation for each channel or pitched sound band.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

Figure 1:
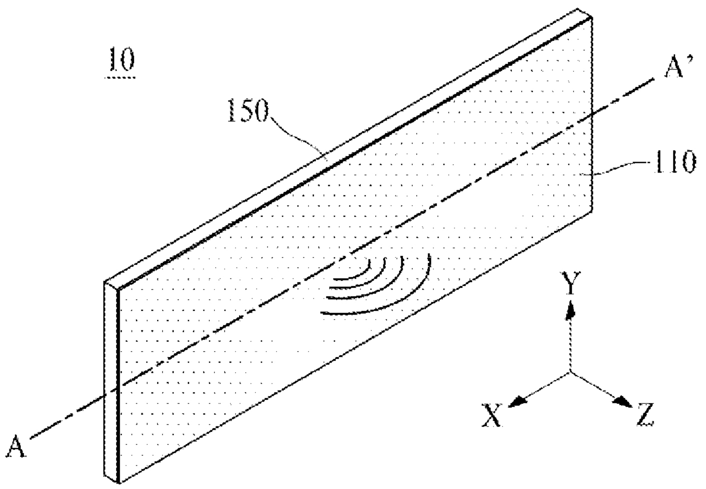
FIG. 1 is a perspective view illustrating a sound apparatus according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals refer to like elements throughout unless stated otherwise. Names of the respective elements used in the following explanations are selected only for convenience of writing the specification and may be thus different from those used in actual products.

Advantages and features of the present disclosure, and implementation methods thereof, will be clarified through following embodiments described with reference to the accompanying drawings. The present disclosure may, however, be embodied in different forms and should not be construed as limited to the embodiments set forth herein. Rather, these embodiments are provided so that this disclosure is thorough and complete and fully conveys the scope of the present disclosure to those skilled in the art. Furthermore, the present disclosure is only defined by claims and their equivalents.

The shapes, sizes, areas, ratios, angles, numbers, and the like disclosed in the drawings for describing embodiments of the present disclosure are merely examples, and thus, the present disclosure is not limited to the illustrated details. When the term "comprise," "have," "include," "contain," "constitute," "make up of," "formed of," or the like is used, one or more other elements may be added unless a term such as "only" or the like is used. The terms of a singular form may include plural forms unless the context clearly indicates otherwise. The word "exemplary" is used to mean serving as an example or illustration. Any implementation described herein as an "example" is not necessarily to be construed as preferred or advantageous over other implementations.

In construing an element, the element is construed as including an error or tolerance range even where no explicit description of such an error or tolerance range is provided.

Where positional relationships are described, for example, where the positional relationship between two parts is described using "on," "over," "under," "above," "below," "beneath," "near," "close to," or "adjacent to," "beside," "next to," or the like, one or more other parts may be located between the two parts unless a more limiting term, such as "immediate(ly)," "direct(ly)," or "close(ly)," is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," "before," "prior to," or the like, a case that is not continuous may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure.

In describing elements of the present disclosure, the terms "first," "second," "A," "B," "(a)," "(b)," or the like may be used. These terms are intended to identify the corresponding elements from the other elements, and the basis, order, or number of the corresponding elements should not be limited by these terms.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of some or all items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

In one or more aspects, the terms "between" and "among" may be used interchangeably simply for convenience. For example, an expression "between a plurality of elements" may be understood as between a plurality of elements or among a plurality of elements. For example, an expression "among a plurality of elements" may be understood as between a plurality of elements or among a plurality of elements. In one or more examples, the number of elements may be two. In one or more examples, the number of elements may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship.

Unless otherwise defined, the terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein. For example, the term "part" may apply, for example, to a separate circuit or structure, an integrated circuit, a computational block of a circuit device, or any structure configured to perform a described function as should be understood by one of ordinary skill in the art.

Hereinafter, a sound apparatus and a sound system including the same according to example embodiments of the present disclosure are described in detail with reference to the accompanying drawings. In adding reference numerals to elements of each of the drawings, although the same elements may be illustrated in other drawings, like reference numerals may refer to like elements unless stated otherwise. In addition, for convenience of description, a scale, size and thickness of each of the elements illustrated in the accompanying drawings may differ from an actual scale, size and thickness, and thus, embodiments of the present disclosure are not limited to a scale, size and thickness illustrated in the drawings. In one or more aspects, all the components of each apparatus according to various embodiments of the present disclosure are operatively coupled and configured.

Figure 2:
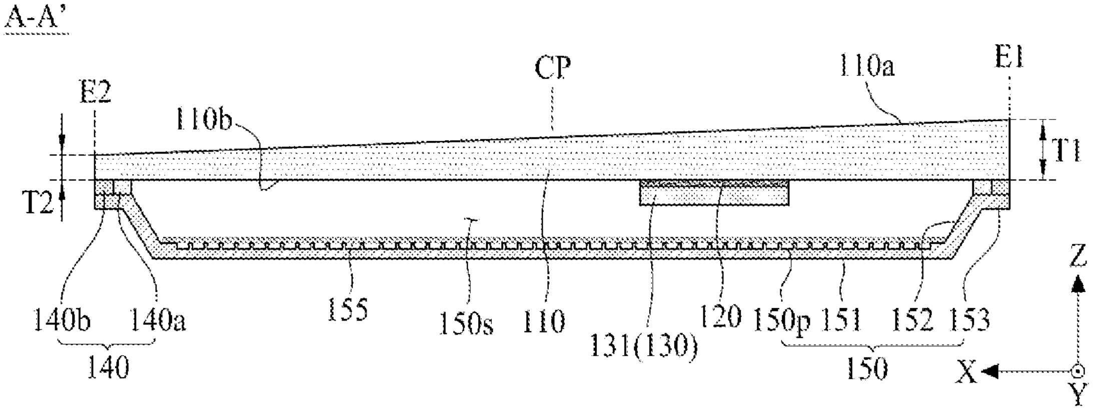
FIG. 2 is an example of a cross-sectional view taken along line A-A' illustrated in FIG. 1.
Figure 3:
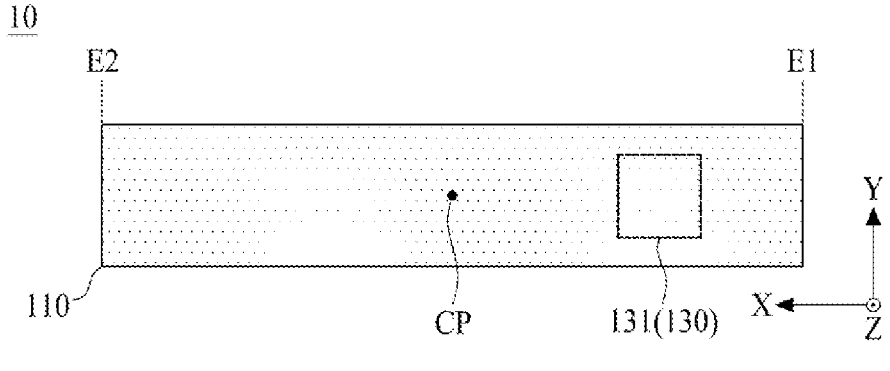
FIG. 3 is an example of a plan view illustrating an arrangement structure of a vibration device illustrated in FIG. 2.

FIG. 1 is a perspective view illustrating a sound apparatus 10 according to an example embodiment of the present disclosure. FIG. 2 is an example of a cross-sectional view taken along line A-A' illustrated in FIG. 1. FIG. 3 is an example of a plan view illustrating an arrangement structure of a vibration device illustrated in FIG. 2.

With reference to FIGS. 1 to 3, the sound apparatus 10 according to an example embodiment of the present disclosure may include a vibration member 110 and a vibration apparatus 130.

The vibration member 110 may output a sound according to a vibration of the vibration apparatus 130. For example, the vibration member 110 may be referred to as a vibration object, a vibration target, a vibration plate, a vibration panel, a sound vibration plate, a sound output member, or a sound output member, or the like, but embodiments of the present disclosure are not limited thereto. For example, the vibration member 110 may include any one among a display panel including pixels configured to display an image, a screen panel on which an image is to be projected from a display apparatus, a lighting panel, a signage panel, glass, or a mirror, but embodiments of the present disclosure are not limited thereto.

The vibration member 110 may be configured to be transparent, translucent, or opaque. The vibration member 110 according to an example embodiment of the present disclosure may include a metal material and/or a nonmetal material (or a composite nonmetal material) having a material characteristic suitable for outputting a sound based on a vibration. The metal material of the vibration member 110 according to an example embodiment of the present disclosure may include any one or more materials of stainless steel, aluminum (Al), an Al alloy, magnesium (Mg), a Mg alloy, and a magnesium-lithium (Mg—Li) alloy, but embodiments of the present disclosure are not limited thereto. The nonmetal material (or the composite nonmetal material) of the vibration member 110 may include one or more of glass, plastic, fiber, leather, wood, cloth, rubber, and paper, but embodiments of the present disclosure are not limited thereto.

The vibration member 110 according to an example embodiment of the present disclosure may implement a signage panel such as an analog signage or the like such as an advertising signboard, a poster, or a noticeboard, or the like. For example, in a case where the vibration member 110 implements the signage panel, the analog signage may include signage content such as a sentence, a picture, and a sign, or the like. The signage content may be disposed at the vibration member 110 to be visible. For example, the signage content may be directly attached on one or more of a first surface (or a front surface) 110*a* of the vibration member 110 and a second surface (or a rear surface) 110*b* different from (or opposite to) the first surface 110*a*. For example, the signage content may be printed on a medium such as paper or the like, and the medium with the signage content printed thereon may be directly attached on one or more of the first surface 110*a* and the second surface 110*b* of the vibration member 110. For example, when the signage content is attached on the second surface 110*b* of the vibration member 110, the vibration member 110 may be configured to be a transparent material.

The vibration member 110 according to an example embodiment of the present disclosure may include a plate structure having a tetragonal shape. The vibration member 110 may have a horizontal length (or a widthwise length) parallel to a first direction X and a vertical length (or a lengthwise length) parallel to a second direction Y intersecting with the first direction X. For example, the vibration member 110 may have a rectangular shape where a horizontal length is relatively longer than a vertical length. However, the present disclosure is not limited thereto, and the vibration member 110 may have a square shape where a horizontal length is the same as a vertical length.

The vibration member 110 according to an example embodiment of the present disclosure may be configured to have a plurality of natural vibration frequencies (or a natural frequency). The vibration member 110 may include a non-planar structure, and thus, may have a plurality of natural vibration frequencies. The vibration member 110 may have a plurality of natural vibration frequencies which differ for each region (or area). For example, the vibration member 110 may have a plurality of natural vibration frequencies which differ based on a thickness of each region (or area).

The vibration member 110 according to an example embodiment of the present disclosure may include a first surface 110*a* and a second surface 110*b*, and one or more of the first surface 110*a* and the second surface 110*b* may include a non-planar structure.

According to an example embodiment of the present disclosure, in the vibration member 110, the first surface 110*a* may include a non-planar structure, and the second surface 110*b* may include a planar structure. For example, the first surface 110*a* of the vibration member 110 may include a slope surface. For example, the first surface 110*a* of the vibration member 110 may be inclined with respect to the second surface 110*b*. According to an example embodiment of the present disclosure, in the vibration member 110, the first surface 110*a* may include a planar structure, and the second surface 110*b* may include a non-planar structure. For example, the second surface 110*b* of the vibration member 110 may include a slope surface. For example, the second surface 110*b* of the vibration member 110 may include a slope surface which is inclined with respect to the first surface 110*a*.

According to an example embodiment of the present disclosure, in the vibration member 110, a thickness T1 of a first edge portion E1 may differ from a thickness T2 of a second edge portion E2 which is parallel or opposite to the first edge portion E1. For example, the thickness T1 of the first edge portion E1 may be greater than the thickness T2 of the second edge portion E2. For example, the thickness T1 of the vibration member 110 may decrease progressively in a direction from the first edge portion E1 to the second edge portion E2. For example, in the vibration member 110, the first edge portion E1 may be a first end, one side, one end, or a first short side, and the second edge portion E2 may be a second end, the other side, the other end, or a second short side.

The vibration apparatus 130 may be configured to autonomously vibrate (or displace or drive) based on an electrical signal (or a voice signal) applied thereto, or may be configured to vibrate (or displace or drive) a vibration member (or a vibration plate or a vibration object) 110. For example, the vibration apparatus 130 may be referred to as a vibration structure, a vibrator, a vibration generating apparatus, a vibration generating device, a vibration generator, a sounder, a sound device, a sound generating device, or a sound generator, or the like, but embodiments of the present disclosure are not limited thereto.

The vibration apparatus 130 according to an example embodiment of the present disclosure may include a piezoelectric material (or an electroactive material) having a piezoelectric characteristic. The vibration apparatus 130 may vibrate (or displace or drive) the vibration member 110 based on a vibration (or a displacement) of a piezoelectric material generated by an electrical signal (or a voice signal) applied thereto. For example, the vibration apparatus 130 may vibrate (or displace or drive) as contraction and expansion are alternately repeated by a piezoelectric effect (or a piezoelectric characteristic). For example, the vibration apparatus 130 may vibrate (or displace or drive) in a vertical direction (or a thickness direction) Z as contraction and expansion are alternately repeated by an inverse piezoelectric effect.

The vibration apparatus 130 according to an example embodiment of the present disclosure may include one or more vibration devices 131 having a piezoelectric type.

The one or more vibration devices 131 according to an example embodiment of the present disclosure may be configured to have flexibility. For example, the one or more vibration devices 131 may be configured to be bent in a non-planar shape including a curved surface. For example, the one or more vibration devices 131 according to an example embodiment of the present disclosure may be referred to as a piezoelectric-type vibration structure, a piezoelectric-type vibrator, a piezoelectric-type vibration generating device, a piezoelectric-type vibration generator, a piezoelectric-type sounder, a piezoelectric-type sound device, a piezoelectric-type sound generating device, a piezoelectric-type sound generator, a piezoelectric-type actuator, a piezoelectric-type exciter, or a piezoelectric-type transducer, or the like, but embodiments of the present disclosure are not limited thereto.

The one or more vibration devices 131 according to an example embodiment of the present disclosure may include a tetragonal shape which has a first length parallel to the first direction X and a second length parallel to the second direction Y intersecting with the first direction X. For example, the one or more vibration devices 131 may include a square shape where the first length is the same as the second length. However, embodiments of the present disclosure are not limited thereto, and the one or more vibration devices 131 may include a rectangular shape where one of the first length and the second length is greater than the other length, a non-tetragonal shape, a circular shape, or an oval shape.

The vibration apparatus 130 according to an example embodiment of the present disclosure may be connected or coupled to a second surface 110*b* of the vibration member 110 by an adhesive member 120.

The adhesive member 120 may be disposed between the vibration member 110 and the vibration apparatus 130. For example, the adhesive member 120 may be disposed between the vibration member 110 and one or more vibration devices 131. For example, the adhesive member 120 may connect or couple the one or more vibration devices 131 to the second surface 110*b* of the vibration member 110.

The adhesive member 120 according to an example embodiment of the present disclosure may include an adhesive layer (or a tacky layer) which is good in adhesive force or attaching force. For example, the adhesive member 120 may include a double-sided adhesive tape, a double-sided foam pad, or a tacky sheet. For example, when the adhesive member 120 includes a tacky sheet (or a tacky layer), the adhesive member 120 may include only an adhesive layer or a tacky layer without a base member such as a plastic material or the like.

The adhesive layer (or a tacky layer) of the adhesive member 120 according to an example embodiment of the present disclosure may include epoxy, acrylic, silicone, or urethane, but embodiments of the present disclosure are limited thereto.

The adhesive layer (or a tacky layer) of the adhesive member 120 according to another example embodiment of the present disclosure may include a pressure sensitive adhesive (PSA), an optically clear adhesive (OCA), or an optically clear resin (OCR), but embodiments of the present disclosure are limited thereto.

The sound apparatus 10 according to an example embodiment of the present disclosure may further include a housing 150 and a connection member 140.

The housing 150 may be disposed at a rear surface of the vibration member 110 to cover the second surface 110*b* of the vibration member 110 and the one or more vibration devices 131. The housing 150 may include an accommodation space 150*s* for accommodating the vibration apparatus 130 and may have a box shape where one side is opened.

The housing 150 according to an example embodiment of the present disclosure may include one or more of a metal material and a nonmetal material (or a composite nonmetal material), but embodiments of the present disclosure are not limited thereto. For example, the housing 150 may include one or more materials of a metal material, plastic, and wood, but embodiments of the present disclosure are not limited thereto. For example, the housing 150 may be referred to as the term such as a case, an outer case, a case member, a housing member, a cabinet, an enclosure, a sealing member, a sealing cap, a sealing box, or a sound box, or the like, but embodiments of the present disclosure are not limited thereto. For example, the accommodation space 150*s* of the housing 150 may be referred to as the term such as a gap space, an air gap, a vibration space, a sound space, a sound box, or a sealing space, but embodiments of the present disclosure are not limited thereto.

The housing 150 according to an example embodiment of the present disclosure may maintain an impedance component based on air which acts on the vibration member 110 when the vibration member 110 vibrates. For example, air near the vibration member 110 may resist a vibration of the vibration member 110 and may act as an impedance component having a reactance component and a different resistance based on a frequency. Therefore, the housing 150 may configure the closed space, which surrounds the vibration apparatus 130, and thus, may maintain an impedance component (or an air impedance or an acoustic impedance) which acts on the vibration member 110 due to air, thereby enhancing a sound characteristic and/or a sound pressure level characteristic of a low-pitched sound band generated based on the vibration of the vibration member 110 and enhancing the quality of a sound of a high-pitched sound band generated based on the vibration of the vibration member 110.

The housing 150 according to an example embodiment of the present disclosure may include a floor portion 151 and a lateral portion 152.

The floor portion 151 may be disposed at the rear surface of the vibration member 110 to cover the second surface 110*b* of the vibration member 110 and the vibration apparatus 130. For example, the floor portion 151 may be disposed to be spaced apart from the second surface 110*b* of the vibration member 110 and the vibration apparatus 130. For example, the floor portion 151 may be referred to as the term such as a housing plate or a housing floor portion, or the like, but embodiments of the present disclosure are not limited thereto.

The lateral portion 12 may be connected to a periphery portion of the floor portion 151. For example, the lateral portion 152 may be bent from the periphery portion of the floor portion 151 in a third direction Z parallel to a thickness direction of the vibration member 11. For example, the lateral portion 152 may be parallel to the third direction Z, or may be inclined from the third direction Z. For example, the lateral portion 152 may include first to fourth lateral portions. For example, the lateral portion 152 may be referred to as a housing lateral surface or a housing sidewall, or the like, but embodiments of the present disclosure are not limited thereto.

The lateral portion 152 may be integrated into the floor portion 151. For example, the floor portion 151 and the lateral portion 152 may be integrated as one body, and thus, the accommodation space 150*s* surrounded by the lateral portion 152 may be provided on the floor portion 151. Accordingly, the floor portion 151 and the lateral portion 152 may have a box shape where one side is opened.

The lateral portion 152 may be connected or coupled to the second surface 110*b* of the vibration member 110 by the connection member 140. For example, the lateral portion 152 may be connected or coupled to a periphery portion of the second surface 110*b* of the vibration member 110 by the connection member 140.

The housing 150 according to an example embodiment of the present disclosure may further include a pattern portion 150*p*.

The pattern portion 150*p* may be configured at a floor surface (or a bottom surface) of the floor portion 151, and thus, may increase the stiffness of the housing 150. For example, the pattern portion 150*p* may include a concave-convex structure which is configured at the floor surface of the floor portion 151. For example, the pattern portion 150*p* may be referred to as the term such as a concave-convex pattern portion, a floor pattern portion, or a reinforcement pattern portion, or the like, but embodiments of the present disclosure are not limited thereto.

The pattern portion 150*p* according to an example embodiment of the present disclosure may include a plurality of groove lines. The plurality of groove lines may be formed to be concave from a top surface (or a surface) of the floor portion 151 to have a predetermine interval in one or more directions of the first direction X, the second direction Y, and a diagonal direction between the first direction X and the second direction Y. For example, the pattern portion 150*p* may include a lattice pattern based on intersection between each of a plurality of groove lines parallel to the first direction X and each of a plurality of groove lines parallel to the second direction Y.

The housing 150 according to an example embodiment of the present disclosure may further include a connection frame portion 153.

The connection frame portion 153 may be connected to the lateral portion 152. For example, the connection frame portion 153 may be disposed in parallel with the floor portion 151 and may be connected to the lateral portion 152. The connection frame portion 153 may be bent from an end of the lateral portion 152 so as to be parallel to the first direction X and may extend to have a certain length along the first direction X. The connection frame portion 153 may include an opening portion corresponding to the accommodation space 150*s* provided on the floor portion 151 by the lateral portion 152. The lateral portion 152 may be connected to be vertical or inclined between the floor portion 151 and the connection frame portion 153. The floor portion 151, the lateral portion 152, and the connection frame portion 153 may be integrated (or provided) as one body, and thus, the floor portion 151, the lateral portion 152, and the connection frame portion 153 may have a box shape where one side is opened. For example, the connection frame portion 153 may be referred to as the term such as a housing connection portion, a housing eaves portion, or a housing skirt portion, or the like, but embodiments of the present disclosure are not limited thereto.

According to an example embodiment of the present disclosure, when the housing 150 includes the connection frame portion 153, the connection member 140 may be disposed between the connection frame portion 153 of the housing 150 and the second surface 110*b* of the vibration member 110. For example, the connection member 140 may connect or couple the periphery portion of the second surface 110*b* of the vibration member 110 to the connection frame portion 153.

According to an example embodiment of the present disclosure, the connection member 140 which is disposed between the housing 150 and the vibration member 110 may be configured to minimize or prevent the transfer of a vibration of the vibration member 110 to the housing 150. The connection member 140 may include a material characteristic suitable for blocking a vibration. For example, the connection member 140 may include a material having elasticity. For example, the connection member 140 may include a material having elasticity for vibration absorption (or impact absorption). The connection member 140 according to an example embodiment of the present disclosure may be configured as polyurethane materials or polyolefin materials, but embodiments of the present disclosure are not limited thereto. For example, the connection member 140 according to an example embodiment of the present disclosure may include one or more of an adhesive, a double-sided tape, a double-sided foam tape, and a double-sided cushion tape, but embodiments of the present disclosure are not limited thereto.

The connection member 140 according to an example embodiment of the present disclosure may have a thickness for minimizing or preventing the transfer of a vibration of the vibration member 110 to the housing 150. For example, the connection member 140 may be configured to have a thickness which is relatively thicker than the vibration member 110. The connection member 140 may absorb a vibration of the vibration member 110 based on a thickness and elasticity, thereby minimizing or preventing the transfer of a vibration of the vibration member 110 to the housing 150. In addition, the connection member 140 may prevent a physical contact (or friction) between the vibration member 110 and the housing 150, and thus, may prevent the occurrence of noise (or a noise sound) caused by the physical contact (or friction) between the vibration member 110 and the housing 150. For example, the connection member 140 may be referred to as a buffer member, an elastic member, a damping member, a vibration absorption member, or a vibration blocking member, or the like, but embodiments of the present disclosure are not limited thereto.

The one or more vibration devices 131 according to an example embodiment of the present disclosure may vibrate based on a vibration driving signal (or a sound signal) provided from a sound processing circuit to vibrate the vibration member 110, thereby generating or outputting a sound. In a sound generated based on a vibration of the vibration member 110, a sound pressure level characteristic may increase based on a vibration, having various natural vibration frequencies, of the vibration member 110, and a reproduction pitched sound band may be extended. For example, when the vibration member 110 having a non-planar structure vibrates, a sound of a high-pitched sound band may be generated or output in a relatively thick region, and a sound of a low-pitched sound band may be generated or output in a relatively thin region.

The one or more vibration devices 131 according to an example embodiment of the present disclosure may be connected or coupled to a non-center portion except for a center portion CP of the vibration member 110. For example, a center portion CP of each of the one or more vibration devices 131 may be disposed between the edge portions E1 and E2 and the center portion CP of the vibration member 110.

According to an example embodiment of the present disclosure, a sound wave (or a sound vibration) generated by a vibration of the vibration member 110 based on a vibration of each of the one or more vibration devices 131 may spread and travel radially from the vibration apparatus 130. The sound wave may be referred to as a progressive wave. The progressive wave may be reflected from the connection member 140, and thus, may generate a reflected wave which travels along a direction opposite to the progressive wave. The reflected wave may overlap and interfere with the progressive wave and may generate a standing wave where an overlapping sound wave does not travel and stays at a certain position. Due to the standing wave, a sound pressure level may decrease, and thus, a sound characteristic may be reduced. In order to reduce the standing wave, the one or more vibration devices 131 according to an example embodiment of the present disclosure may be connected or coupled to the non-center portion except for the center portion CP of the vibration member 110. Therefore, the vibration device 131 may be connected to the non-center portion except for the center portion CP of the vibration member 110 and the vibration member 110 may have a natural vibration frequency which differs for each region (or area) based on a non-planar structure, and thus, the overlap and interference of a reflected wave of each frequency region may be prevented or minimized, thereby decreasing a standing wave of each frequency region to enhance a sound characteristic.

The one or more vibration devices 131 according to an example embodiment of the present disclosure may be disposed between the first edge portion E1 and the center portion CP of the vibration member 110. For example, the one or more vibration devices 131 may be connected to a relatively thick region at a non-center portion of the vibration member 110, and thus, a sound generated based on a vibration of the vibration member 110 may have a high sound pressure level characteristic in the high-pitched sound band. For example, the sound apparatus 10 including the one or more vibration devices 131 disposed between the first edge portion E1 and the center portion CP of the vibration member 110 may decrease an adverse effect caused by a divisional vibration of the vibration member 110 and may enhance a sound characteristic and/or a sound pressure level characteristic of the high-pitched sound band.

According to another example embodiment of the present disclosure, the one or more vibration devices 131 may be disposed between the second edge portion E2 and the center portion CP of the vibration member 110. For example, the one or more vibration devices 131 may be connected to a relatively thin region at the non-center portion of the vibration member 110, and thus, a sound generated based on a vibration of the vibration member 110 may have a high sound pressure level characteristic in the low-pitched sound band. For example, the sound apparatus 10 including the one or more vibration devices 131 disposed between the second edge portion E2 and the center portion CP of the vibration member 110 may decrease an adverse effect caused by a divisional vibration of the vibration member 110 and may enhance a sound characteristic and/or a sound pressure level characteristic of the low-pitched sound band.

The connection member 140 according to another example embodiment of the present disclosure may be configured to minimize or prevent the transfer of a vibration of the vibration member 110 to the housing 150 and to decrease the reflection of a sound wave which is generated and input based on a vibration of the vibration member 110.

The connection member 140 according to another example embodiment of the present disclosure may include a first connection member 140*a* and a second connection member 140*b*.

The first connection member 140*a* may be disposed between the vibration member 110 and the housing 150 so as to be surrounded by the second connection member 140*b*. For example, the first connection member 140*a* may be disposed inward (or an inner portion) from the second connection member 140*b*. The first connection member 140*a* may be configured to have hardness which is lower (or smaller) than that of the second connection member 140*b*. For example, the first connection member 140*a* may include a double-sided polyurethane tape, a double-sided polyurethane foam tape, or a double-sided sponge tape, or the like, but embodiments of the present disclosure are not limited thereto.

The second connection member 140*b* may be disposed between the vibration member 110 and the housing 150 to surround the first connection member 140*a*. For example, the second connection member 140*b* may be disposed outward (or an outer portion) from the first connection member 140*a*. The second connection member 140*b* may be configured to have hardness which is greater than that of the first connection member 140*a*. For example, the second connection member 140*b* may include a double-sided polyolefin tape, a double-sided polyolefin foam tape, a double-sided acrylic tape, or a double-sided acrylic foam tape, or the like, but embodiments of the present disclosure are not limited thereto.

The connection member 140 according to another example embodiment of the present disclosure may absorb a sound which is generated and input based on a vibration of the vibration member 110 by the first connection member 140*a* which is relatively soft and is disposed inward from the second connection member 140*b* which is relatively stiff (or hard), and thus, a reflected sound (or a reflected wave) generated by the connection member 140 may be minimized. Accordingly, each of a highest sound pressure level and a lowest sound pressure level generated in a reproduction frequency band of a sound generated based on a vibration of the vibration apparatus 130 may be reduced, and thus, flatness of a sound pressure level may be reduced.

In the connection member 140 according to another example embodiment of the present disclosure, the second connection member 140*b* which is relatively stiff may be disposed inward from the first connection member 140*a* which is relatively soft. In this case, a sound pressure level in a specific pitched sound band of a sound may be reduced. For example, a sound pressure level in a pitched sound band of 2 kHz to 5 kHz and 7 kHz to 12 kHz may be reduced due to a reflected sound (or a reflected wave) generated by the relatively stiff second connection member 140*b*. Accordingly, when a reduction in a sound pressure level in a pitched sound band of 2 kHz to 5 kHz and 7 kHz to 12 kHz is needed based on a shape and a size of the vibration member 110, the relatively stiff second connection member 140*b* may be disposed inward from the relatively soft first connection member 140*a*, and flatness of a sound pressure level may be improved based on a reduction in a sound pressure level in a pitched sound band of 2 kHz to 5 kHz and 7 kHz to 12 kHz generated by the second connection member 140*b*.

Additionally, the sound apparatus 10 according to an example embodiment of the present disclosure may further include a sound absorption member 155.

The sound absorption member 155 may be disposed between the housing 150 and the vibration apparatus 130. The sound absorption member may be disposed in the accommodation space 150*s* of the housing 150 to cover the rear surface of the vibration apparatus 130.

The sound absorption member 155 according to an example embodiment of the present disclosure may be disposed or attached on the floor portion 151 of the housing 150. For example, the sound absorption member 155 may be disposed or attached on the floor surface of the floor portion 151 of the housing 150. For example, the sound absorption member 155 may be disposed to cover the pattern portion 150*p* configured at the floor portion 151 of the housing 150. For example, the sound absorption member 155 may include a nonwoven or a foam pad, but embodiments of the present disclosure are not limited thereto.

The sound absorption member 155 according to an example embodiment of the present disclosure may attenuate a frequency resonance of a low-pitched sound band occurring in a space between the vibration member 110 and the housing 150 or the accommodation space 150*s* of the housing 150, and thus, may minimize a booming phenomenon caused by interference between frequencies of the low-pitched sound band to enhance sound quality. In addition, when the vibration member 110 vibrates (or is vibrating), the sound absorption member 155 may prevent a direct contact between the vibration apparatus 130 and the floor portion 151 of the housing 150, thereby preventing the damage or breakdown of the vibration apparatus 130.

Figure 4:
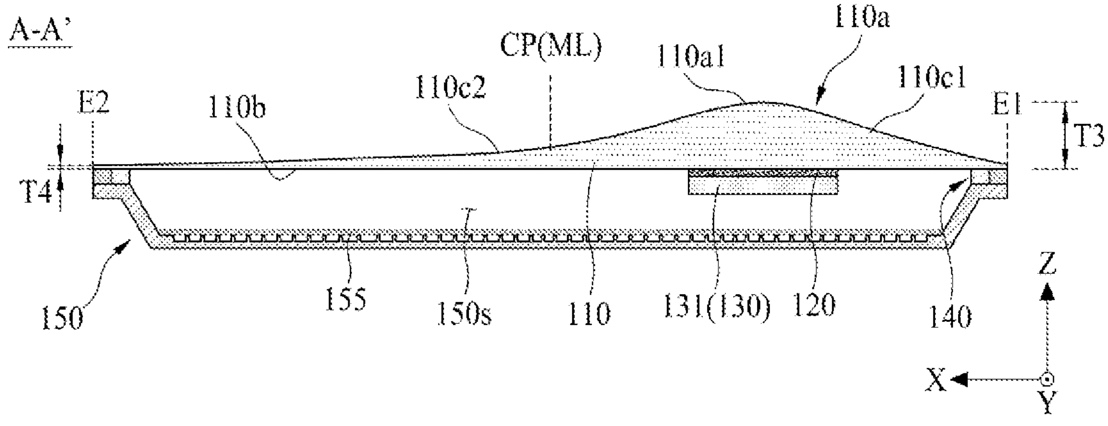
FIG. 4 is an example of another cross-sectional view taken along line A-A' illustrated in FIG. 1.

FIG. 4 is an example of another cross-sectional view taken along line A-A' illustrated in FIG. 1. FIG. 4 illustrates a sound apparatus according to another example embodiment of the present disclosure. FIG. 4 illustrates an example embodiment implemented by modifying a structure of the vibration member illustrated in FIG. 2. In the following description, therefore, their repetitive descriptions of the elements except the vibration member and relevant elements may be omitted.

With reference to FIGS. 1 and 4, the vibration member 110 according to another example embodiment of the present disclosure may include a first surface 110*a* and a second surface 110*b*, and one or more of the first surface 110*a* and the second surface 110*b* may include a non-planar structure. For example, the first surface 110*a* of the vibration member 110 may include a non-planar structure, and the second surface 110*b* of the vibration member 110 may include a planar structure.

The first surface 110*a* of the vibration member 110 according to another example embodiment of the present disclosure may include a curved structure including one or more convex portions 110*a*1.

The first surface 110*a* of the vibration member 110 may include a convex portion 110*a*1, a first curved portion 110*c*1 between the convex portion 110*a*1 and a first edge portion E1, and a second curved portion 110*c*2 between the convex portion 110*a*1 and a second edge portion E2.

The convex portion 110*a*1 may be configured between the first edge portion E1 and a center portion CP of the vibration member 110, but embodiments of the present disclosure are not limited thereto and may be configured between the second edge portion E2 and the center portion CP of the vibration member 110.

The first curved portion 110*c*1 and the second curved portion 110*c*2 may be configured to include different curvatures (or a curvature radius). For example, each of the first curved portion 110*c*1 and the second curved portion 110*c*2 may be configured to include one or more curvatures (or a curvature radius).

The vibration member 110 may have a thickness T3 which is thickest in the convex portion 110*a*1 and may have a thickness T4 which is thinnest in the first edge portion E1 or the second edge portion E2. For example, the vibration member 110 may have the thickness T4 which is thinnest in the second edge portion E2.

The vibration member 110 according to another example embodiment of the present disclosure may have a plurality of natural vibration frequencies based on the curved structure including the convex portion 110*a*1 configured at the first surface 110*a*. The vibration member 110 may have a plurality of natural vibration frequencies which differ for each region (or area). For example, the vibration member 110 may have a plurality of natural vibration frequencies which differ based on a thickness of each region (or area).

The vibration apparatus 130 according to another example embodiment of the present disclosure may include one or more vibration devices 131 for vibrating the convex portion 110*a*1 of the vibration member 110.

The one or more vibration devices 131 may be connected or coupled to the second surface 110*b* of the vibration member 110 corresponding to the convex portion 110*a*1 of the vibration member 110.

The one or more vibration devices 131 may vibrate the vibration member 110 in a region corresponding to the convex portion 110*a*1, and thus, may generate or output a sound based on a vibration of the vibration member 110. In a sound generated based on a vibration of the vibration member 110, a sound pressure level characteristic may increase based on a vibration, having various natural vibration frequencies, of the vibration member 110, and a reproduction pitched sound band may extend. For example, when the vibration member 110 having a non-planar structure vibrates, a sound of the high-pitched sound band may be generated or output in a relatively thick region, and a sound of the low-pitched sound band may be generated or output in a relatively thin region.

The one or more vibration devices 131 according to another example embodiment of the present disclosure may be connected or coupled to a non-center portion except for the center portion CP of the vibration member 110 to correspond to the convex portion 110*a*1 of the vibration member 110. For example, a center portion of each of the one or more vibration devices 131 may be disposed or aligned at a top portion (or an apex portion) of the convex portion 110*a*1 of the vibration member 110. Accordingly, when the one or more vibration devices 131 vibrate, the overlap and interference of a reflected wave of each frequency region occurring in the vibration member 110 may be prevented or minimized, thereby decreasing a standing wave of each frequency region to enhance a sound characteristic.

The one or more vibration devices 131 according to an example embodiment of the present disclosure may be disposed between the first edge portion E1 and the center portion CP of the vibration member 110. For example, the one or more vibration devices 131 may be connected to a relatively thick region at a non-center portion of the vibration member 110, and thus, a sound generated based on a vibration of the vibration member 110 may have a high sound pressure level characteristic in the high-pitched sound band. For example, the sound apparatus 10 including the one or more vibration devices 131 disposed between the first edge portion E1 and the center portion CP of the vibration member 110 may enhance a sound characteristic and/or a sound pressure level characteristic of the high-pitched sound band.

According to another example embodiment of the present disclosure, the one or more vibration devices 131 may be disposed between the second edge portion E2 and the center portion CP of the vibration member 110. For example, the one or more vibration devices 131 may be connected to a relatively thin region at the non-center portion of the vibration member 110, and thus, a sound generated based on a vibration of the vibration member 110 may have a high sound pressure level characteristic in the low-pitched sound band. For example, the sound apparatus 10 including the one or more vibration devices 131 disposed between the second edge portion E2 and the center portion CP of the vibration member 110 may enhance a sound characteristic and/or a sound pressure level characteristic of the low-pitched sound band.

Figure 5:
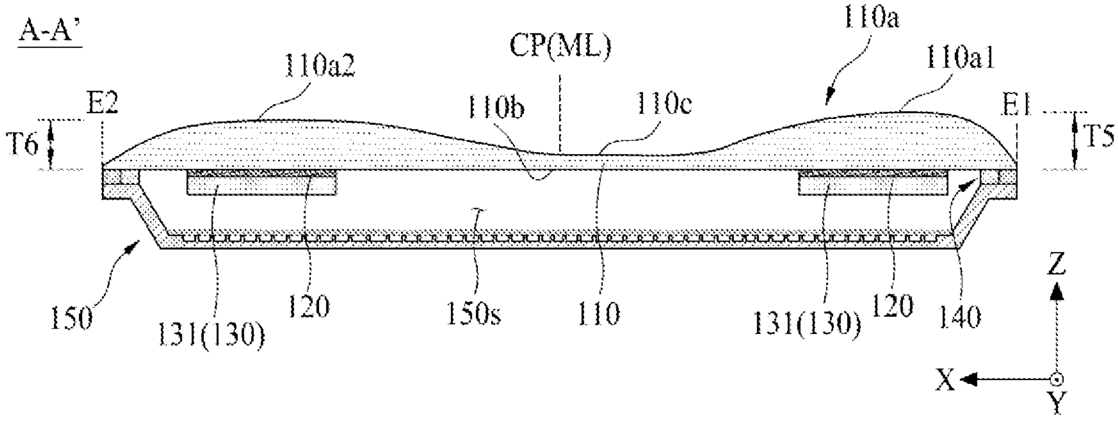
FIG. 5 is an example of another cross-sectional view taken along line A-A' illustrated in FIG. 1.

FIG. 5 is an example of another cross-sectional view taken along line A-A' illustrated in FIG. 1. FIG. 5 illustrates a sound apparatus according to another example embodiment of the present disclosure. FIG. 5 illustrates an example embodiment implemented by modifying a structure of the vibration member illustrated in FIG. 2. In the following description, therefore, their repetitive descriptions of the elements except the vibration member and relevant elements may be omitted.

With reference to FIGS. 1 and 5, a sound apparatus 10 according to another example embodiment of the present disclosure may include a vibration member 110 and a vibration apparatus 130.

The vibration member 110 may include a first surface 110*a* and a second surface 110*b*, and one or more of the first surface 110*a* and the second surface 110*b* may include a non-planar structure. For example, the first surface 110*a* of the vibration member 110 may include a non-planar structure, and the second surface 110*b* of the vibration member 110 may include a planar structure.

A first surface 110*a* of the vibration member 110 according to another example embodiment of the present disclosure may include a curved structure which includes a plurality of convex portions 110*a*1 and 110*a*2 and a concave portion 110*c* between the plurality of convex portions 110*a*1 and 110*a*2.

The first surface 110*a* of the vibration member 110 according to another example embodiment of the present disclosure may include a first convex portion 110*a*1, a second convex portion 110*a*2, and the concave portion 110*c* between the first convex portion 110*a*1 and the second convex portion 110*a*2.

The first convex portion 110*a*1 may be configured between a first edge portion E1 and a center portion CP of the vibration member 110. For example, the first convex portion 110*a*1 may be configured close to the first edge portion E1.

The second convex portion 110*a*2 may be configured between a second edge portion E2 and the center portion CP of the vibration member 110. For example, the second convex portion 110*a*2 may be configured close to the second edge portion E2.

The first convex portion 110*a*1 and the second convex portion 110*a*2 may have an asymmetric structure (or a horizontal asymmetric structure) with respect to a center line ML (or a reference line passing through a center portion of the vibration member 110 in a second direction Y) of the vibration member 110 parallel to a first direction X. However, embodiments of the present disclosure are not limited thereto, and the first convex portion 110*a*1 and the second convex portion 110*a*2 may have a symmetric structure (or a horizontal symmetric structure) with respect to the center line ML of the vibration member 110.

The concave portion 110*c* may be configured between the first convex portion 110*a*1 and the second convex portion 110*a*2. The concave portion 110*c* may be configured between the first convex portion 110*a*1 and the second convex portion 110*a*2 including the center portion CP of the vibration member 110. The concave portion 110*c* may have an asymmetric structure or a symmetric structure with respect to the center line ML of the vibration member 110.

The vibration member 110 may have a thickness T5 which is thickest in one or more of the first convex portion 110*a*1 and the second convex portion 110*a*2 and may have a thickness T4 which is thinnest in the concave portion 110*c*. For example, the vibration member 110 may have the thickness T5 which is thickest in the first convex portion 110*a*1.

The vibration member 110 according to another example embodiment of the present disclosure may have a plurality of natural vibration frequencies based on the curved structure including the first convex portion 110*a*1, the second convex portion 110*a*2, and the concave portion 110*c* configured at the first surface 110*a*. The vibration member 110 may have a plurality of natural vibration frequencies which differ for each region (or area). For example, the vibration member 110 may have a plurality of natural vibration frequencies which differ based on a thickness of each region (or area).

The vibration apparatus 130 according to another example embodiment of the present disclosure may include a plurality of vibration devices 131 for vibrating each of the plurality of convex portions 110*a*1 and 110*a*2 of the vibration member 110.

Each of the plurality of vibration devices 131 may be connected or coupled to the second surface 110*b* of the vibration member 110 corresponding to each of the plurality of convex portions 110*a*1 and 110*a*2 configured in the vibration member 110. For example, each of the plurality of vibration devices 131 may be connected or coupled to the second surface 110*b* of the vibration member 110 corresponding to each of the first convex portion 110*a*1 and the second convex portion 110*a*2.

Each of the plurality of vibration devices 131 may vibrate the vibration member 110 in a region corresponding to the corresponding convex portion 110*a*1 and 110*a*2, and thus, may generate or output a sound based on a vibration of the vibration member 110. In a sound generated based on a vibration of the vibration member 110, a sound pressure level characteristic may increase based on a vibration, having various natural vibration frequencies, of the vibration member 110, and a reproduction pitched sound band may extend. For example, when the vibration member 110 having a non-planar structure vibrates, a sound of the high-pitched sound band may be generated or output in a relatively thick region, and a sound of the low-pitched sound band may be generated or output in a relatively thin region.

Accordingly, the vibration apparatus 130 according to another example embodiment of the present disclosure may include the plurality of vibration devices 131 disposed to correspond to each of the plurality of convex portions 110*a*1 and 110*a*2 of the vibration member 110, and thus, may decrease an adverse effect caused by a divisional vibration of the vibration member 110 and may enhance a sound characteristic and/or a sound pressure level characteristic of the high-pitched sound band.

Figure 6:
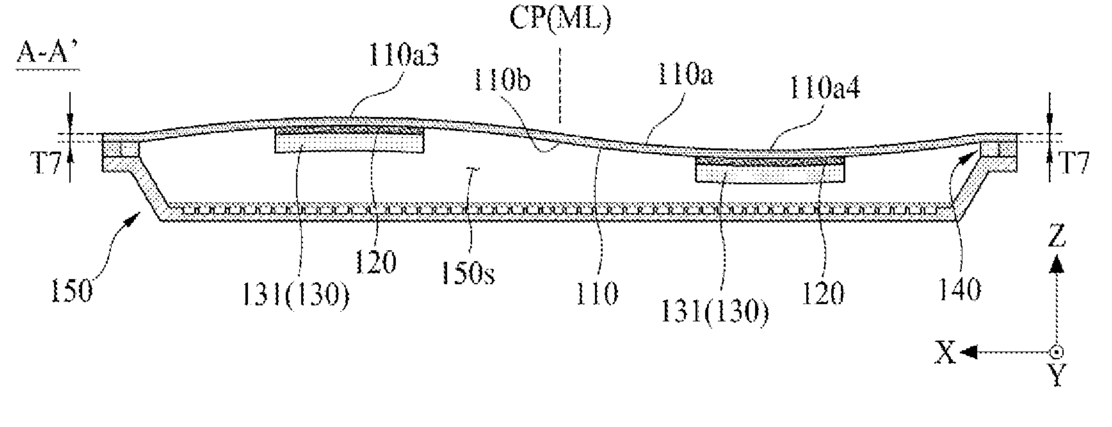
FIG. 6 is an example of another cross-sectional view taken along line A-A' illustrated in FIG. 1.

FIG. 6 is an example of another cross-sectional view taken along line A-A' illustrated in FIG. 1. FIG. 6 illustrates a sound apparatus according to another example embodiment of the present disclosure. FIG. 6 illustrates an example embodiment implemented by modifying a structure of the vibration member illustrated in FIG. 2. In the following description, therefore, their repetitive descriptions of the elements except the vibration member and relevant elements may be omitted.

With reference to FIGS. 1 and 6, a sound apparatus 10 according to another example embodiment of the present disclosure may include a vibration member 110 and a vibration apparatus 130.

The vibration member 110 may include a non-planar structure. For example, the vibration member 110 may include a curved structure or a flexural portion (or an uneven portion). For example, the vibration member 110 may include a flexural portion which includes one or more convex curved portions 110*a*3 and one or more concave curved portions 110*a*4. For example, the vibration member 110 may have totally the same thickness T7 (e.g., the vibration member 110 may have the same thickness T7 throughout the entire length or the entirety of the vibration member 110), but embodiments of the present disclosure are not limited thereto.

The convex curved portions 110*a*3 may be a region, which is bent in a convex curved shape, among a region of the vibration member 110. The concave curved portions 110*a*4 may be a region, which is bent in a concave curved shape, among the region of the vibration member 110.

The convex curved portions 110*a*3 and the concave curved portions 110*a*4 may include the same curvature (or a curvature radius), but embodiments of the present disclosure are not limited thereto. For example, a curvature of the convex curved portions 110*a*3 may be greater or smaller than that of the concave curved portions 110*a*4.

A boundary portion (or an inflection portion) between the convex curved portions 110*a*3 and the concave curved portions 110*a*4 may be disposed or aligned at a center line ML of the vibration member 110 parallel to a first direction X, but embodiments of the present disclosure are not limited thereto.

The vibration member 110 according to another example embodiment of the present disclosure may have a plurality of natural vibration frequencies based on the curved structure including the convex curved portions 110*a*3 and the concave curved portions 110*a*4. The vibration member 110 may have a plurality of natural vibration frequencies which differ for each region (or area). For example, the vibration member 110 may have a plurality of natural vibration frequencies which differ based on curvatures of each of the convex curved portions 110*a*3 and the concave curved portions 110*a*4.

The vibration apparatus 130 according to another example embodiment of the present disclosure may include a plurality of vibration devices 131 for vibrating each of the convex curved portions 110*a*3 and the concave curved portions 110*a*4 of the vibration member 110.

Each of the plurality of vibration devices 131 may be connected or coupled to the vibration member 110 corresponding to each of the convex curved portions 110*a*3 and the concave curved portions 110*a*4 of the vibration member 110. For example, each of the plurality of vibration devices 131 may be connected or coupled to the second surface 110*b* of the vibration member 110 corresponding to each of the convex curved portions 110*a*3 and the concave curved portions 110*a*4.

Each of a plurality of vibration devices 131 may be bent based on a curvature of each of the corresponding convex curved portions 110*a*3 and the corresponding concave curved portions 110*a*4 and may be connected or coupled to a second surface 110*b* of the vibration member 110. For example, each of the plurality of vibration devices 131 may be bent in a shape (an equiangular shape or a conformal shape) based on a shape of the second surface 110*b* of the vibration member 110.

According to an example embodiment of the present disclosure, when the vibration device 131 is connected to a concave second surface 110*b* of the vibration member 110 corresponding to the convex curved portion 110*a*3, a local divisional vibration region occurring in the vibration member 110 may be changed in a curvature direction (or a concave second surface), and thus, a reduction in sound quality caused by a local divisional vibration may be prevented or minimized. In addition, when the vibration device 131 is connected to a convex second surface 110*b* of the vibration member 110 corresponding to the concave curved portion 110*a*4, a bending (or curving) direction of the vibration device 131 may concentrate in one direction due to a bending stress applied to the vibration apparatus 130 based on a curvature of the vibration member 110, and thus, a sound pressure level may increase compared to a vibration member having a planar structure.

Each of the plurality of vibration devices 131 may vibrate the vibration member 110 at each of the corresponding convex curved portion 110*a*3 and the corresponding concave curved portion 110*a*4, and thus, may generate or output a sound based on a vibration of the vibration member 110.

Therefore, the sound apparatus 10 according to another example embodiment of the present disclosure may include the plurality of vibration devices 131 disposed respectively to correspond to the convex curved portion 110*a*3 and the concave curved portion 110*a*4 of the vibration member 110, and thus, an adverse effect caused by a divisional vibration of the vibration member 110 may be reduced and a sound characteristic and/or a sound pressure level characteristic may be enhanced based on an increase in a sound pressure level in the convex curved portion 110*a*3 of the vibration member 110.

Figure 7A:
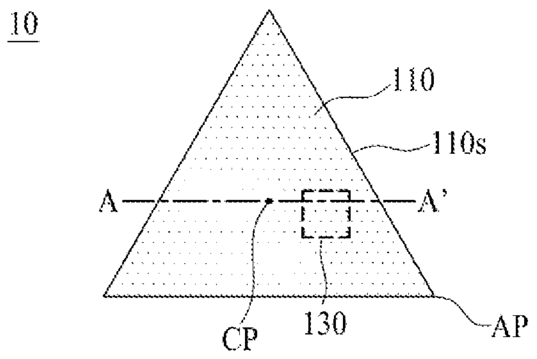
FIG. 7A is a plan view illustrating a sound apparatus according to another example embodiment of the present disclosure.
Figure 7B:
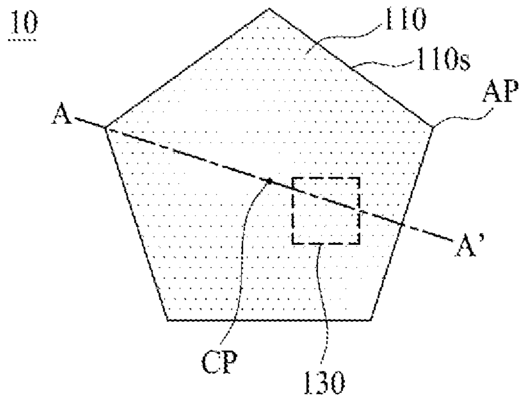
FIG. 7B is a plan view illustrating a sound apparatus according to another example embodiment of the present disclosure.
Figure 7C:
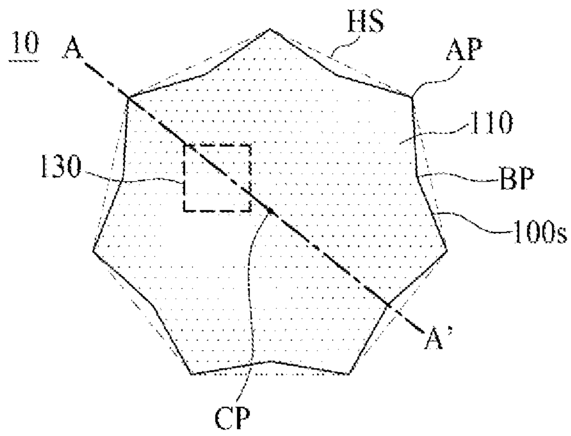
FIG. 7C is a plan view illustrating a sound apparatus according to another example embodiment of the present disclosure.

FIGS. 7A to 7C are plan views illustrating a sound apparatus according to another example embodiment of the present disclosure. FIGS. 7A to 7C illustrate an example embodiment implemented by modifying a shape of the vibration member illustrated in FIGS. 1 to 6. In describing FIGS. 7A to 7C, therefore, their repetitive descriptions of the elements except a shape of a vibration member and relevant elements may be omitted or will be briefly given below. An example of line A-A' illustrated in FIGS. 7A to 7C is illustrated in one of FIGS. 2 and 4 to 6.

With reference to FIGS. 7A to 7C, a sound apparatus 10 according to another example embodiment of the present disclosure may have a triangular shape, a pentagonal shape, or a fourteen-angular shape, but embodiments of the present disclosure are not limited thereto. For example, the sound apparatus 10 according to another example embodiment of the present disclosure may include a circular shape, an oval shape, or a polygonal shape having three or more apexes AP. For example, in the sound apparatus 10 according to another example embodiment of the present disclosure, each of the vibration member 110 and a housing 150 may include the same circular shape, oval shape, or polygonal shape having three or more apexes AP.

With reference to FIG. 7A, in a sound apparatus 10 according to another example embodiment of the present disclosure, a vibration member 110 may include a triangular shape.

The vibration member 110 may include the same cross-sectional structure as that of the vibration member illustrated in one of FIGS. 2 and 4 to 6. However, embodiments of the present disclosure are not limited thereto, and the vibration member 110 may have a plate structure having a certain thickness, and for example, may have a triangular plate structure.

The vibration member 110 may include a first surface, a second surface, three apexes (or corners) AP, and three lateral surfaces (or sidewalls).

The vibration member 110 may include three apexes AP, for absorbing or trapping a reflected wave generated through reflection by a connection member 140. For example, a progressive wave incident on the connection member 140 provided at the apex AP of the vibration member 110 may be scattered (or dispersed) and reflected by the apex AP without being reflected in an incident direction, and thus, overlap and interference between the reflected wave and the progressive wave may be prevented or minimized, thereby preventing or minimizing the occurrence of a standing wave.

The vibration apparatus 130 may be connected or coupled to a non-center portion except for a center portion CP of the vibration member 110. Accordingly, a reflected wave which occurs in the vibration member 110 which vibrates based on a vibration of the vibration apparatus 130 may be trapped at the apex AP of the vibration member 110.

Therefore, the apex AP of the vibration member 110 may trap a reflected wave which occurs when the vibration member 110 vibrates (or is vibrating), and thus, may prevent or minimize a reduction in a sound pressure level characteristic based on a standing wave caused by the interference of the reflected wave and a progressive wave.

The sound apparatus 10 illustrated in FIG. 7A may output a sound through a vibration of the vibration member 110 including the apex AP for trapping a reflected wave, and thus, a sound characteristic and/or a sound pressure level characteristic generated based on a vibration of the vibration member 110 may be enhanced.

With reference to FIG. 7B, in a sound apparatus 10 according to another example embodiment of the present disclosure, a vibration member 110 may include a pentagonal shape.

The vibration member 110 may include the same cross-sectional structure as that of the vibration member illustrated in one of FIGS. 2 and 4 to 6. However, embodiments of the present disclosure are not limited thereto, and the vibration member 110 may have a plate structure having a certain thickness, and for example, may have a pentagonal plate structure.

The vibration member 110 may include a first surface, a second surface, five apexes (or corners) AP, and five lateral surfaces (or sidewalls).

The vibration member 110 may include five apexes AP, for absorbing or trapping a reflected wave generated through reflection by a connection member 140.

The vibration apparatus 130 may be connected or coupled to a non-center portion except for a center portion CP of the vibration member 110. Accordingly, a reflected wave which occurs in the vibration member 110 which vibrates based on a vibration of the vibration apparatus 130 may be trapped at the apex AP of the vibration member 110.

Therefore, the sound apparatus 10 illustrated in FIG. 7B may output a sound through a vibration of the vibration member 110 including the apex AP for trapping a reflected wave, and thus, may enhance a sound characteristic and/or a sound pressure level characteristic generated based on a vibration of the vibration member 110.

With reference to FIG. 7C, in a sound apparatus 10 according to another example embodiment of the present disclosure, a vibration member 110 may have a fourteen-angular shape.

The vibration member 110 may include the same cross-sectional structure as that of the vibration member illustrated in one of FIGS. 2 and 4 to 6. However, embodiments of the present disclosure are not limited thereto, and the vibration member 110 may have a plate structure having a certain thickness, and for example, may have a fourteen-angular plate structure.

The vibration member 110 may include a first surface, a second surface, fourteen apexes (or corners) AP, and fourteen lateral surfaces (or sidewalls) 100*s* disposed between adjacent two apexes AP. For example, the vibration member 110 may include a first surface, a second surface, seven apexes (or corners) AP, seven bent portions BP disposed between the seven apexes AP, and fourteen lateral surfaces (or sidewalls) 100*s* disposed between adjacent apex AP and bent portion BP. For example, the vibration member 110 may have a shape where each of seven sides HS protrude sharply toward the center portion CP, in a seven-angular shape (a dotted line).

The vibration member 110 may include fourteen apexes AP, for absorbing or trapping a reflected wave generated through reflection by a connection member 140.

The vibration apparatus 130 may be connected or coupled to a non-center portion except a center portion CP of the vibration member 110. Accordingly, a reflected wave which occurs in the vibration member 110 which vibrates based on a vibration of the vibration apparatus 130 may be trapped at the apex AP of the vibration member 110.

Therefore, the sound apparatus 10 illustrated in FIG. 7C may output a sound through a vibration of the vibration member 110 including the apex AP for trapping a reflected wave, and thus, may enhance a sound characteristic and/or a sound pressure level characteristic generated based on a vibration of the vibration member 110.

Additionally, in the sound apparatus 10 according to another example embodiment of the present disclosure, the vibration member 110 may have a circular shape or an oval shape. Even in this case, a progressive wave incident on the connection member 140 provided at a curved-shape lateral surface of the vibration member 110 may be scattered (or dispersed) and reflected by the apex AP without being reflected in an incident direction, and thus, overlap and interference between the reflected wave and the progressive wave may be prevented or minimized, thereby preventing or minimizing the occurrence of a standing wave. Accordingly, in the sound apparatus 10 according to another example embodiment of the present disclosure, the vibration member 110 may have one shape of a circular shape, an oval shape, and a polygonal shape including three or more apexes.

Figure 8:
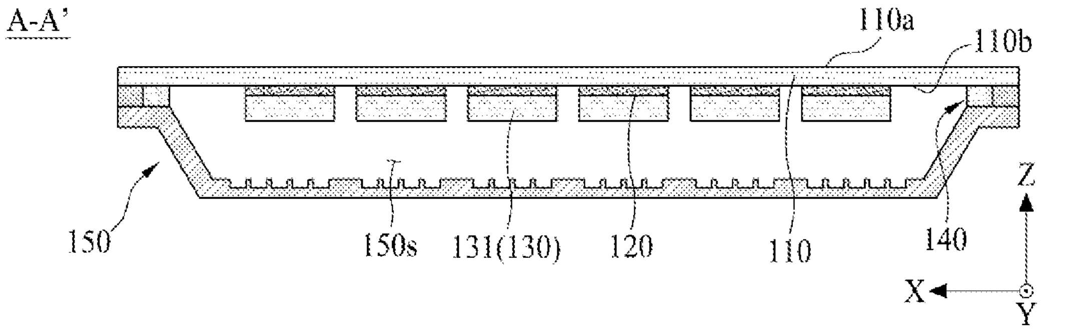
FIG. 8 is an example of another cross-sectional view taken along line A-A' illustrated in FIG. 1.
Figure 9:
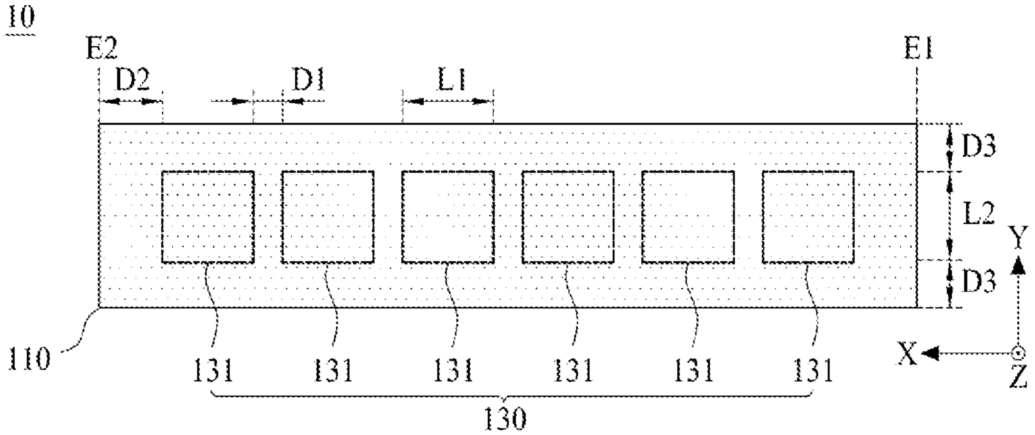
FIG. 9 illustrates an example of a vibration member and a plurality of vibration devices illustrated in FIG. 8.

FIG. 8 is an example of another cross-sectional view taken along line A-A' illustrated in FIG. 1, and FIG. 9 illustrates an example of the vibration member and the plurality of vibration devices illustrated in FIG. 8.

With reference to FIGS. 1, 8, and 9, a sound apparatus 10 according to another example embodiment of the present disclosure may include a vibration member 110 and a vibration apparatus 130.

The vibration member 110 may be configured to be substantially the same as the vibration member illustrated in one of FIGS. 2, 4 to 6, and 7A to 7C. However, embodiments of the present disclosure are not limited thereto, and the vibration member 110 may have a plate structure where each of a first surface 110*a* and a second surface 110*b* has a planar structure.

The vibration apparatus 130 may include a plurality of vibration devices 131. For example, the vibration apparatus 130 may include first to $n^{th}$ (where n is a natural number of 2 or more) vibration devices 131 connected to the second surface (or a rear surface) 110*b* of the vibration member 110. For example, the vibration apparatus 130 may include the first to $n^{th}$ vibration devices 131 which are connected or tiled to the second surface 110*b* of the vibration member 110 to have a certain interval along a first direction X.

Each of the first to $n^{th}$ vibration devices 131 may have a square shape where a horizontal length L1 is the same as a vertical length L2, but embodiments of the present disclosure are not limited thereto. For example, each of the first to $n^{th}$ vibration devices 131 may have a rectangular shape where the horizontal length L1 is relatively longer than the vertical length L2.

A sound generated in the vibration member 110, which vibrates based on a vibration of each of the first to $n^{th}$ vibration devices 131, may be reduced in reproduction pitched sound band and sound pressure level characteristic due to constructive interference and/or destructive interference and a standing wave caused by a reflective wave generated through reflection by the connection member 140. In order to prevent or minimize a reduction in the reproduction pitched sound band and sound pressure level characteristic of a sound caused by the reflected wave, a first interval D1 between the first to $n^{th}$ vibration devices 131 may be 3 mm to 5 mm, with respect to the first direction X, but embodiments of the present disclosure are not limited thereto. In one or more examples, the first interval D1 may be an interval (or a gap or a distance) between adjacent vibration devices 131. In one or more examples, the first interval D1 may be an interval (or a gap or a distance) between adjacent vibration devices 131 of the first to $n^{th}$ vibration devices 131. In one or more examples, the first interval D1 may be an interval (or a gap or a distance) between two adjacent vibration devices 131 of the first to $n^{th}$ vibration devices 131.

According to an example embodiment of the present disclosure, when the first to $n^{th}$ vibration devices 131 are arranged at the first interval D1 of less than 3 mm or without the first interval D1, the reliability of each of the first to $n^{th}$ vibration devices 131 may be reduced due to damage or the occurrence of a crack caused by a physical contact between vibration devices 131 when each of the first to $n^{th}$ vibration devices 131 vibrates (or is vibrating).

According to an example embodiment of the present disclosure, when the first to $n^{th}$ vibration devices 131 are arranged at the first interval D1 of more than 5 mm, a sound characteristic and/or a sound pressure level characteristic based on a vibration of each of the first to $n^{th}$ vibration devices 131 may be reduced due to an adverse effect of a reflected wave. For example, when the first to $n^{th}$ vibration devices 131 are arranged at the first interval D1 of more than 5 mm, a sound characteristic and/or a sound pressure level characteristic in a low-pitched sound band (for example, 500 Hz or less) may be reduced.

According to an example embodiment of the present disclosure, when the first to $n^{th}$ vibration devices 131 are arranged at the first interval D1 of 3 mm to 5 mm, the occurrence of constructive interference and/or destructive interference and a standing wave caused by a reflective wave generated based on a vibration of each of the connection member 140 may be reduced or minimized, and thus, a production pitched sound band of a sound may increase and a sound pressure level characteristic of a sound of the low-pitched sound band (for example, 500 Hz or less) may increase.

With respect to the first direction X, a second interval D2 may be smaller than the horizontal length L1 of one vibration device 131 and may be greater than the first interval D1. In one or more examples, a second interval D2 may be an interval (or a gap or a distance) between an end (or an edge) of the vibration member 110 and a vibration device 131 located closest to the end (or the edge) of the vibration member 110. In one or more examples, a second interval D2 may be an interval (or a gap or a distance) between a second edge portion E2 of the vibration member 110 (e.g., a left edge) and a vibration device 131 located closest to the second edge portion E2 (e.g., the left-most vibration device 131 in FIG. 9). In one or more examples, a second interval D2 may be an interval (or a gap or a distance) between a first edge portion E1 of the vibration member 110 (e.g., a right edge) and a vibration device 131 located closest to the first edge portion E1 (e.g., the right-most vibration device 131 in FIG. 9).

In addition, with respect to the second direction Y, a third interval D3 between each of the first to $n^{th}$ vibration devices 131 and the both ends of the vibration member 110 may be smaller than the vertical length L2 of one vibration device 131 and may be greater than the first interval D1. In one or more examples, a third interval D3 may be an interval (or a gap or a distance) between a third edge portion of the vibration member 110 and the first to $n^{th}$ vibration devices 131. The third edge portion may be perpendicular to the first and second edge portions E1 and E2. The third edge portion may be located on a first side of the vibration member 110 along the first direction X. In one or more examples, a third interval D3 may be an interval (or a gap or a distance) between a fourth edge portion of the vibration member 110 and the first to $n^{th}$ vibration devices 131. The fourth edge portion may be perpendicular to the first and second edge portions E1 and E2. The fourth edge portion may be located on a second side (an opposite side of the first side) of the vibration member 110 along the first direction X.

With respect to second and third intervals D2 and D3, for example, when the second interval D2 is relatively greater than the horizontal length L1 of one vibration device 131 and the third interval D3 is greater than the vertical length L2 of one vibration device 131, a vibration region of each of the first and $n^{th}$ vibration devices 131 may relatively extend, and thus, the uniformity of a sound characteristic and/or a sound pressure level characteristic may be reduced. Accordingly, in order to implement a uniform sound characteristic and/or a uniform sound pressure level characteristic based on a vibration of each of the first to $n^{th}$ vibration devices 131, the second interval D2 may be smaller than the horizontal length L1 of one vibration device 131 and may be greater than the first interval D1, and the third interval D3 may be smaller than the vertical length L2 of one vibration device 131 and may be greater than the first interval D1.

Each of the first to $n^{th}$ vibration devices 131 may vibrate the vibration member 110 based on the vibration driving signal supplied from the sound processing circuit, and thus, may output a sound generated based on a vibration of the vibration member 110. For example, each of the first to $n^{th}$ vibration devices 131 may vibrate the vibration member 110 based on the vibration driving signal to output a sound of the same pitched sound band, but embodiments of the present disclosure are not limited thereto. For example, one or more of the first to $n^{th}$ vibration devices 131 may vibrate the vibration member 110 based on the vibration driving signal to output sounds of different pitched sound bands.

As described above, the sound apparatus 10 according to another example embodiment of the present disclosure may vibrate the vibration member 110 based on a vibration of each of the first to $n^{th}$ vibration devices 131 which is connected to a rear surface of the vibration member 110 to have an optimized interval D1 based on an influence of a reflected wave, and thus, may output a sound, thereby enhancing a sound pressure level characteristic and a reproduction pitched sound band of a sound.

Figure 10A:
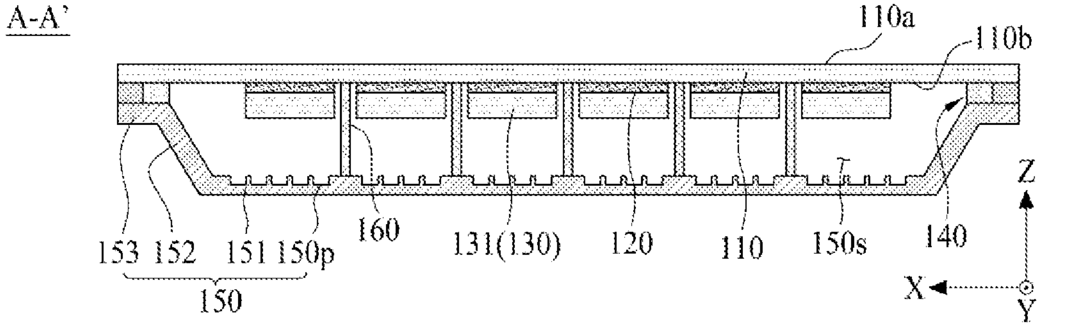
FIG. 10A is an example of another cross-sectional view taken along line A-A' illustrated in FIG. 1.
Figure 10B:
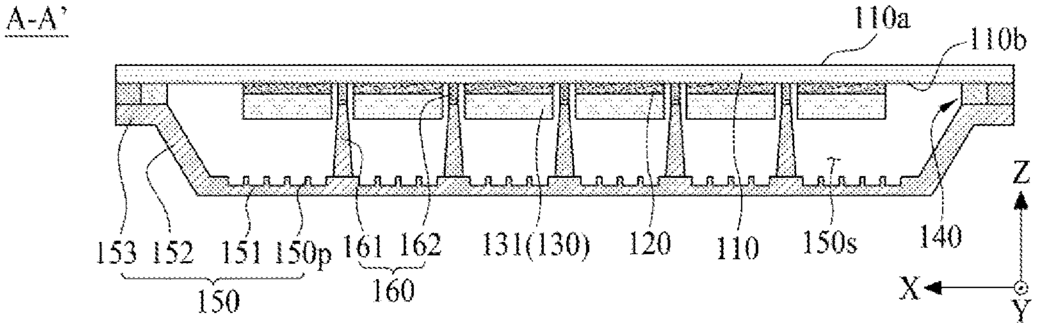
FIG. 10B is an example of another cross-sectional view taken along line A-A' illustrated in FIG. 1.

FIGS. 10A and 10B are examples of other cross-sectional views taken along line A-A' illustrated in FIG. 1 and illustrate an example embodiment where a space separation portion is added to the sound apparatus illustrated in FIG. 8. In describing FIGS. 10A and 10B, the elements except a space separation portion and relevant elements may be referred to by like reference numerals, and their repetitive descriptions may be omitted or will be briefly given.

With reference to FIGS. 1 and 10A, a sound apparatus 10 according to another example embodiment of the present disclosure may further include a space separation portion 160.

The space separation portion 160 may be configured between one or more of first to $n^{th}$ vibration devices 131. For example, the space separation portion 160 may be configured between two adjacent vibration devices 131 of first to $n^{th}$ vibration devices 131, but embodiments of the present disclosure are not limited thereto, and the space separation portion 160 may be configured between two or more adjacent vibration devices 131.

The space separation portion 160 according to an example embodiment of the present disclosure may provide a closed space near (or around) one or more of first to $n^{th}$ vibration devices 131, and thus, may define a vibration region of one or more of first to $n^{th}$ vibration devices 131. For example, the space separation portion 160 may provide an air gap or a space, where a sound is generated when each of the plurality of vibration devices 131 vibrates (or is vibrating). For example, the space separation portion 160 may separate the sounds or a channel and may minimize or prevent or decrease the reduction of a sound characteristic caused by interference of the sounds. For example, the space separation portion 160 may be referred to as a partition, a partition member, a sound separation member, a space separation member, or a baffle, or the like, but embodiments of the present disclosure are not limited thereto.

With reference to FIG. 10A, the space separation portion 160 according to an example embodiment of the present disclosure may be connected between a second surface 110*b* of a vibration member 110 and a floor portion 151 of a housing 150. For example, one side (or a top surface) of the space separation portion 160 may be connected or coupled to the second surface 110*b* of the vibration member 110. The other side (or a bottom surface) of the space separation portion 160 may be connected or coupled to the floor portion 151 of the housing 150.

The space separation portion 160 may include a material having elasticity for vibration absorption (or impact absorption). The space separation portion 160 according to an example embodiment of the present disclosure may be configured as polyurethane materials or polyolefin materials, but embodiments of the present disclosure are not limited thereto, and may include one or more of an adhesive, a double-sided tape, a double-sided foam tape, and a double-sided cushion tape, but embodiments of the present disclosure are not limited thereto. For example, the space separation portion 160 may be configured as the same material as the connecting member 140.

With reference to FIG. 10B, a space separation portion 160 according to another example embodiment of the present disclosure may include a partition wall 161 and a partition member 162.

The partition wall (or a separation wall) 161 may protrude from a floor portion 151 of a housing 150 to a region between the plurality of vibration devices 131. For example, the partition wall 161 may protrude from the floor portion 151 of the housing 150 between two adjacent vibration devices among the plurality of vibration devices 131 to a region between the two adjacent vibration devices. For example, the partition wall 161 may be disposed or aligned on the same plane as a connection frame portion 153 of the housing 150. For example, a distance between the floor portion 151 and a top surface of the partition wall 161 may be the same as a distance between the floor portion 151 and the connection frame portion 153 (e.g., may be the same as a distance between the floor portion 151 and a top surface of the connection frame portion 153).

The partition member 162 may be disposed between the partition wall 161 and the vibration member 110. For example, an upper side (or a top surface) of the partition member 162 may be connected or coupled to a second surface 110*b* of a vibration member 110. A lower side (or a bottom surface) of the partition member 162 may be connected or coupled to an upper side (or a top surface) of the partition wall 161.

The partition member 162 may include a material having elasticity for vibration absorption (or impact absorption). The partition member 162 according to an example embodiment of the present disclosure may be configured as polyurethane materials or polyolefin materials, but embodiments of the present disclosure are not limited thereto, and may include one or more of an adhesive, a double-sided tape, a double-sided foam tape, and a double-sided cushion tape, but embodiments of the present disclosure are not limited thereto. For example, the partition member 162 may be configured as the same material as the connecting member 140.

As described above, the sound apparatus 10 according to another example embodiment of the present disclosure may further include the space separation portion 160, and thus, may separate a channel or a sound generated based on a vibration of each of the first to $n^{th}$ vibration devices 131 to output a 2-channel stereo sound, thereby enhancing a sound pressure level characteristic and a reproduction pitched sound band of a sound.

Figure 11:
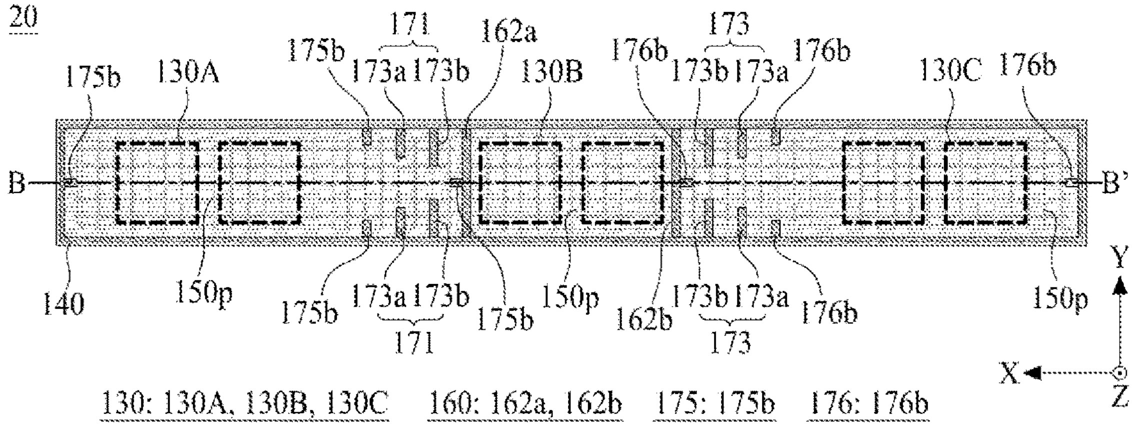
FIG. 11 is a plan view illustrating a sound apparatus according to another example embodiment of the present disclosure.
Figure 12:
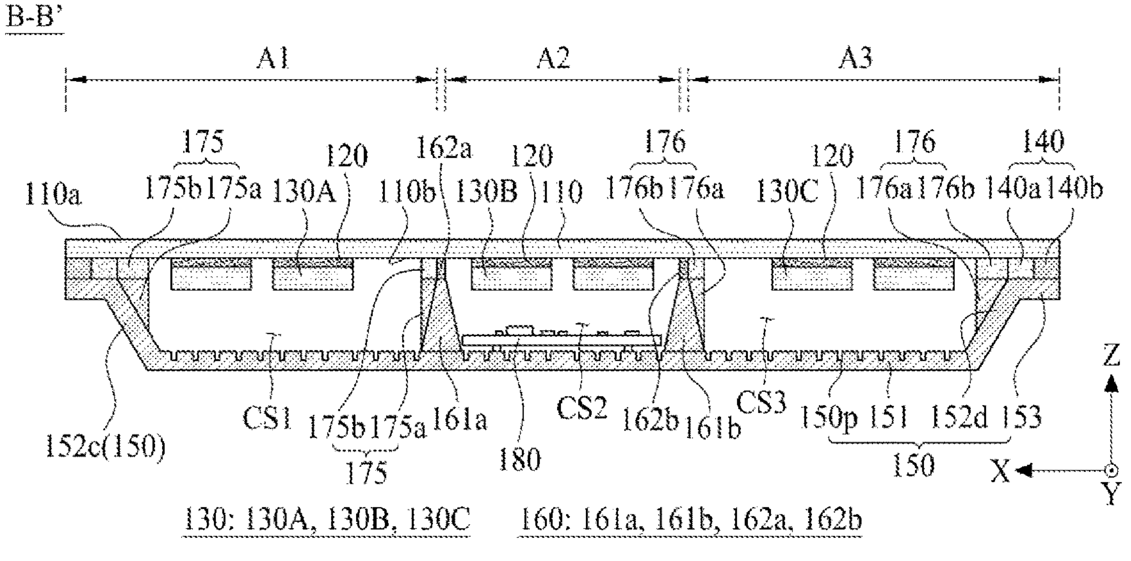
FIG. 12 is an example of a cross-sectional view taken along line B-B' illustrated in FIG. 11.
Figure 13:
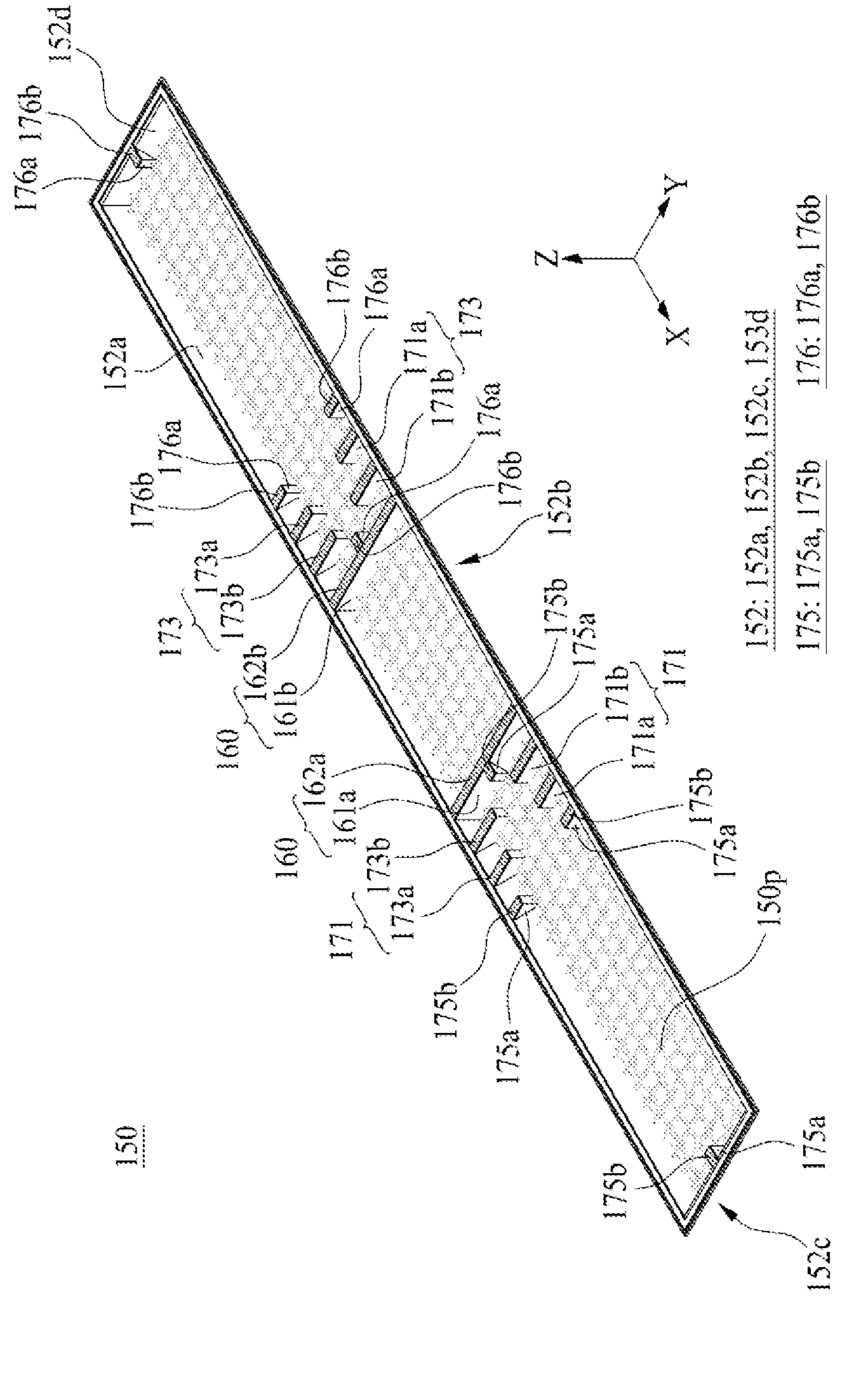
FIG. 13 is an example of a perspective view illustrating a housing illustrated in FIGS. 11 and 12.

FIG. 11 is a plan view illustrating a sound apparatus according to another example embodiment of the present disclosure. FIG. 12 is an example of a cross-sectional view taken along line B-B' illustrated in FIG. 11. FIG. 13 is an example of a perspective view illustrating a housing illustrated in FIG. 12.

With reference to FIGS. 11 to 13, a sound apparatus 20 according to another example embodiment of the present disclosure may include a vibration member 110, a vibration apparatus 130, and a housing 150.

The vibration member 110 may be configured to be substantially the same as the vibration member illustrated in one of FIGS. 2 and 4 to 6. However, embodiments of the present disclosure are not limited thereto, and the vibration member 110 may have a plate structure where each of a first surface 110*a* and a second surface 110*b* has a planar structure.

The vibration member 110 may include first to nth (where n is a natural number of 3 or more) regions A1 to An. For example, the vibration member 110 may include the first to third regions A1, A2, and A3. For example, the vibration member 110 may include the first to third regions A1, A2, and A3 arranged along a first direction X.

The vibration apparatus 130 may include a plurality of vibrating devices 130A, 130B, and 130C configured to vibrate each of the plurality of regions A1, A2, and A3 of the vibration member 110. For example, the vibration apparatus 130 may include one or more first to $n^{th}$ vibration devices (such as 130A, 130B, and 130C), which are configured to vibrate each of the first to $n^{th}$ regions (such as A1, A2, and A3). Each of the first to $n^{th}$ regions (such as A1, A2, and A3) of the vibration member 110 may vibrate based on vibrations of corresponding one or more vibration devices among the one or more first to $n^{th}$ vibration devices (such as 130A, 130B, and 130C) to output a sound. According to an example embodiment of the present disclosure, a sound output from one region of the first to $n^{th}$ regions (such as A1, A2, and A3) of the vibration member 110 may have a pitched sound band which differs from that of a sound output from the other region of the first to $n^{th}$ regions (such as A1, A2, and A3).

According to an example embodiment of the present disclosure, the vibration apparatus 130 may include one or more first to third vibration devices 130A, 130B, and 130C configured to respectively vibrate the first to third regions A1, A2, and A3.

The one or more first vibration devices 130A may be arranged along the first direction X to vibrate the first region A1 of the vibration member 110. The one or more second vibration devices 130B may be arranged along the first direction X to vibrate the second region A2 of the vibration member 110. The one or more third vibration devices 130C may be arranged along the first direction X to vibrate the third region A3 of the vibration member 110. Each of the first to third regions A1, A2, and A3 of the vibration member 110 may vibrate based on vibrations of corresponding one or more vibration devices among the one or more first to $n^{th}$ vibration devices (such as 130A, 130B, and 130C) to output a sound. According to an example embodiment of the present disclosure, a sound output from one region of the first to third regions A1, A2, and A3 of the vibration member 110 may have a pitched sound band which differs from that of a sound output from the other region of the first to third regions A1, A2, and A3.

The housing 150 may be disposed at a rear surface of the vibration member 110 to cover the second surface 110*b* of the vibration member 110 and the one or more vibration devices 131. The housing 150 may include an accommodation space for accommodating the vibration apparatus 130 and may have a box shape where one side is opened. The housing 150 may be connected or coupled to a periphery portion of the second surface 110*b* of the vibration member 110 by a connection member 140. Accordingly, an accommodation space of the housing 150 may be covered by the vibration member 110. The connection member 140 may be substantially the same as the connection member 140 described above with reference to FIGS. 1 to 3, and thus, like reference numerals may refer to like elements, and the repetitive description thereof may be omitted.

The housing 150 according to an example embodiment of the present disclosure may include a floor portion 151 and a lateral portion 152. The housing 150 may further include a connection frame portion 153 and a pattern portion 150*p*. The housing 150 having the above-described configuration is substantially the same as the housing 150 described with reference to FIGS. 1 to 3, and thus, like reference numerals may refer to like elements, and the repetitive description thereof may be omitted.

A lateral portion 152 of the housing 150 according to an example embodiment of the present disclosure may include a first lateral portion 152*a* which is connected to a first periphery portion of the floor portion 151 parallel to the first direction X, a second lateral portion 152*b* which is connected to a second periphery portion of the floor portion 151 parallel to the first periphery portion of the floor portion 151, a third lateral portion 152*c* which is connected to a third periphery portion of the floor portion 151 parallel to a second direction Y, and a fourth lateral portion 152*d* which is connected to a fourth periphery portion of the floor portion 151 parallel to the third periphery portion of the floor portion 151. Each of the first to fourth lateral portions 152*a* to 152*d* may be configured to be inclined by a certain angle between the floor portion 151 and the connection frame portion 153.

The housing 150 according to an example embodiment of the present disclosure may further include a space separation portion 160.

The space separation portion 160 may separate an accommodation space of the housing 150 into a plurality of spaces CS1, CS2, and CS3 corresponding to each of the plurality of regions A1, A2, and A3 of the vibration member 110. The space separation portion 160 may separate an accommodation space of the housing 150 into first to $n^{th}$ spaces (such as CS1, CS2, and CS3) corresponding to each of the first to $n^{th}$ regions (such as A1, A2, and A3) of the vibration member 110. The space separation portion 160 may separate an accommodation space of the housing 150 into first to third spaces CS1, CS2, and CS3 corresponding to each of the first to third regions A1, A2, and A3 of the vibration member 110.

The space separation portion 160 according to an example embodiment of the present disclosure may include a first partition wall 161*a* and a second partition wall 161*b*.

The first partition wall (or a first separation wall) 161*a* may be disposed between the first space CS1 and the second space CS2 corresponding to each of the first and second regions A1 and A2. The first partition wall 161*a* may be connected between the first lateral portion 152*a* and the second lateral portion 152*b* and may spatially separate the first space CS1 and the second space CS2. For example, the first partition wall 161*a* may protrude from the floor portion 151 of the housing 150 to a region between the first and second regions A1 and A2 of the vibration member 110 and may be connected between the first lateral portion 152*a* and the second lateral portion 152*b*, and thus, may spatially separate the first space CS1 and the second space CS2.

The second partition wall (or a first separation wall) 161*b* may be disposed between the second space CS2 and the third space CS3 corresponding to each of the second and third regions A2 and A3. The second partition wall 161*b* may be connected between the first lateral portion 152*a* and the second lateral portion 152*b* and may spatially separate the second space CS2 and the third space CS3. For example, the second partition wall 161*b* may protrude from the floor portion 151 of the housing 150 to a region between the second and third regions A2 and A3 of the vibration member 110 and may be connected between the first lateral portion 152*a* and the second lateral portion 152*b*, and thus, may spatially separate the second space CS2 and the third space CS3.

The space separation portion 160 according to an example embodiment of the present disclosure may include the first partition member 162*a* and the second partition member 162*b*.

The first partition member 162*a* may be disposed between the first partition wall 161*a* and the vibration member 110. For example, an upper side (or a top surface) of the first partition member 162*a* may be connected or coupled to the second surface 110*b* of the vibration member 110. A lower side (or a bottom surface) of the first partition member 162*a* may be connected or coupled to an upper side (or a top surface) of the first partition wall 161*a*.

The second partition member 162*b* may be disposed between the second partition wall 161*b* and the vibration member 110. For example, an upper side (or a top surface) of the second partition member 162*b* may be connected or coupled to the second surface 110*b* of the vibration member 110. A lower side (or a bottom surface) of the second partition member 162*b* may be connected or coupled to an upper side (or a top surface) of the second partition wall 161*b*.

Each of the first partition member 162*a* and the second partition wall 161*b* may include a material having elasticity for vibration absorption (or impact absorption). Each of the first partition member 162*a* and the second partition wall 161*b* according to an example embodiment of the present disclosure may be configured as polyurethane materials or polyolefin materials, but embodiments of the present disclosure are not limited thereto, and may include one or more of an adhesive, a double-sided tape, a double-sided foam tape, and a double-sided cushion tape, but embodiments of the present disclosure are not limited thereto. For example, each of the first partition member 162*a* and the second partition wall 161*b* may be configured as the same material as the connecting member 140.

The housing 150 according to an example embodiment of the present disclosure may further include a first sound separation portion 171 and a second sound separation portion 173.

The first sound separation portion 171 may be disposed in the first space CS1 between the one or more first vibration device 130A and the first partition wall 161*a*. The second sound separation portion 173 may be disposed in the third space CS3 between the one or more third vibration devices 130C and the second partition wall 162*a*.

Each of the first sound separation portion 171 and the second sound separation portion 173 may include one or more ribs 171*a* and 171*b* and one or more sound separation members 173*a* and 173*b*.

The one or more ribs 171*a* and 171*b* may protrude from inner surfaces of one or more of the first lateral portion 152*a* and the second lateral portion 152*b* along the second direction Y and a third direction Z.

According to an example embodiment of the present disclosure, the one or more ribs 171*a* and 171*b* may protrude from an inner surface of any one of the first lateral portion 152*a* and the second lateral portion 152*b*. In this case, a protrusion length of each of the one or more ribs 171*a* and 171*b* may be smaller than a distance between the first lateral portion 152*a* and the second lateral portion 152*b*. According to an example embodiment of the present disclosure, the one or more ribs 171*a* and 171*b* may protrude from an inner surface of each of the first lateral portion 152*a* and the second lateral portion 152*b*. In this case, the protrusion length of each of the one or more ribs 171*a* and 171*b* may be smaller than half of the distance between the first lateral portion 152*a* and the second lateral portion 152*b*.

For example, in a case where the one or more ribs 171*a* and 171*b* protrude to be connected between the first lateral portion 152*a* and the second lateral portion 152*b*, due to a sound separation effect between the first to third spaces CS1, CS2, and CS3, a vibration transferred from each of the first and third spaces CS1 and CS3 to the second space CS2 may be maximally blocked, and thus, a stereo sound characteristic may decrease due to a reduction in a sound characteristic and a sound pressure level characteristic of a high-pitched sound band. Accordingly, in order to enhance a stereo sound characteristic by minimizing a reduction in a sound characteristic and a sound pressure level characteristic of the high-pitched sound band, the protrusion length of each of the one or more ribs 171*a* and 171*b* may be smaller than half of the distance between the first lateral portion 152*a* and the second lateral portion 152*b*.

The one or more sound separation members 173*a* and 173*b* may be disposed between the one or more ribs 171*a* and 171*b* and the second surface 110*b* of the vibration member 110. For example, an upper side (or a top surface) of each of the one or more sound separation members 173*a* and 173*b* may be connected or coupled to the second surface 110*b* of the vibration member 110. Lower sides (or bottom surfaces) of the one or more sound separation members 173*a* and 173*b* may be connected or coupled to upper sides (or top surfaces) of the one or more ribs 171*a* and 171*b*. The one or more sound separation members 173*a* and 173*b* may include a material having elasticity for vibration absorption (or impact absorption), or may include the same material as that of one of the first partition member 162*a*, the second partition member 162*b*, and the connection member 140.

According to an example embodiment of the present disclosure, each of the first sound separation portion 171 and the second sound separation portion 173 may include a plurality of ribs 171*a* and 171*b* which are arranged at a predetermined interval along the first direction X. Each of the plurality of ribs 171*a* and 171*b* may protrude from an inner surface of one or more among the first lateral portion 152*a* and the second lateral portion 152*b* to have different lengths along the second direction Y. A protrusion length of each of the plurality of ribs 171*a* and 171*b* may be smaller than half of the distance between the first lateral portion 152*a* and the second lateral portion 152*b*.

According to an example embodiment of the present disclosure, the protrusion length of each of the plurality of ribs 171*a* and 171*b* may vary in a direction toward the space separation portion 160 or the second space CS2 along the first direction X. For example, the protrusion length of each of the plurality of ribs 171*a* and 171*b* may increase in a direction toward the space separation portion 160 or the second space CS2 along the first direction X. In this regard, in one or more examples, the length of the rib 171*b* (which is closer to the space separation portion 160 or the second space CS2 along the first direction X) may be longer than the length of the rib 171*a*. Further in this regard, in one or more examples, the protrusion length of the rib 171*b* (which is closer to the space separation portion 160 or the second space CS2 along the first direction X) may be longer than the protrusion length of the rib 171*a*.

According to an example embodiment of the present disclosure, each of the first sound separation portion 171 and the second sound separation portion 173 may include a plurality of sound separation members 173*a* and 173*b*.

Each of the plurality of sound separation members 173*a* and 173*b* may be disposed between each of the plurality of ribs 171*a* and 171*b* and the second surface 110*b* of the vibration member 110. For example, an upper side (or a top surface) of each of the plurality of sound separation members 173*a* and 173*b* may be connected or coupled to the second surface 110*b* of the vibration member 110. Lower sides (or bottom surfaces) of the each of the plurality of sound separation members 173*a* and 173*b* may be connected or coupled to upper sides (or top surfaces) of the one or more ribs 171*a* and 171*b*. Each of the plurality of sound separation members 173*a* and 173*b* may include a material having elasticity for vibration absorption (or impact absorption), or may include the same material as that of one of the first partition member 162*a*, the second partition member 162*b*, and the connection member 140.

The housing 150 according to an example embodiment of the present disclosure may further include a first sound limitation portion 175 and a second sound limitation portion 176.

The first sound limitation portion 175 may be disposed near the one or more first vibration devices 130A. The first sound limitation portion 175 may trap a reflected wave generated based on vibrations of the one or more first vibration devices 130A, thereby preventing or minimizing a reduction in a sound pressure level characteristic caused by a standing wave occurring due to interference between the reflected wave and a progressive wave.

The first sound limitation portion 175 according to an example embodiment of the present disclosure may include one or more first protrusion portions 175*a* and one or more first sound limitation members 175*b*.

The one or more first protrusion portions 175*a* may protrude toward the first space CS1 from inner surfaces of one or more of the first partition wall 161*a* and the first to third lateral portions 152*a*, 152*b*, and 152*c* surrounding the first space CS1. For example, the one or more first protrusion portions 175*a* may face inner surfaces of one or more of the first and second lateral portions 152*a* and 152*b* between the one or more first vibration devices 130A and the first partition wall 161*a*. For example, the one or more first protrusion portions 175*a* may be toward a center portion of the one or more first vibration devices 130A from inner surfaces of one or more of the third lateral portion 152*c* and the first partition wall 161*a*.

According to an example embodiment of the present disclosure, the first sound limitation portion 175 may include four or more first protrusion portions 175*a* protruding toward the first space CS1 from an inner surface of each of the first partition wall 161*a* and the first to third lateral portions 152*a*, 152*b*, and 152*c* surrounding the first space CS1. For example, the one or more first protrusion portions 175*a* protruding along the second direction Y from an inner surface of each of the first and second lateral portions 152*a* and 152*b* may be configured between the first vibration device 130A and the first sound separation portion 171. The one or more first protrusion portions 175*a* protruding along the first direction X from an inner surface of the third lateral portion 152*c* may protrude toward a center portion of the first vibration device 130A. The one or more first protrusion portions 175*a* protruding from an inner surface of the first partition wall 161*a* may protrude toward the center portion of the first vibration device 130A.

The one or more first sound limitation members 175*b* may be disposed between the one or more first protrusion portions 175*a* and the second surface 110*b* of the vibration member 110. For example, an upper side (or a top surface) of the one or more first sound limitation members 175*b* may be connected or coupled to the second surface 110*b* of the vibration member 110. Lower sides (or bottom surfaces) of the one or more first sound limitation members 175*b* may be connected or coupled to upper sides (or top surfaces) of the one or more first protrusion portions 175*a*. The one or more first sound limitation members 175*b* may include a material having elasticity for vibration absorption (or impact absorption), or may include the same material as that of one of the first partition member 162*a*, the second partition member 162*b*, and the connection member 140.

According to an example embodiment of the present disclosure, the first sound limitation member 175*b* and the first protrusion portion 175*a* protruding from the inner surface of each of the first to third lateral portions 152*a*, 152*b*, and 152*c* may be configured to trap a reflected wave generated by the connection member 140. The first sound limitation member 175*b* and the first protrusion portion 175*a* protruding from the inner surface of the first partition wall 161*a* may be configured to trap a reflected wave generated by the first partition member 162*a*.

The second sound limitation portion 176 may be disposed near the one or more third vibration devices 130C. The second sound limitation portion 176 may trap a reflected wave generated based on vibrations of the one or more third vibration devices 130C, thereby preventing or minimizing a reduction in a sound pressure level characteristic caused by a standing wave occurring due to interference between the reflected wave and a progressive wave.

The second sound limitation portion 176 according to an example embodiment of the present disclosure may include one or more second protrusion portions 176*a* and one or more second sound limitation members 176*b*.

The one or more second protrusion portions 176*a* may protrude toward the third space CS3 from inner surfaces of one or more of the second partition wall 161*b* and the first, second, and fourth lateral portions 152*a*, 152*b*, and 152*d* surrounding the third space CS3. For example, the one or more second protrusion portions 176*a* may face inner surfaces of one or more of the first and second lateral portions 152*a* and 152*b* between the one or more third vibration devices 130C and the second partition wall 162*a*. For example, the one or more second protrusion portions 176*a* may be toward a center portion of the one or more third vibration devices 130C from inner surfaces of one or more of the fourth lateral portion 152*d* and the second partition wall 161*b*.

According to an example embodiment of the present disclosure, the second sound limitation portion 176 may include four or more second protrusion portions 176*a* protruding toward the third space CS3 from an inner surface of each of the second partition wall 161*b* and the first, second, and fourth lateral portions 152*a*, 152*b*, and 152*d* surrounding the third space CS3. For example, the one or more second protrusion portions 176*a* protruding along the second direction Y from an inner surface of each of the first and second lateral portions 152*a* and 152*b* may be configured between the third vibration device 130C and the second sound separation portion 173. The one or more second protrusion portions 176*a* protruding along the first direction X from an inner surface of the fourth lateral portion 152*d* may protrude toward a center portion of the third vibration device 130C. The one or more second protrusion portions 176*a* protruding from an inner surface of the second partition wall 162*a* may protrude toward the center portion of the third vibration device 130C.

The one or more second sound limitation members 176*b* may be disposed between the one or more second protrusion portions 176*a* and the second surface 110*b* of the vibration member 110. For example, an upper side (or a top surface) of the one or more second sound limitation members 176*b* may be connected or coupled to the second surface 110*b* of the vibration member 110. Lower sides (or bottom surfaces) of the one or more second sound limitation members 165*b* may be connected or coupled to upper sides (or top surfaces) of the one or more second protrusion portions 176*a*. The one or more second sound limitation members 176*b* may include a material having elasticity for vibration absorption (or impact absorption), or may include the same material as that of one of the first partition member 162*a*, the second partition member 162*b*, and the connection member 140.

According to an example embodiment of the present disclosure, the second sound limitation member 176*b* and the second protrusion portion 176*a* protruding from the inner surface of each of the first, second, and fourth lateral portions 152*a*, 152*b*, and 152*d* may be configured to trap a reflected wave generated by the connection member 140. The second sound limitation member 176*b* and the second protrusion portion 176*a* protruding from the inner surface of the second partition wall 162*a* may be configured to trap a reflected wave generated by the second partition member 162*b*.

According to an example embodiment of the present disclosure, a space, where the one or more first protrusion portions 175*a* provided at the third lateral portion 152*c* and the one or more second protrusion portions 176*a* provided at the fourth lateral portion 152*d* are provided, among a space provided at the housing 150 may be configured to output a frequency of the high-pitched sound band. According to an example embodiment of the present disclosure, a space, where the one or more first protrusion portions 175*a* provided at the first lateral portion 152*a* and the second lateral portion 152*b*, the one or more second protrusion portions 176*a* provided at the first lateral portion 152*a* and the second lateral portion 152*b*, the one or more first sound limitation members 175*b*, and the one or more second sound limitation members 176*b* are provided, among the space provided at the housing 150 may be configured to output a frequency of a low-pitched sound band.

According to an example embodiment of the present disclosure, the second space CS2 where the one or more second vibration devices 130B are provided may be configured to output a frequency of a middle-low-pitched sound band.

The sound apparatus 20 according to another example embodiment of the present disclosure may further include a sound driving circuit part 180 which is disposed at the second space CS2 of the housing 150.

The sound driving circuit part 180 may generate sound data based on a sound source (or a digital sound source) supplied from the outside and may generate a vibration driving signal corresponding to the sound data, and thus, may individually or simultaneously vibrate the one or more first to third vibration devices 130A, 130B, and 130C of the vibration apparatus 130.

The sound driving circuit part 180 may include a sound data generating circuit part, which generates sound data based on the sound source (or the digital sound source) supplied from the outside, and a sound processing circuit which generates the vibration driving signal based on the sound data provided from the sound data generating circuit part and provides the vibration driving signal to the one or more first to third vibration devices 130A, 130B, and 130C of the vibration apparatus 130. In addition, the sound driving circuit part 180 according to an example embodiment of the present disclosure may further include a power generating circuit, a wireless communication circuit, and a peripheral circuit needed for driving the sound apparatus such as a battery or the like.

Additionally, the one or more second vibration devices 130B disposed at the second space CS2 of the housing 150 may be omitted, and thus, the space separation portion 160 may separate a sound output from the first space CS1 and the third space CS3, thereby more enhancing a sound output characteristic. Accordingly, the sound apparatus 20 may output a 2-channel stereo sound through the separation of left and right sounds by the space separation portion 160.

As described above, the sound apparatus 20 according to another example embodiment of the present disclosure may separate and output a sound based on a region-based vibration of the vibration member 110 corresponding to a plurality of spaces A1, A2, and A3 spatially separated by the space separation portion 160, and thus, may separate and output the sound or a channel, thereby preventing or minimizing a reduction in characteristic of a sound caused by interference of the sound. In addition, the sound apparatus 20 according to another example embodiment of the present disclosure may prevent or minimize a reduction of a sound characteristic and/or a sound pressure level characteristic caused by a reflected wave based on the trap of a reflected wave by the sound limitation portions 175 and 176. In addition, the sound apparatus 20 according to another example embodiment of the present disclosure may output a 2-channel stereo sound through the separation of left and right sounds by the space separation portion 160, and a stereo sound characteristic may be enhanced through the separation of a sound of the high-pitched sound band by the sound separation portions 171 and 173.

Figure 14:
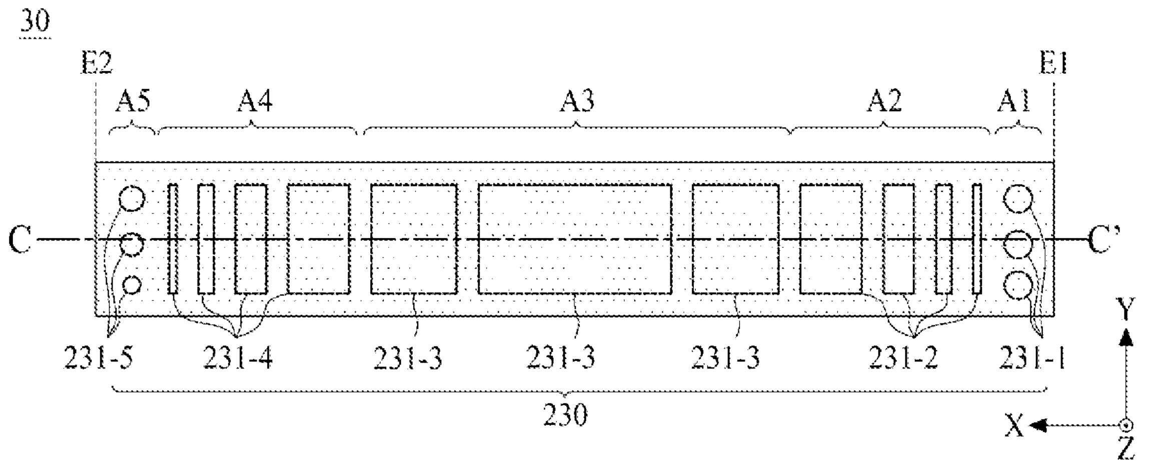
FIG. 14 is a plan view illustrating a sound apparatus according to another example embodiment of the present disclosure.
Figure 15:
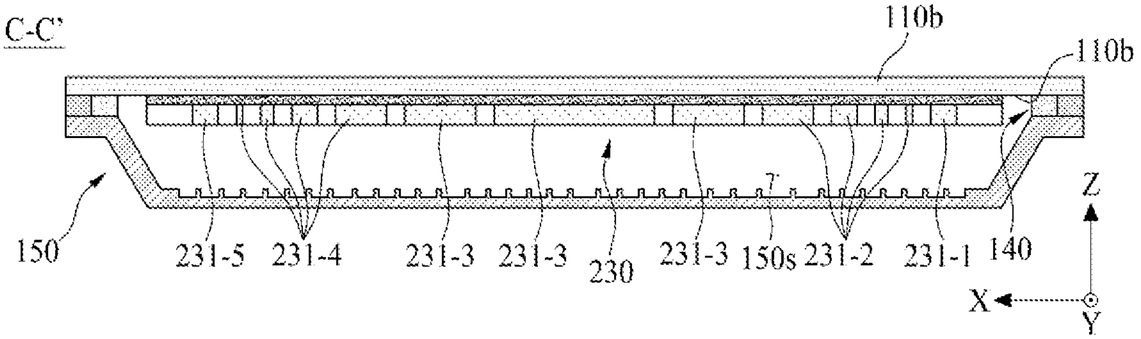
FIG. 15 is an example of a cross-sectional view taken along line C-C' illustrated in FIG. 14.
Figure 16:
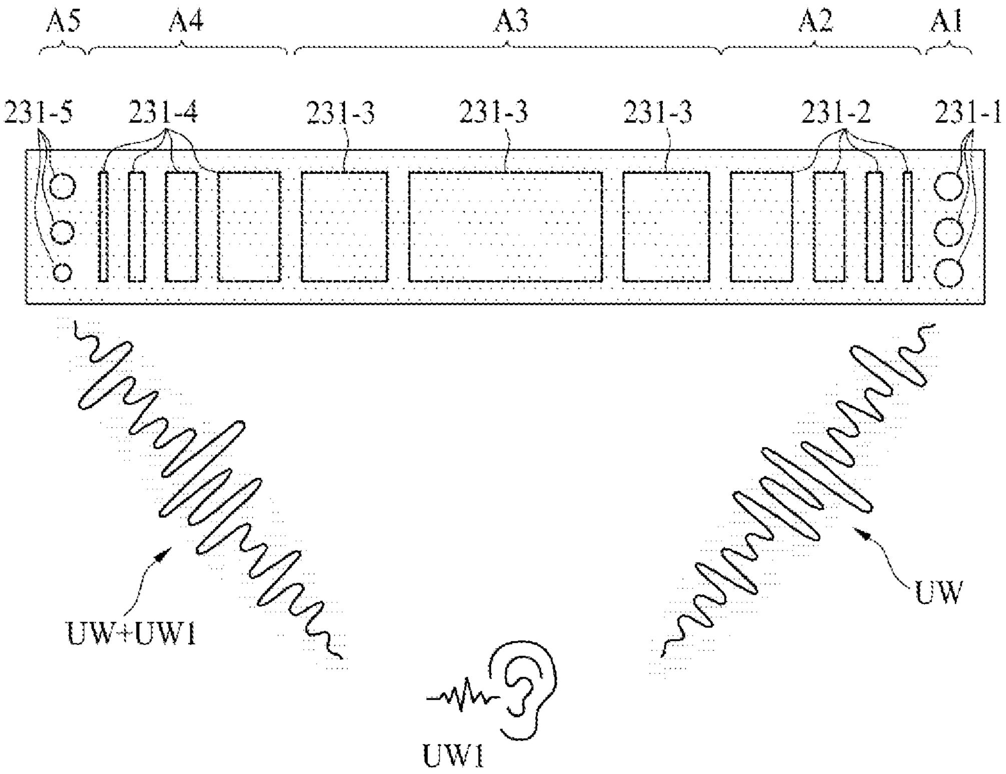
FIG. 16 is a conceptual view illustrating an orientation-based sound output from the sound apparatus according to another example embodiment of the present disclosure.

FIG. 14 is a plan view illustrating a sound apparatus 30 according to another example embodiment of the present disclosure. FIG. 15 is an example of a cross-sectional view taken along line C-C' illustrated in FIG. 14. FIG. 16 is a conceptual view illustrating an orientation-based sound output from the sound apparatus 30 according to another example embodiment of the present disclosure.

With reference to FIGS. 14 to 16, the sound apparatus 30 according to another example embodiment of the present disclosure may include a vibration member 110, a vibration apparatus 230, and a housing 150.

The vibration member 110 may be configured to be substantially the same as the vibration member illustrated in one of FIGS. 2 and 4 to 6. However, embodiments of the present disclosure are not limited thereto, and the vibration member 110 may have a plate structure where each of a first surface 110*a* and a second surface 110*b* has a planar structure.

The vibration member 110 may include a plurality regions A1 to A5. For example, the vibration member 110 may include first to $n^{th}$ (where n is a natural number of 5 or more) regions A1 to A5. For example, the vibration member 110 may include the first to fifth regions A1 to A5 arranged along a first direction X.

The vibration apparatus 230 may include one or more vibration devices 231-1 to 231-5 which are configured to respectively vibrate the first to $n^{th}$ regions A1 to A5.

Each of the first to $n^{th}$ regions A1 to A5 of the vibration member 110 may vibrate based on vibrations of the one or more vibration devices 231-1 to 231-5 to output a sound. According to an example embodiment of the present disclosure, a sound output from one region of the first to $n^{th}$ regions A1 to A5 of the vibration member 110 may have a pitched sound band which differs from that of a sound output from the other region of the first to $n^{th}$ regions A1 to A5.

According to an example embodiment of the present disclosure, the first region A1 of the vibration member 110 may include a first edge portion E1 of the vibration member 110, and the $n^{th}$ region A5 of the vibration member 110 may include a second edge portion E2 of the vibration member 110. For example, the first region A1 of the vibration member 110 may include a first periphery region of the vibration member 110, and the $n^{th}$ region A5 of the vibration member 110 may include a second periphery region of the vibration member 110.

According to an example embodiment of the present disclosure, a pitched sound band of a sound output from each of the first to $n^{th}$ regions A1 to A5 of the vibration member 110 may increase in a direction from a center region of the vibration member 110 to the first region A1 and the $n^{th}$ region A5, but embodiments of the present disclosure are not limited thereto. For example, when the vibration member 110 includes the first to fifth regions A1 to A5, a sound output from each of the first region A1 and the fifth region A5 of the vibration member 110 may have a pitched sound band of an audible frequency or more or a pitched sound band of a specific frequency signal (or an ultrasound wave), a sound output from the third region A3 at the center region of the vibration member 110 may have a middle-low-pitched sound band, and a sound output from each of the second region A2 and the fourth region A4 of the vibration member 110 may have a high-pitched sound band. For example, the middle-low-pitched sound band may be 200 Hz to 1 kHz, the high-pitched sound band may have a frequency of 1 kHz or more or 3 kHz or more, and the pitched sound band of the specific frequency signal (or the ultrasound wave) may have a frequency of 30 kHz or more, but embodiments of the present disclosure are not limited thereto. Hereinafter, in the description of the embodiments of the present specification, a specific frequency signal may be referred as an ultrasonic wave.

According to an example embodiment of the present disclosure, in the vibration member 110, a size (or an area) of each of the first to $n^{th}$ regions A1 to A5 may relatively largely increase in a direction from each of the first and $n^{th}$ regions A1 and A5 to a center region. Accordingly, the sound apparatus 30 according to another example embodiment of the present disclosure may output a sound of the middle-low-pitched sound band through the center region of the vibration member 110 having a relatively wide area and may output a sound of the high-pitched sound band through a region between the center region of the vibration member 110 and the first and $n^{th}$ regions A1 and A5, and thus, the three-dimensionality of a sound and sound quality may be larger provided to a user (or a listener).

According to an example embodiment of the present disclosure, the vibration apparatus 130 may include one or more first to $n^{th}$ vibration devices 231-1 to 231-5 configured to respectively vibrate the first to $n^{th}$ regions A1 to A5.

According to an example embodiment of the present disclosure, a size of each of the one or more first to $n^{th}$ vibration devices 231-1 to 231-5 may decrease in a direction from the center region of the vibration member 110 to the first and $n^{th}$ regions A1 and A5, but embodiments of the present disclosure are not limited thereto. In this regard, in one or more examples, the one or more first vibration devices 231-1 (at the first region A1) may have a size that is smaller than that of the one or more second vibration devices 231-2 (at the second region A2), which may have a size that is smaller than that of the one or more third vibration devices 231-3 (at the third region A3 or the center region of the vibration member 110). Further in this regard, in one or more examples, the one or more fifth vibration devices 231-5 (at the fifth region A5) may have a size that is smaller than that of the one or more fourth vibration devices 231-4 (at the fourth region A4), which may have a size that is smaller than that of the one or more third vibration devices 231-3 (at the third region A3 or the center region of the vibration member 110).

The one or more first vibration devices 231-1 may vibrate the first region A1 of the vibration member 110 to generate or output an ultrasound wave UW. The one or more $n^{th}$ vibration devices 231-5 may vibrate the $n^{th}$ region A5 of the vibration member 110 to generate or output a plurality of ultrasound waves UW and UW1 having different frequencies.

According to an example embodiment of the present disclosure, any one of the plurality of ultrasound waves UW and UW1 output from the $n^{th}$ region A5 of the vibration member 110 may have the same frequency as that of the ultrasound wave UW output from the first region A1 of the vibration member 110. The other ultrasound wave UW1 of the plurality of ultrasound waves UW and UW1 output from the $n^{th}$ region A5 of the vibration member 110 may have a frequency which is higher than that of the ultrasound wave UW output from the first region A1 of the vibration member 110. Therefore, a user (or a listener) may listen to (or hear) a difference sound having a frequency corresponding to a difference frequency distortion between the ultrasound waves UW and UW1 output from the $n^{th}$ region A5 of the vibration member 110 and the ultrasound wave UW output from the first region A1 of the vibration member 110. For example, when the ultrasound wave UW of 40 kHz is output from the first region A1 of the vibration member 110 and the ultrasound wave UW1 of 42 kHz is output from the $n^{th}$ region A5 of the vibration member 110, the listener may listen to (or hear) a difference sound of 2 kHz corresponding to a difference frequency distortion between the ultrasound wave UW of 40 kHz and the ultrasound wave UW1 of 42 kHz. Accordingly, the sound apparatus 30 according to an example embodiment of the present disclosure may output an orientation-based sound through an output of an ultrasound wave, and thus, may implement a user's privacy security function of allowing a person not to listen to (or hear) a sound in an inaudible region other than a specific audible region.

According to an example embodiment of the present disclosure, the one or more first vibration device 231-1 disposed in the first region A1 of the vibration member 110 may transmit or receive an ultrasound wave. The one or more $n^{th}$ vibration device 231-5 disposed in the $n^{th}$ region A5 of the vibration member 110 may transmit or receive an ultrasound wave. For example, the one or more first vibration device 231-1 may receive an ultrasound wave and the one or more $n^{th}$ vibration device 231-5 may transmit an ultrasound wave, but embodiments of the present disclosure are not limited thereto. Therefore, the sound apparatus 30 according to an example embodiment of the present disclosure may transmit and receive an ultrasound wave through one or more of the one or more first vibration device 231-1 and the one or more $n^{th}$ vibration device 231-5 to sense a position of a user (or a listener) and/or motion information about the user (or the listener), and thus, may output a sound or an orientation-based sound optimized for the position and/or the motion of the user (or the listener).

The housing 150 may be disposed at a rear surface of the vibration member 110 to cover the second surface 110*b* of the vibration member 110 and the vibration apparatus 230. The housing 150 may include an accommodation space 150*s* for accommodating the vibration apparatus 130 and may have a box shape where one side is opened. The housing 150 may be connected or coupled to a periphery portion of the second surface 110*b* of the vibration member 110 by a connection member 140. Accordingly, an accommodation space 150*s* of the housing 150 may be covered by the vibration member 110. The connection member 140 may be substantially the same as the connection member 140 described above with reference to FIGS. 1 to 3, and thus, like reference numerals may refer to like elements, and the repetitive description thereof may be omitted.

The housing 150 according to an example embodiment of the present disclosure may include a floor portion 151 and a lateral portion 152. The housing 150 may further include a connection frame portion 153 and a pattern portion 150*p*. The housing 150 having the above-described configuration is substantially the same as the housing 150 described with reference to FIGS. 1 to 3, and thus, like reference numerals may refer to like elements, and the repetitive description thereof may be omitted.

As described above, the sound apparatus 30 according to another example embodiment of the present disclosure may output a sound of the middle-low-pitched sound band in the center region of the vibration member 110 and may output a sound of the high-pitched sound band at a periphery portion of the vibration member 110, and thus, may larger provide the three-dimensionality of a sound and sound quality to a user (or a listener). In addition, the sound apparatus 30 according to another example embodiment of the present disclosure may output an orientation-based sound through an output of an ultrasound wave, and thus, may implement a user's privacy security function of allowing a person not to listen to a sound in an inaudible region other than a specific audible region. In addition, the sound apparatus 30 according to another example embodiment of the present disclosure may transmit and receive an ultrasound wave to output a sound or an orientation-based sound optimized for a position of the user (or the listener) and/or motion information about the user (or the listener).

Figure 17:
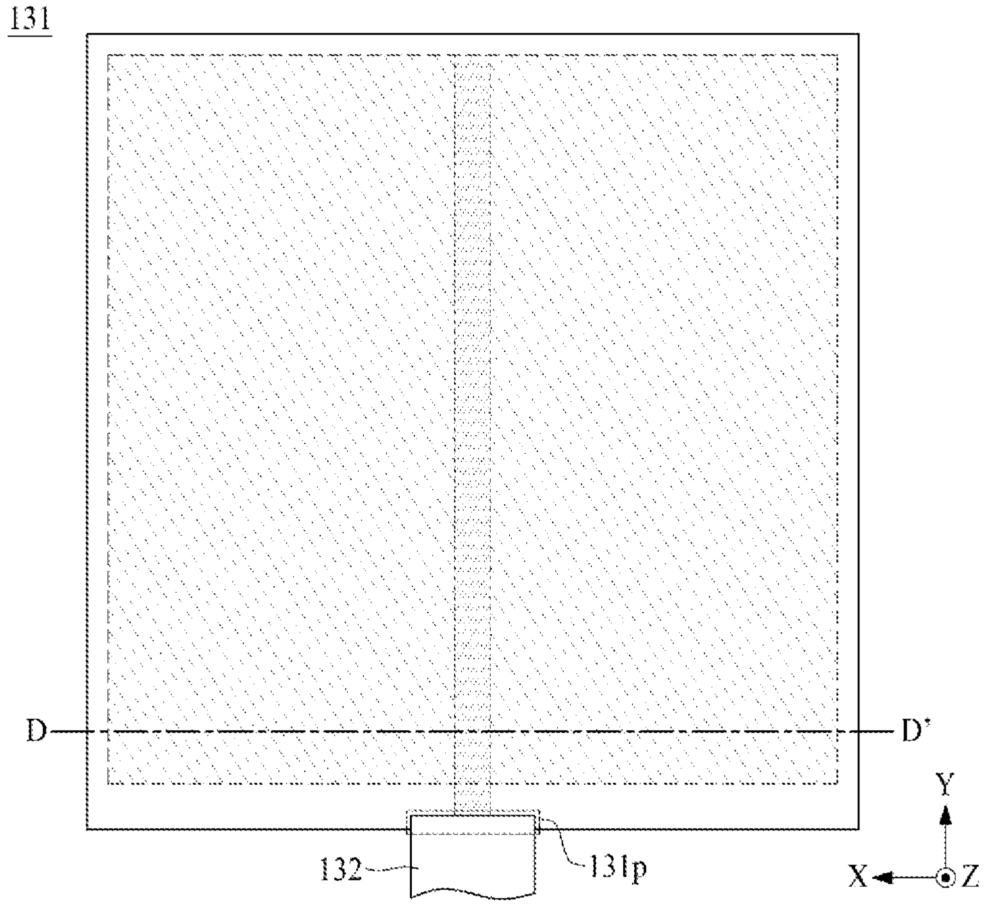
FIG. 17 illustrates a vibration device according to an example embodiment of the present disclosure.
Figure 18:
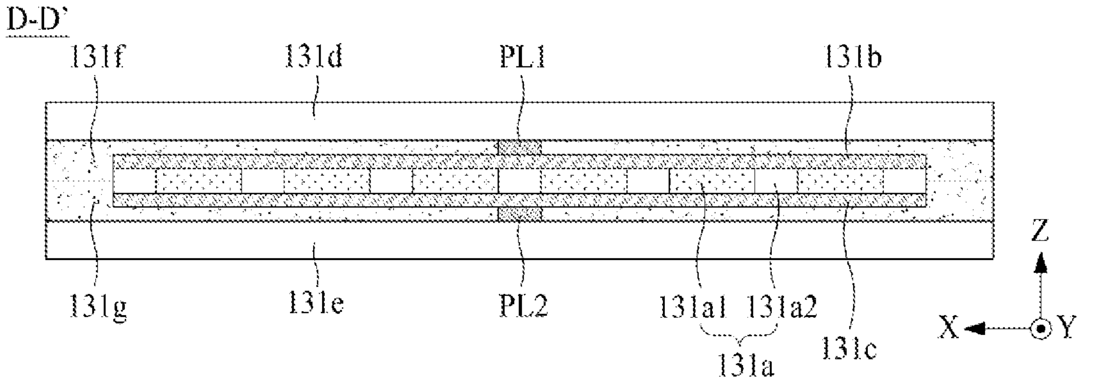
FIG. 18 is an example of a cross-sectional view taken along line D-D' illustrated in FIG. 17.
Figure 19:
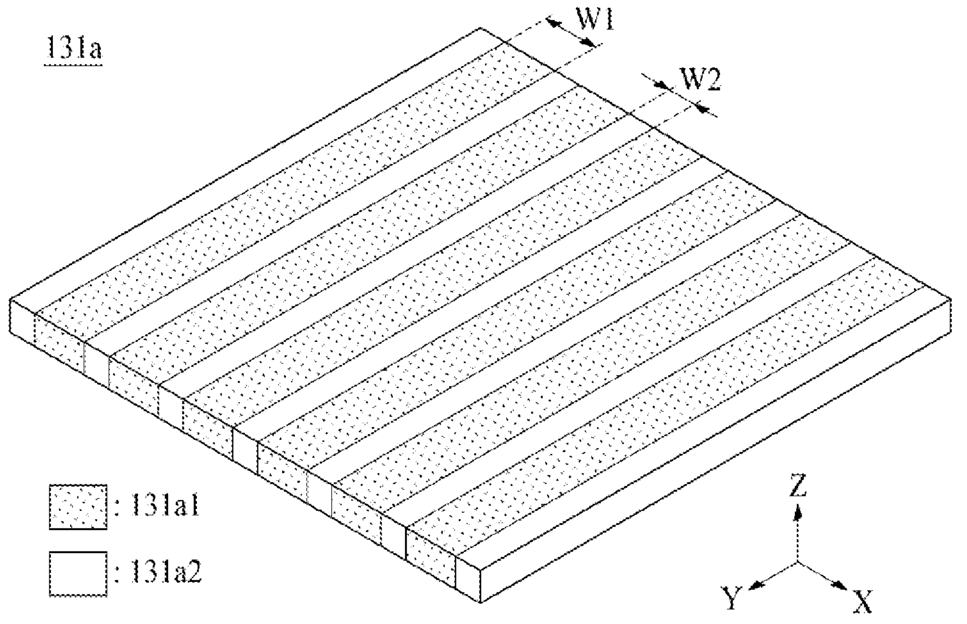
FIG. 19 is an example of a perspective view illustrating a piezoelectric vibration portion illustrated in FIG. 18.

FIG. 17 illustrates a vibration device according to an example embodiment of the present disclosure. FIG. 18 is an example of a cross-sectional view taken along line D-D' illustrated in FIG. 17. FIG. 19 illustrates an example of a piezoelectric vibration portion illustrated in FIG. 18. FIGS. 17 to 19 illustrate another embodiment of a vibration device illustrated in one or more of FIGS. 1 to 13.

With reference to FIGS. 17 to 19, a vibration device 131 according to an example embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present disclosure are not limited thereto.

The vibration device 131 according to an example embodiment of the present disclosure may include a vibration generating portion which has a piezoelectric vibration portion 131*a*, a first electrode portion 131*b*, and a second electrode portion 131*c*.

The piezoelectric vibration portion 131*a* may include a piezoelectric material (or an electroactive material) which includes a piezoelectric effect. For example, the piezoelectric material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. The piezoelectric vibration portion 131*a* may be referred to as a vibration layer, a piezoelectric layer, a piezoelectric material layer, an electroactive layer, a vibration portion, a piezoelectric material portion, an electroactive portion, a piezoelectric structure, a piezoelectric composite layer, a piezoelectric composite, or a piezoelectric ceramic composite, or the like, but embodiments of the present disclosure are not limited thereto. The piezoelectric vibration portion 131*a* may be formed of a transparent, semitransparent, or opaque piezoelectric material (or an electroactive material) and may be transparent, semitransparent, or opaque.

The piezoelectric vibration portion 131*a* according to an example embodiment of the present disclosure may include a plurality of first portions 131*a*1 and a plurality of second portions 131*a*2. For example, the plurality of first portions 131*a*1 and the plurality of second portions 131*a*2 may be alternately and repeatedly arranged along a first direction X (or a second direction Y). For example, the first direction X may be a widthwise direction of the piezoelectric vibration portion 131*a*, the second direction Y may be a lengthwise direction of the piezoelectric vibration portion 131*a*, but embodiments of the present disclosure are not limited thereto. For example, the first direction X may be the lengthwise direction of the piezoelectric vibration portion 131*a*, and the second direction Y may be the widthwise direction of the piezoelectric vibration portion 131*a*.

Each of the plurality of first portions 131*a*1 may be configured as an inorganic material portion. The inorganic material portion may include a piezoelectric material, a composite piezoelectric material, or an electroactive material which includes a piezoelectric effect. For example, the first portions 131*a*1 may be referred to as a piezoelectric portion, a piezoelectric material portion, a composite piezoelectric material portion, an active portion, or an electroactive portion, but embodiments of the present disclosure are not limited thereto.

Each of the plurality of first portions 131*a*1 may be configured as a ceramic-based material for generating a relatively high vibration, or may be configured as a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A", and "B" may be cations, and "0" may be anions. For example, each of the plurality of first portions 131*a*1 may include one of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The first portions 131*a*1 of the piezoelectric vibration portion 131*a* according to an example embodiment of the present disclosure may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. In addition, the first portions 131*a*1 of the piezoelectric vibration portion 131*a* may include at least one or more of calcium titanate ($CaTiO_3$), $BaTiO_3$, and $SrTiO_3$, each without lead (Pb), but embodiments of the present disclosure are not limited thereto.

Each of the plurality of first portions 131*a*1 according to an example embodiment of the present disclosure may be disposed between the plurality of second portions 131*a*2 and may have a first width W1 parallel to the first direction X (or the second direction Y) and a length parallel to the second direction Y (or the first direction X). Each of the plurality of second portions 131*a*2 may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 131*a*1 and the second portion 131*a*2 may include a line shape or a stripe shape which has the same size or different sizes. Therefore, the piezoelectric vibration portion 131*a* may include a 2-2 composite structure having a piezoelectric characteristic of a 2-2 vibration mode, and thus, may have a resonance frequency of 20 kHz or less, but embodiments of the present disclosure are not limited thereto. For example, a resonance frequency of the piezoelectric vibration portion 131*a* may vary based on at least one or more of a shape, a length, and a thickness, or the like.

In the piezoelectric vibration portion 131*a*, each of the plurality of first portions 131*a*1 and the plurality of second portions 131*a*2 may be disposed (or arranged) at the same plane (or the same layer) in parallel. Each of the plurality of second portions 131*a*2 may be configured to fill a gap between two adjacent first portions of the plurality of first portions 131*a*1 and may be connected or adhered to a second portion 131*a*2 adjacent thereto. Therefore, the piezoelectric vibration portion 131*a* may extend by a desired size or length based on the side coupling (or connection) of the first portion 131*a*1 and the second portion 131*a*2.

In the piezoelectric vibration portion 131*a*, a width (or a size) W2 of each of the plurality of second portions 131*a*2 may progressively decrease in a direction from a center portion to both peripheries (or both ends) of the piezoelectric vibration portion 131*a* or the vibration device 131.

According to an example embodiment of the present disclosure, a second portion 131*a*2, having a largest width W2 among the plurality of second portions 131*a*2, may be located at a portion at which a highest stress may concentrate when the piezoelectric vibration portion 131*a* or the vibration device 131 vibrates (or is vibrating) in a vertical direction Z (or a thickness direction). A second portion 131*a*2, having a smallest width W2 among the plurality of second portions 131*a*2, may be located at a portion where a relatively low stress may occur when the piezoelectric vibration portion 131*a* or the vibration device 131 vibrates (or is vibrating) in the vertical direction Z. For example, the second portion 131*a*2, having the largest width W2 among the plurality of second portions 131*a*2, may be disposed at the center portion of the piezoelectric vibration portion 131*a*, and the second portion 131*a*2, having the smallest width W2 among the plurality of second portions 131*a*2 may be disposed at each of the both peripheries of the piezoelectric vibration portion 131*a*. Therefore, when the piezoelectric vibration portion 131*a* or the vibration device 131 vibrates (or is vibrating) in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band.

In the piezoelectric vibration portion 131*a*, each of the plurality of first portions 131*a*1 may have different sizes (or widths). For example, a size (or a width) of each of the plurality of first portions 131*a*1 may progressively decrease or increase in a direction from the center portion to the both peripheries (or both ends) of the piezoelectric vibration portion 131*a* or the vibration device 131. For example, in the piezoelectric vibration portion 131*a*, a sound pressure level characteristic of a sound may be enhanced and a sound reproduction band may increase, based on various natural vibration frequencies according to a vibration of each of the plurality of first portions 131*a*1 having different sizes.

The plurality of second portions 131*a*2 may be disposed between the plurality of first portions 131*a*1. Therefore, in the piezoelectric vibration portion 131*a* or the vibration device 131, vibration energy by a link in a unit lattice of each first portion 131*a*1 may increase by a corresponding second portion 131*a*2, and thus, a vibration characteristic may increase, and a piezoelectric characteristic and flexibility may be secured. For example, the second portion 131*a*2 may include one or more of an epoxy-based polymer, an acrylic-based polymer, and a silicone-based polymer, but embodiments of the present disclosure are not limited thereto.

The plurality of second portions 131*a*2 according to an example embodiment of the present disclosure may be configured as an organic material portion. For example, the organic material portion may be disposed between the inorganic material portions, and thus, may absorb an impact applied to the inorganic material portion (or the first portion), may release a stress concentrating on the inorganic material portion to enhance the total durability of the piezoelectric vibration portion 131*a* or the vibration device 131, and may provide flexibility to the piezoelectric vibration portion 131*a* or the vibration device 131.

The plurality of second portions 131*a*2 according to an example embodiment of the present disclosure may have a modulus (or Young's modulus) and viscoelasticity that are lower than those of each first portion 131*a*1, and thus, the second portion 131*a*2 may enhance the reliability of each first portion 131*a*1 vulnerable to an impact due to a fragile characteristic. For example, the second portion 131*a*2 may be configured as a material having a loss coefficient of about 0.01 to about 1 and modulus of about 0.1 GPa (Giga pascal) to about 10 GPa (Giga pascal).

The organic material portion configured at the second portion 131*a*2 may include one or more of an organic material, an organic polymer, an organic piezoelectric material, or an organic non-piezoelectric material that has a flexible characteristic in comparison with the inorganic material portion of the first portions 131*a*1. For example, the second portion 131*a*2 may be referred to as an adhesive portion, an elastic portion, a bending portion, a damping portion, or a flexible portion each having flexibility, but embodiments of the present disclosure are not limited thereto.

The plurality of first portions 131*a*1 and the second portion 131*a*2 may be disposed on (or connected to) the same plane, and thus, the piezoelectric vibration portion 131*a* according to an example embodiment of the present disclosure may have a single thin film-type. For example, the piezoelectric vibration portion 131*a* may have a structure in which a plurality of first portions 131*a*1 are connected to one side. For example, the plurality of first portions 131*a*1 may have a structure connected to a whole the piezoelectric vibration portion 131*a*. For example, the piezoelectric vibration portion 131*a* may be vibrated in a vertical direction by the first portion 131*a*1 having a vibration characteristic and may be bent in a curved shape by the second portion 131*a*2 having flexibility. In addition, in the piezoelectric vibration portion 131*a* according to an example embodiment of the present disclosure, a size of the first portion 131*a*1 and a size of the second portion 131*a*2 may be adjusted based on a piezoelectric characteristic and flexibility needed for the piezoelectric vibration portion 131*a* or the vibration device 131. As an example embodiment of the present disclosure, when the piezoelectric vibration portion 131*a* needs a piezoelectric characteristic rather than flexibility, a size of the first portion 131*a*1 may be adjusted to be greater than that of the second portion 131*a*2. As another example embodiment of the present disclosure, when the piezoelectric vibration portion 131*a* needs flexibility rather than a piezoelectric characteristic, a size of the second portion 131*a*2 may be adjusted to be greater than that of the first portion 131*a*1. Accordingly, a size of the piezoelectric vibration portion 131*a* may be adjusted based on a characteristic needed therefor, and thus, the piezoelectric vibration portion 131*a* may be easy to design.

The first electrode portion 131*b* may be disposed at a first surface (or an upper surface) of the piezoelectric vibration portion 131*a*. The first electrode portion 131*b* may be disposed at or coupled to a first surface of each of a plurality of first portions 131*a*1 and a first surface of each of a plurality of second portions 131*a*2 in common and may be electrically connected to the first surface of each of the plurality of first portions 131*a*1. For example, the first electrode portion 131*b* may be a single-body electrode (or a common electrode) shape which is disposed at a whole first surface of the piezoelectric vibration portion 131*a*. For example, the first electrode portion 131*b* may have substantially the same shape as that of the piezoelectric vibration portion 131*a*, but embodiments of the present disclosure are not limited thereto.

The first electrode portion 131*b* according to an example embodiment of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), Mg, or the like, or an alloy thereof, but embodiments of the present disclosure are not limited thereto.

The second electrode portion 131*c* may be disposed at a second surface (or a rear surface) different from (or opposite to) the first surface of the piezoelectric vibration portion 131*a*. The second electrode portion 131*c* may be disposed at or coupled to a second surface of each of a plurality of first portions 131*a*1 and the second surface of each of a plurality of second portions 131*a*2 in common and may be electrically connected to a second surface of each of the plurality of first portions 131*a*1. For example, the second electrode portion 131*c* may be a single-body electrode (or a common electrode) shape which is disposed at a whole second surface of the piezoelectric vibration portion 131*a*. The second electrode portion 131*c* may have the same shape as the piezoelectric vibration portion 131*a*, but embodiments of the present disclosure are not limited thereto. The second electrode portion 131*c* according to an example embodiment of the present disclosure may be formed of a transparent conductive material, a semitransparent conductive material, or an opaque conductive material. For example, the second electrode portion 131*c* may be formed of the same material as the first electrode portion 131*b*, but embodiments of the present disclosure are not limited thereto. As another example embodiment of the present disclosure, the second electrode portion 131*c* may be formed of a different material than the first electrode portion 131*b*.

The piezoelectric vibration portion 131*a* may be polarized by a certain voltage applied to the first electrode portion 131*b* and the second electrode portion 131*c* in a certain temperature atmosphere, or a temperature atmosphere that may be changed from a high temperature to a room temperature, but embodiments of the present disclosure are not limited thereto. For example, the piezoelectric vibration portion 131*a* may alternately and repeatedly contract and expand based on an inverse piezoelectric effect according to a sound signal (or a voice signal) applied to the first electrode portion 131*b* and the second electrode portion 131*c* from the outside to vibrate. For example, the piezoelectric vibration portion 131*a* may vibrate based on a vertical-direction vibration d33 and a planar direction vibration d31 by the first electrode portion 131*b* and the second electrode portion 131*c*. The piezoelectric vibration portion 131*a* may increase the displacement of a vibration member (or a vibration plate or a vibration object) by contraction and expansion of the planar direction, thereby further improving the vibration.

The vibration device 131 according to an example embodiment of the present disclosure may further include a first cover member 131*d* and a second cover member 131*e*.

The first cover member 131*d* may be disposed at the first surface of the vibration device 131. For example, the first cover member 131*d* may be configured to cover the first electrode portion 131*b*. Accordingly, the first cover member 131*d* may protect the first electrode portion 131*b* and/or the piezoelectric vibration portion 131*a*.

The second cover member 131*e* may be disposed at the second surface of the vibration device 131. For example, the second cover member 131*e* may be configured to cover the second electrode portion 131*c*. Accordingly, the second cover member 131*e* may protect the second electrode portion 131*c* and/or the piezoelectric vibration portion 131*a*.

The first cover member 131*d* and the second cover member 131*e* according to an example embodiment of the present disclosure may each include one or more material of a plastic, a fiber, and wood, but embodiments of the present disclosure are not limited thereto. For example, each of the first cover member 131*d* and the second cover member 131*e* may include the same or different material. For example, each of the first cover member 131*d* and the second cover member 131*e* may be a polyimide (PI) film or a polyethylene terephthalate (PET) film, but embodiments of the present disclosure are not limited thereto.

The first cover member 131*d* according to an example embodiment of the present disclosure may be connected or coupled to the first electrode portion 131*b* by a first adhesive layer 131*f*. For example, the first cover member 131*d* may be connected or coupled to the first electrode portion 131*b* by a film laminating process using the first adhesive layer 131*f*.

The second cover member 131*e* according to an example embodiment of the present disclosure may be connected or coupled to the second electrode portion 131*c* by a second adhesive layer 131*g*. For example, the second cover member 131*e* may be connected or coupled to the second electrode portion 131*c* by a film laminating process using the second adhesive layer 131*g*.

The first adhesive layer 131*f* may be disposed between the first electrode portion 131*b* and the first cover member 131*d*. The second adhesive layer 131*g* may be disposed between the second electrode portion 131*c* and the second cover member 131*e*. For example, the first adhesive layer 131*f* and second adhesive layer 131*g* may be configured between the first cover member 131*d* and the second cover member 131*e* to completely surround the piezoelectric vibration portion 131*a*, the first electrode portion 131*b*, and the second electrode portion 131*c*. For example, the piezoelectric vibration portion 131*a*, the first electrode portion 131*b*, and the second electrode portion 131*c* may be embedded or built-in between the first adhesive layer 131*f* and the second adhesive layer 131*g*.

Each of the first adhesive layer 131*f* and second adhesive layer 131*g* according to an example embodiment of the present disclosure may include an electric insulating material which has adhesiveness and is capable of compression and decompression. For example, each of the first adhesive layer 131*f* and the second adhesive layer 131*g* may include an epoxy resin, an acrylic resin, a silicone resin, or a urethane resin, but embodiments of the present disclosure are not limited thereto.

According to an example embodiment of the present disclosure, any one of the first cover member 131*d* and the second cover member 131*e* may be attached to or coupled to the vibration member (or the vibration plate or the vibration object) by an adhesive member 120. For example, any one of the first cover member 131*d* and the second cover member 131*e* may be attached on or coupled to the vibration member 110 by the adhesive member 120 as described above with reference to FIGS. 1 to 13.

The vibration device 131 according to an example embodiment of the present disclosure may further include a first power supply line PL1, a second power supply line PL2, and a pad part 131*p*.

The first power supply line PL1 may be disposed between the first electrode portion 131*b* and the first cover member 131*d* and may be electrically connected to the first electrode portion 131*b*. For example, the first power supply line PL1 may be disposed at the first cover member 131*d*. The first power supply line PL1 may be extended long in the second direction Y and may be electrically connected to a central portion of the first electrode portion 131*b*. As an example embodiment of the present disclosure, the first power supply line PL1 may be electrically connected to the first electrode portion 131*b* by an anisotropic conductive film. As another example embodiment of the present disclosure, the first power supply line PL1 may be electrically connected to the first electrode portion 131*b* through a conductive material (or particle) included in the first adhesive layer 131*f*.

The second power supply line PL2 may be disposed between the second electrode portion 131*c* and the second cover member 131*e* and may be electrically connected to the second electrode portion 131*c*. For example, the second power supply line PL2 may be disposed at the second cover member 131*e*. The second power supply line PL2 may be extended long along the second direction Y and may be electrically connected to a central portion of the second electrode portion 131*c*. As an example embodiment of the present disclosure, the second power supply line PL2 may be electrically connected to the second electrode portion 131*c* by an anisotropic conductive film. As another example embodiment of the present disclosure, the second power supply line PL2 may be electrically connected to the second electrode portion 131*c* through a conductive material (or particle) included in the second adhesive layer 131*g*. For example, the second power supply line PL2 may be disposed not to overlap the first power supply line PL1. When the second power supply line PL2 is disposed not to overlap the first power supply line PL1, a short circuit between the first power supply line PL1 and the second power supply line PL2 may be prevented.

The pad part 131*p* may be configured to be electrically connected to the first power supply line PL1 and the second power supply line PL2. The pad part 131*p* may be configured at one periphery portion of any one of the first cover member 131*d* and the second cover member 131*e* to be electrically connected to one portion (or one end) of each of the first power supply line PL1 and the second power supply line PL2.

The pad part 131*p* according to an example embodiment of the present disclosure may include a first pad electrode electrically connected to one end of the first power supply line PL1, and a second pad electrode electrically connected to one end of the second power supply line PL2.

The first pad electrode may be disposed at one periphery portion of any one of the first cover member 131*d* and the second cover member 131*e* to be electrically connected to one portion of the first power supply line PL1. For example, the first pad electrode may pass through any one of the first cover member 131*d* and the second cover member 131*e* to be electrically connected to one portion of the first power supply line PL1.

The second pad electrode may be disposed in parallel with the first pad electrode to be electrically connected to one portion of the second power supply line PL2. For example, the second pad electrode may pass through any one of the first cover member 131*d* and the second cover member 131*e* to be electrically connected to one portion of the second power supply line PL2.

According to an example embodiment of the present disclosure, each of the first power supply line PL1, the second power supply line PL2, and the pad part 131*p* may be configured to be transparent, translucent, or opaque.

The pad part 131*p* according to another example embodiment of the present disclosure may be electrically connected to a signal cable 132.

The signal cable 132 may be electrically connected to the pad part 131*p* disposed at the vibration device 131 and may supply the vibration device 131 with vibration driving signals (or a sound signal or a voice signal) provided from a sound processing circuit. The signal cable 132 according to an example embodiment of the present disclosure may include a first terminal electrically connected to the first pad electrode of the pad part 131*p* and a second terminal electrically connected to the second pad electrode of the pad part 131*p*. For example, the signal cable 132 may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data provided from an external sound data generating circuit part. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode portion 131*b* through a first terminal of the signal cable 132, the first pad electrode of the pad part 131*p*, and the first power supply line PL1. The second vibration driving signal may be supplied to the second electrode portion 131*c* through a second terminal of the signal cable 132, the second pad electrode of the pad part 131*p*, and the second power supply line PL2.

According to an example embodiment of the present disclosure, the signal cable 132 may be configured to be transparent, semitransparent, or opaque.

As described above, the vibration device 131 according to an example embodiment of the present disclosure may be implemented as a thin film type where the first portion 131*a*1 having a piezoelectric characteristic and a second portion 131*a*2 having flexibility are alternately repeated and connected, and thus, may be bent in a shape corresponding to a shape of the vibration member or the vibration object. For example, when the vibration device 131 is connected or coupled to the vibration member including various curved portions by an adhesive member 120, the vibration device 131 may be bent in a curved shape along a shape of a curved portion of the vibration member and reliability against damage or breakdown may not be reduced despite being bent in a curved shape.

FIGS. 20A to 20D are perspective views illustrating a piezoelectric vibration portion according to another example embodiment of the present disclosure, in vibration device according to an example embodiment of the present disclosure.

Figure 20A:
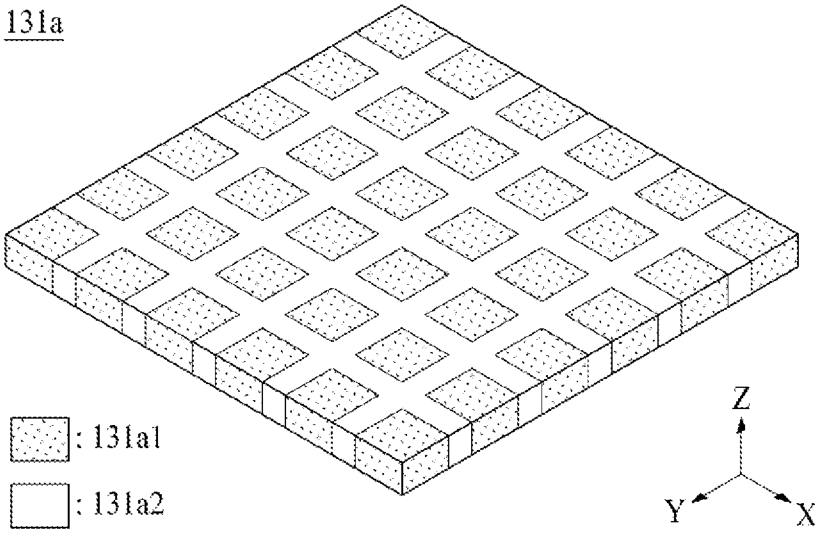
FIG. 20A is a perspective view illustrating a piezoelectric vibration portion according to another example embodiment of the present disclosure.

With reference to FIG. 20A, the piezoelectric vibration portion 131*a* according to another example embodiment of the present disclosure may include a plurality of first portions 131*a*1, which are spaced apart from one another along a first direction X and a second direction Y, and a second portion 131*a*2 (or one or more second portions) disposed between the plurality of first portions 131*a*1.

Each of the plurality of first portions 131*a*1 may be disposed to be spaced apart from one another along the first direction X and the second direction Y. For example, each of the plurality of first portions 131*a*1 may have a hexahedral shape (or a six-sided object shape) having the same size and may be disposed in a lattice shape. Each of the plurality of first portions 131*a*1 may include a piezoelectric material which is be substantially the same as the first portion 131*a*1 described above with reference to FIGS. 17 to 19, and thus, like reference numerals may refer to like elements, and their repetitive descriptions may be omitted.

The second portion 131*a*2 may be disposed between the plurality of first portions 131*a*1 along each of the first direction X and the second direction Y. The second portion 131*a*2 may be configured to fill a gap or a space between two adjacent first portions 131*a*1 or to surround each of the plurality of first portions 131*a*1, and thus, may be connected or adhered to an adjacent first portion 131*a*1. According to an example embodiment of the present disclosure, a width of a second portion 131*a*2 disposed between two first portions 131*a*1 adjacent to each other along the first direction X may be the same as or different from that of a width of the first portion 131*a*1, and the width of a second portion 131*a*2 disposed between two first portions 131*a*1 adjacent to each other along the second direction Y may be the same as or different from that of the width of the first portion 131*a*1. The second portion 131*a*2 may include an organic material which is be substantially the same as the second portion 131*a*2 described above with reference to FIGS. 17 to 19, and thus, like reference numerals may refer to like elements, and their repetitive descriptions may be omitted.

As described above, the piezoelectric vibration portion 131*a* according to another example embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, a resonance frequency of the piezoelectric vibration portion 131*a* may vary based on at least one or more of a shape, a length, and a thickness, or the like.

Figure 20B:
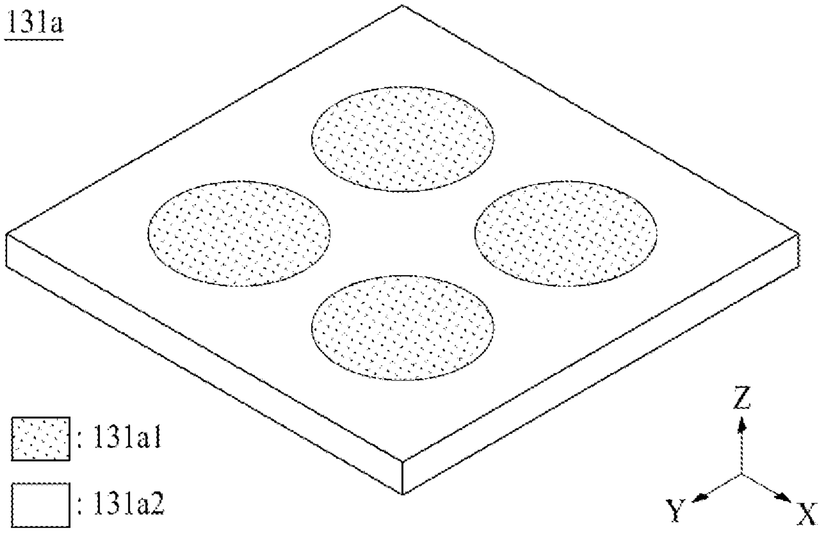
FIG. 20B is a perspective view illustrating a piezoelectric vibration portion according to another example embodiment of the present disclosure.

With reference to FIG. 20B, the piezoelectric vibration portion 131*a* according to another example embodiment of the present disclosure may include a plurality of first portions 131*a*1, which are spaced apart from one another along a first direction X and a second direction Y, and a second portion (or one or more second portions) 131*a*2 disposed between the plurality of first portions 131*a*1.

Each of the plurality of first portions 131*a*1 may have a flat structure of a circular shape. For example, each of the plurality of first portions 131_a_1 may have a circular plate shape, but embodiments of the present disclosure are not limited thereto. For example, each of the plurality of first portions 131_a_1 may have a dot shape including an oval shape, a polygonal shape, or a donut shape. Each of the plurality of first portions 131_a_1 may include a piezoelectric material which is be substantially the same as the first portion 131_a_1 described above with reference to FIGS. 17 to 19, and thus, like reference numerals may refer to like elements, and their repetitive descriptions may be omitted.

The second portion 131_a_2 may be disposed between the plurality of first portions 131_a_1 along each of the first direction X and the second direction Y. The second portion 131_a_2 may be configured to surround each of the plurality of first portions 131_a_1, and thus, may be connected or adhered to a side surface of each of the plurality of first portions 131_a_1. Each of the plurality of first portions 131_a_1 and the second portion 131_a_2 may be disposed (or arranged) in parallel on the same plane (or the same layer). The second portion 131_a_2 may include an organic material which is be substantially the same as the second portion 131_a_2 described above with reference to FIGS. 17 to 19, and thus, like reference numerals may refer to like elements, and their repetitive descriptions may be omitted.

Figure 20C:
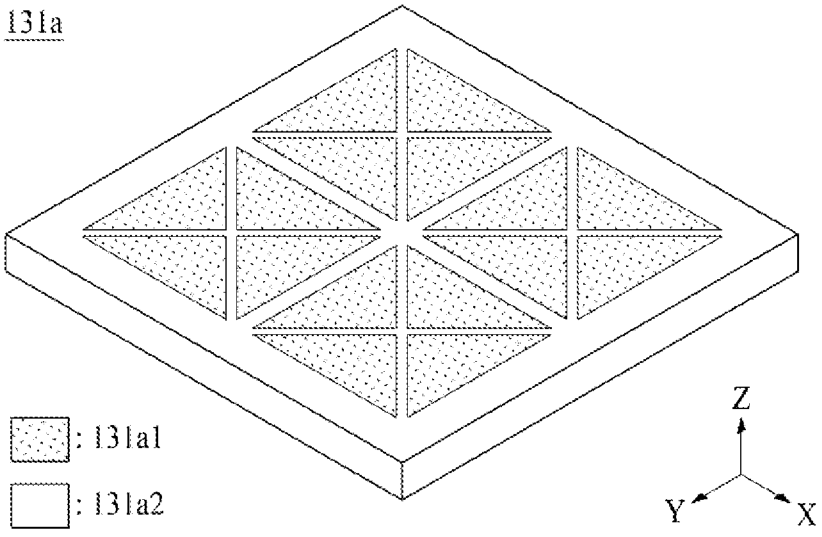
FIG. 20C is a perspective view illustrating a piezoelectric vibration portion according to another example embodiment of the present disclosure.

With reference to FIG. 20C, the piezoelectric vibration portion 131_a_ according to another example embodiment of the present disclosure may include a plurality of first portions 131_a_1, which are spaced apart from one another along a first direction X and a second direction Y, and a second portion (or one or more second portions) 131_a_2 disposed between the plurality of first portions 131_a_1.

Each of the plurality of first portions 131_a_1 may have a flat structure of a triangular shape. For example, each of the plurality of first portions 131_a_1 may have a triangular plate shape, but embodiments of the present disclosure are not limited thereto. Each of the plurality of first portions 131_a_1 may include a piezoelectric material which is be substantially the same as the first portion 131_a_1 described above with reference to FIGS. 17 to 19, and thus, like reference numerals may refer to like elements, and their repetitive descriptions may be omitted.

According to an example embodiment of the present disclosure, four adjacent first portions 131_a_1 among the plurality of first portions 131_a_1 may be adjacent to one another to form a tetragonal (or quadrilateral shape or a square shape). Vertices of the four adjacent first portions 131_a_1 forming a tetragonal shape may be adjacent to one another in a center portion (or a central portion) of the tetragonal shape.

The second portion 131_a_2 may be disposed between the plurality of first portions 131_a_1 along each of the first direction X and the second direction Y. The second portion 131_a_2 may be configured to surround each of the plurality of first portions 131_a_1, and thus, may be connected or adhered to a side surface of each of the plurality of first portions 131_a_1. Each of the plurality of first portions 131_a_1 and the second portion 131_a_2 may be disposed (or arranged) in parallel on the same plane (or the same layer). The second portion 131_a_2 may include an organic material which is be substantially the same as the second portion 131_a_2 described above with reference to FIGS. 17 to 19, and thus, like reference numerals may refer to like elements, and their repetitive descriptions may be omitted.

Figure 20D:
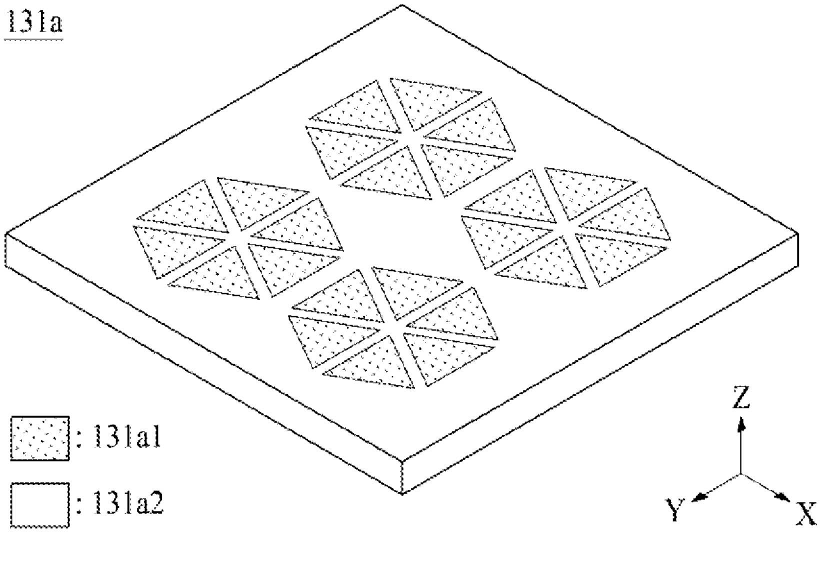
FIG. 20D is a perspective view illustrating a piezoelectric vibration portion according to another example embodiment of the present disclosure.

With reference to FIG. 20D, the piezoelectric vibration portion 131_a_ according to another example embodiment of the present disclosure may include a plurality of first portions 131_a_1, which are spaced apart from one another along a first direction X and a second direction Y, and a second portion (or one or more second portions) 131_a_2 disposed between the plurality of first portions 131_a_1.

Each of the plurality of first portions 131_a_1 may have a flat structure of a triangular shape. For example, each of the plurality of first portions 131_a_1 may have a triangular plate shape, but embodiments of the present disclosure are not limited thereto. Each of the plurality of first portions 131_a_1 may include a piezoelectric material which is be substantially the same as the first portion 131_a_1 described above with reference to FIGS. 17 to 19, and thus, like reference numerals may refer to like elements, and their repetitive descriptions may be omitted.

According to another example embodiment of the present disclosure, six adjacent first portions 131_a_1 of the plurality of first portions 131_a_1 may be adjacent to one another to form a hexagonal shape (or a regularly hexagonal shape). Vertices of the six adjacent first portions 131_a_1 forming a hexagonal shape may be adjacent to one another in a center portion (or a central portion) of the hexagonal shape.

The second portion 131_a_2 may be disposed between the plurality of first portions 131_a_1 along each of the first direction X and the second direction Y. The second portion 131_a_2 may be configured to surround each of the plurality of first portions 131_a_1, and thus, may be connected or adhered to a side surface of each of the plurality of first portions 131_a_1. Each of the plurality of first portions 131_a_1 and the second portion 131_a_2 may be disposed (or arranged) in parallel on the same plane (or the same layer). The second portion 131_a_2 may include an organic material which is be substantially the same as the second portion 131_a_2 described above with reference to FIGS. 17 to 19, and thus, like reference numerals may refer to like elements, and their repetitive descriptions may be omitted.

Figure 21:
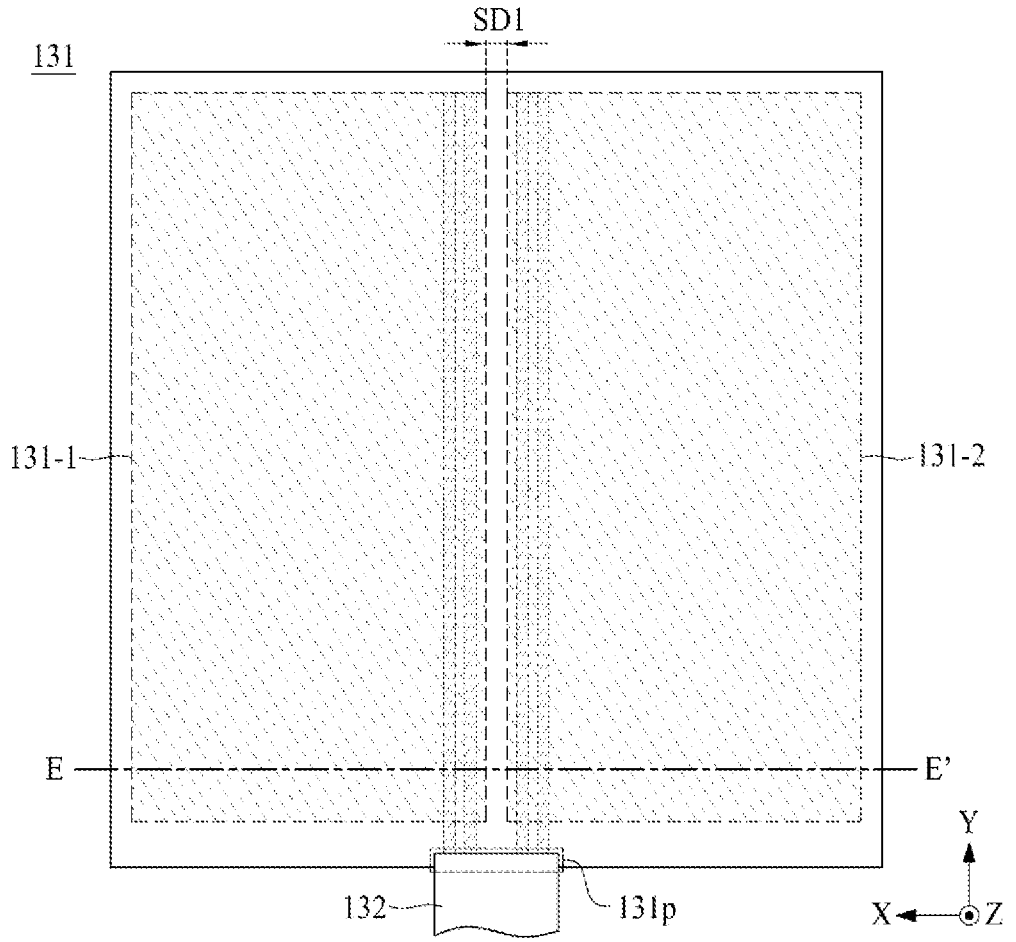
FIG. 21 illustrates a vibration device according to another example embodiment of the present disclosure.
Figure 22:
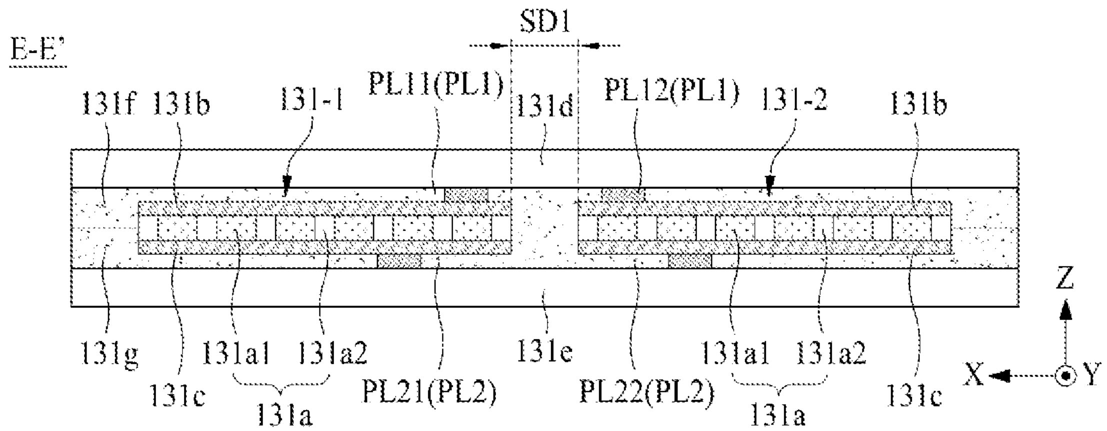
FIG. 22 is an example of a cross-sectional view taken along line E-E' illustrated in FIG. 21.

FIG. 21 illustrates a vibration device according to another example embodiment of the present disclosure. FIG. 22 is an example of a cross-sectional view taken along line E-E' illustrated in FIG. 21. FIGS. 21 and 22 illustrate another example embodiment where the vibration device illustrated in one or more of FIGS. 1 to 13 is modified.

With reference to FIGS. 21 and 22, the vibration device 131 according to another example embodiment of the present disclosure may include first and second vibration generating portions 131-1 and 131-2.

Each of the first and second vibration generating portions 131-1 and 131-2 may be electrically separated and disposed while being spaced apart from each other along a first direction X. Each of the first and second vibration generating portions 131-1 and 131-2 may alternately and repeatedly contract and/or expand based on a piezoelectric effect to vibrate. For example, the first and second vibration generating portions 131-1 and 131-2 may be disposed or tiled at a certain interval (or distance) SD1 along the first direction X. Thus, the vibration device 131 in which the first and second vibration generating portions 131-1 and 131-2 are tiled may be a vibration array, a vibration array portion, a vibration module array portion, a vibration array structure, a tiling vibration array, a tiling vibration array module, or a tiling vibration film, but embodiments of the present disclosure are not limited thereto.

Each of the first and second vibration generating portions 131-1 and 131-2 according to an example embodiment of the present disclosure may have a tetragonal shape. For example, each of the first and second vibration generating portions 131-1 and 131-2 may have a tetragonal shape having a width of about 5 cm or more. For example, each of the first and second vibration generating portions 131-1 and

131-2 may have a square shape having a size of 5 cm×5 cm or more, but embodiments of the present disclosure are not limited thereto.

Each of the first and second vibration generating portions 131-1 and 131-2 may be arranged or tiled on the same plane, and thus, the vibration device 131 may have an enlarged area based on tiling of the first and second vibration generating portions 131-1 and 131-2 having a relatively small size.

Each of the first and second vibration generating portions 131-1 and 131-2 may be arranged or tiled at a certain interval (or distance) SD1, and thus, may be implemented as one vibration apparatus (or a single vibration apparatus) which is driven as one complete single-body without being independently driven. According to an example embodiment of the present disclosure, with respect to the first direction X, a first separation distance (or first distance or first interval) SD1 between the first and second vibration generating portions 131-1 and 131-2 may be 0.1 mm or more and less than 3 cm, but embodiments of the present disclosure are not limited thereto.

According to an example embodiment of the present disclosure, each of the first and second vibration generating portions 131-1 and 131-2 may be disposed or tiled to have the first separation distance (or an interval) SD1 of 0.1 mm or more and less than 3 cm, and thus, may be driven as one vibration apparatus, thereby increasing a reproduction band of a sound and a sound pressure level characteristic of a sound which is generated based on a single-body vibration of the first and second vibration generating portions 131-1 and 131-2. For example, the first and second vibration generating portions 131-1 and 131-2 may be disposed in an interval SD1 of 0.1 mm or more and less than 5 mm, in order to increase a reproduction band of a sound generated based on a single-body vibration of the first and second vibration generating portions 131-1 and 131-2 and to increase a sound of a low-pitched sound band (for example, a sound pressure level characteristic in 500 Hz or less).

According to an example embodiment of the present disclosure, when the first and second vibration generating portions 131-1 and 131-2 are disposed in the interval SD1 of less than 0.1 mm or without the interval SD1, the reliability of the first and second vibration generating portions 131-1 and 131-2 or the vibration device 131 may be reduced due to damage or a crack caused by a physical contact therebetween which occurs when each of the first and second vibration generating portions 131-1 and 131-2 vibrates.

According to an example embodiment of the present disclosure, when the first and second vibration generating portions 131-1 and 131-2 are disposed in the interval SD1 of 3 cm or more, the first and second vibration generating portions 131-1 and 131-2 may not be driven as one vibration apparatus due to an independent vibration of each of the first and second vibration generating portions 131-1 and 131-2. Therefore, a reproduction band of a sound and a sound pressure level characteristic of a sound which is generated based on vibrations of the first and second vibration generating portions 131-1 and 131-2 may be reduced. For example, when the first and second vibration generating portions 131-1 and 131-2 are disposed in the interval SD1 of 3 cm or more, a sound characteristic and a sound pressure level characteristic of the low-pitched sound band (for example, in 500 Hz or less) may each be reduced.

According to an example embodiment of the present disclosure, when the first and second vibration generating portions 131-1 and 131-2 are disposed in an interval SD1 of 5 mm, each of the first and second vibration generating portions 131-1 and 131-2 may not be perfectly driven as one vibration apparatus, and thus, a sound characteristic and a sound pressure level characteristic of the low-pitched sound band (for example, in 200 Hz or less) may each be reduced.

According to another example embodiment of the present disclosure, when the first and second vibration generating portions 131-1 and 131-2 are disposed in an interval SD1 of 1 mm, each of the first and second vibration generating portions 131-1 and 131-2 may be driven as one vibration apparatus, and thus, a reproduction band of a sound may increase and a sound of the low-pitched sound band (for example, a sound pressure level characteristic in 500 Hz or less) may increase. For example, when the first and second vibration generating portions 131-1 and 131-2 are disposed in an interval SD1 of 1 mm, the vibration device 131 may be implemented as a large-area vibrator which is enlarged based on optimization of a separation distance between the first and second vibration generating portions 131-1 and 131-2. Therefore, the vibration device 131 may be driven as a large-area vibrator based on a single-body vibration of the first and second vibration generating portions 131-1 and 131-2, and thus, a sound characteristic and a sound pressure level characteristic may each increase a reproduction band of a sound and in the low-pitched sound band generated based on a large-area vibration of the vibration device 131.

Therefore, to implement a single-body vibration (or one vibration apparatus) of the first and second vibration generating portions 131-1 and 131-2, a separation distance SD1 between the first and second vibration generating portions 131-1 and 131-2 may be adjusted to 0.1 mm or more and less than 3 cm. In addition, to implement a single-body vibration (or one vibration apparatus) of the first and second vibration generating portions 131-1 and 131-2 and to increase a sound pressure level characteristic of a sound of the low-pitched sound band, the separation distance SD1 between the first and second vibration generating portions 131-1 and 131-2 may be adjusted to 0.1 mm or more and less than 5 mm.

Each of the first and second vibration generating portions 131-1 and 131-2 according to an example embodiment of the present disclosure may include a piezoelectric vibration portion 131*a*, a first electrode portion 131*b*, and a second electrode portion 131*c*.

The piezoelectric vibration portion 131*a* of each of the first and second vibration generating portions 131-1 and 131-2 may include a piezoelectric material (or an electroactive material) including a piezoelectric effect. For example, the piezoelectric vibration portion 131*a* of each of the first and second vibration generating portions 131-1 and 131-2 may be configured substantially the same as any one of the piezoelectric vibration portion 131*a* described above with reference to FIGS. 19 and 20A to 20D, and thus, like reference numerals may refer to like elements, and the repetitive description thereof may be omitted.

According to an example embodiment of the present disclosure, each of the first and second vibration generating portions 131-1 and 131-2 may include any one piezoelectric vibration portion 131*a* of the piezoelectric vibration portion 131*a* described above with reference to FIGS. 19 and 20A to 20D, or may include different piezoelectric vibration portion 131*a*.

The first electrode portion 131*b* may be disposed at a first surface of the piezoelectric vibration portion 131*a* and may be electrically connected to the first surface of the piezoelectric vibration portion 131*a*. For example, the first electrode portion 131*b* may be substantially the same as the first electrode portion 131*b* described above with reference to FIG. 18, and thus, like reference numerals may refer to like elements, and the repetitive description thereof may be omitted.

The second electrode portion 131*c* may be disposed at a second surface of the piezoelectric vibration portion 131*a* and electrically connected to the second surface of the piezoelectric vibration portion 131*a*. The second electrode portion 131*c* may be substantially the same as the second electrode portion 131*c* described above with reference to FIG. 18, and thus, like reference numerals may refer to like elements, and the repetitive description thereof may be omitted.

The vibration device 131 according to another example embodiment of the present disclosure may further include a first cover member 131*d* and a second cover member 131*e*.

The first cover member 131*d* may be disposed at the first surface of the vibration device 131. For example, the first cover member 131*d* may cover the first electrode portion 131*b* which is disposed at a first surface of each of the first and second vibration generating portions 131-1 and 131-2, and thus, the first cover member 131*d* may be connected to the first surface of each of the first and second vibration generating portions 131-1 and 131-2 in common or may support the first surface of each of the first and second vibration generating portions 131-1 and 131-2 in common. Accordingly, the first cover member 131*d* may protect the first surface or the first electrode portion 131*b* of each of the first and second vibration generating portions 131-1 and 131-2.

The second cover member 131*e* may be disposed at the second surface of the vibration device 131. For example, the second cover member 131*e* may cover the second electrode portion 131*c* which is disposed at a second surface of each of the first and second vibration generating portions 131-1 and 131-2, and thus, the second cover member 131*e* may be connected to the second surface of each of the first and second vibration generating portions 131-1 and 131-2 in common or may support the second surface of each of the first and second vibration generating portions 131-1 and 131-2 in common. Accordingly, the second cover member 131*e* may protect the second surface or the second electrode portion 131*c* of each of the first and second vibration generating portions 131-1 and 131-2.

The first cover member 131*d* and the second cover member 131*e* according to an example embodiment of the present disclosure may each include one or more materials of plastic, fiber, and wood, but embodiments of the present disclosure are not limited thereto. For example, each of the first cover member 131*d* and the second cover member 131*e* may include the same material or different material. For example, each of the first cover member 131*d* and the second cover member 131*e* may be a polyimide (PI) film or a polyethylene terephthalate (PET) film, but embodiments of the present disclosure are not limited thereto.

The first cover member 131*d* according to an example embodiment of the present disclosure may be disposed at the first surface of each of the first and second vibration generating portions 131-1 and 131-2 by a first adhesive layer 131*f*. For example, the first cover member 131*d* may be directly disposed at the first surface of each of the first and second vibration generating portions 131-1 and 131-2 by a film laminating process using the first adhesive layer 131*f*. Accordingly, each of the first and second vibration generating portions 131-1 and 131-2 may be integrated (or disposed) or tiled with the first cover member 131*d* to have the certain interval SD1.

The second cover member 131*e* according to an example embodiment of the present disclosure may be disposed at the second surface of each of the first and second vibration generating portions 131-1 and 131-2 by a second adhesive layer 131*g*. For example, the second cover member 131*e* may be directly disposed at the second surface of each of the first and second vibration generating portions 131-1 and 131-2 by a film laminating process using the second adhesive layer 131*g*. Accordingly, each of the first and second vibration generating portions 131-1 and 131-2 may be integrated (or disposed) or tiled with the second cover member 131*e* to have the certain interval SD1.

The first adhesive layer 131*f* may be disposed between the first and second vibration generating portions 131-1 and 131-2 and disposed at the first surface of each of the first and second vibration generating portions 131-1 and 131-2. For example, the first adhesive layer 131*f* may be formed at a rear surface (or an inner surface) of the first cover member 131*d* facing the first surface of each of the first and second vibration generating portions 131-1 and 131-2, filled between the first and second vibration generating portions 131-1 and 131-2, and disposed between at the first cover member 131*d* and the first surface of each of the first and second vibration generating portions 131-1 and 131-2.

The second adhesive layer 131*g* may be disposed between the first and second vibration generating portions 131-1 and 131-2 and disposed at the second surface of each of the first and second vibration generating portions 131-1 and 131-2. For example, the second adhesive layer 131*g* may be formed at a front surface (or an inner surface) of the second cover member 131*e* facing the second surface of each of the first and second vibration generating portions 131-1 and 131-2, filled between the first and second vibration generating portions 131-1 and 131-2, and disposed between at the second cover member 131*e* and the second surface of each of the first and second vibration generating portions 131-1 and 131-2.

The first and second adhesive layers 131*f* and 131*g* may be connected or coupled to each other between the first and second vibration generating portions 131-1 and 131-2. Therefore, each of the first and second vibration generating portions 131-1 and 131-2 may be surrounded by the first and second adhesive layers 131*f* and 131*g*. For example, the first and second adhesive layers 131*f* and 131*g* may be configured between the first cover member 131*d* and the second cover member 131*e* to completely surround the first and second vibration generating portions 131-1 and 131-2. For example, each of the first and second vibration generating portions 131-1 and 131-2 may be embedded or built-in between the first adhesive layer 131*f* and the second adhesive layer 131*g*.

Each of the first and second adhesive layers 131*f* and 131*g* according to an example embodiment of the present disclosure may include an electric insulating material which has adhesiveness and is capable of compression and decompression. For example, each of the first and second adhesive layers 131*f* and 131*g* may include an epoxy resin, an acrylic resin, a silicone resin, or a urethane resin, but embodiments of the present disclosure are not limited thereto. Each of the first and second adhesive layers 131*f* and 131*g* may be configured to be transparent, translucent, or opaque.

The vibration device 131 according to another example embodiment of the present disclosure may further include a first power supply line PL1, a second power supply line PL2, and a pad part 131*p*.

The first power supply line PL1 may be disposed at the first cover member 131*d*. The first power supply line PL1 may be disposed at the rear surface of the first cover member 131*d* facing the first surface of each of the first and second vibration generating portions 131-1 and 131-2. The first power supply line PL1 may be electrically connected to the first electrode portion 131*b* of each of the first and second vibration generating portions 131-1 and 131-2. For example, the first power supply line PL1 may be electrically and directly connected to the first electrode portion 131*b* of each of the first and second vibration generating portions 131-1 and 131-2. As an example embodiment of the present disclosure, the first power supply line PL1 may be electrically connected to the first electrode portion 131*b* of each of the first and second vibration generating portions 131-1 and 131-2 by an anisotropic conductive film. As another example embodiment of the present disclosure, the first power supply line PL1 may be electrically connected to the first electrode portion 131*b* of each of the first and second vibration generating portions 131-1 and 131-2 through a conductive material (or particle) included in the first adhesive layer 131*f*.

The first power supply line PL1 according to an example embodiment of the present disclosure may include first and second upper power lines PL11 and PL12 disposed along a second direction Y. For example, the first upper power line PL11 may be electrically connected to the first electrode portion 131*b* of the first vibration generating portion 131-1. The second upper power line PL12 may be electrically connected to the first electrode portion 131*b* of the second vibration generating portion 131-2.

The second power supply line PL2 may be disposed at the second cover member 131*e*. The second power supply line PL2 may be disposed at the front surface of the second cover member 131*e* facing the second surface of each of the first and second vibration generating portions 131-1 and 131-2. The second power supply line PL2 may be electrically connected to the second electrode portion 131*c* of each of the first and second vibration generating portions 131-1 and 131-2. For example, the second power supply line PL2 may be electrically and directly connected to the second electrode portion 131*c* of each of the first and second vibration generating portions 131-1 and 131-2. As an example embodiment of the present disclosure, the second power supply line PL2 may be electrically connected to the second electrode portion 131*c* of each of the first and second vibration generating portions 131-1 and 131-2 by an anisotropic conductive film. As another example embodiment of the present disclosure, the second power supply line PL2 may be electrically connected to the second electrode portion 131*c* of each of the first and second vibration generating portions 131-1 and 131-2 through a conductive material (or particle) included in the second adhesive layer 131*g*.

The second power supply line PL2 according to an example embodiment of the present disclosure may include first and second lower power lines PL21 and PL22 disposed along a second direction Y. For example, the first lower power line PL21 may be electrically connected to the second electrode portion 131*c* of the first vibration generating portion 131-1. For example, the first lower power line PL21 may be overlapped the first upper power line PL11. For example, the first lower power line PL21 may be disposed not to overlap the first upper power line PL11. When the first lower power line PL21 is disposed not to overlap the first upper power line PL11, a short circuit between the first power supply line PL1 and the second power supply line PL2 may be prevented. The second lower power line PL22 may be electrically connected to the second electrode portion 131*c* of the second vibration generating portion 131-2. For example, the second lower power line PL22 may be overlapped the second upper power line PL12. For example, the second lower power line PL22 may be disposed not to overlap the second upper power line PL12. When the second lower power line PL22 is disposed not to overlap the second upper power line PL12, a short circuit between the first power supply line PL1 and the second power supply line PL2 may be prevented.

The pad part 131*p* may be configured to be electrically connected to the first power supply line PL1 and the second power supply line PL2. The pad part 131*p* may be configured at one periphery portion of any one of the first cover member 131*d* and the second cover member 131*e* to be electrically connected to one portion (or one end) of each of the first power supply line PL1 and the second power supply line PL2.

The pad part 131*p* according to an example embodiment of the present disclosure may include a first pad electrode electrically connected to one end of the first power supply line PL1, and a second pad electrode electrically connected to one end of the second power supply line PL2.

The first pad electrode may be connected to one portion of each of the first and second upper power lines PL11 and PL12 of the first power supply line PL1 in common. For example, the one portion of each of the first and second upper power lines PL11 and PL12 may branch from the first pad electrode. The second pad electrode may be connected to one portion of each of the first and second lower power lines PL21 and PL22 of the second power supply line PL2 in common. For example, the one portion of each of the first and second lower power lines PL21 and PL22 may branch from the second pad electrode.

The vibration device 131 according to another example embodiment of the present disclosure may further include a signal cable 132.

The signal cable 132 may be electrically connected to the pad part 131*p* disposed at the vibration device 131 and may supply the vibration device 131 with a vibration driving signal (or a sound signal or a voice signal) provided from a sound processing circuit. The signal cable 132 according to an example embodiment of the present disclosure may include a first terminal electrically coupled to the first pad electrode of the pad part 131*p* and a second terminal electrically coupled to the second pad electrode of the pad part 131*p*. For example, the signal cable 132 may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode portion 131*b* of each of the first and second vibration generating portions 131-1 and 131-2 through a first terminal of the signal cable 132, the first pad electrode of the pad part 131*p*, and the first power supply line PL1. The second vibration driving signal may be supplied to the second electrode portion 131*c* of each of the first and second vibration generating portions 131-1 and 131-2 through a second terminal of the signal cable 132, the second pad electrode of the pad part 131*p*, and the second power supply line PL2.

As described above, like the vibration device 131 described above with reference to FIGS. 17 to 19, the vibration device 131 according to another example embodiment of the present disclosure may be implemented as a thin film type, and thus, may be bent in a shape corresponding to a shape of the vibration member or the vibration object and may easily vibrate the vibration member including various curved portions, thereby enhancing a sound characteristic and/or a sound pressure level characteristic in the low-pitched sound band generated based on a vibration of the vibration member. In addition, the vibration device 131 according to another example embodiment of the present disclosure may include the first and second vibration generating portions 131-1 and 131-2 which are arranged (or tiled) at a certain interval SD1, so as to be implemented as a single vibration body without being independently driven, and thus, may be driven as a large-area vibration body based on a single-body vibration of the first and second vibration generating portions 131-1 and 131-2.

Figure 23:
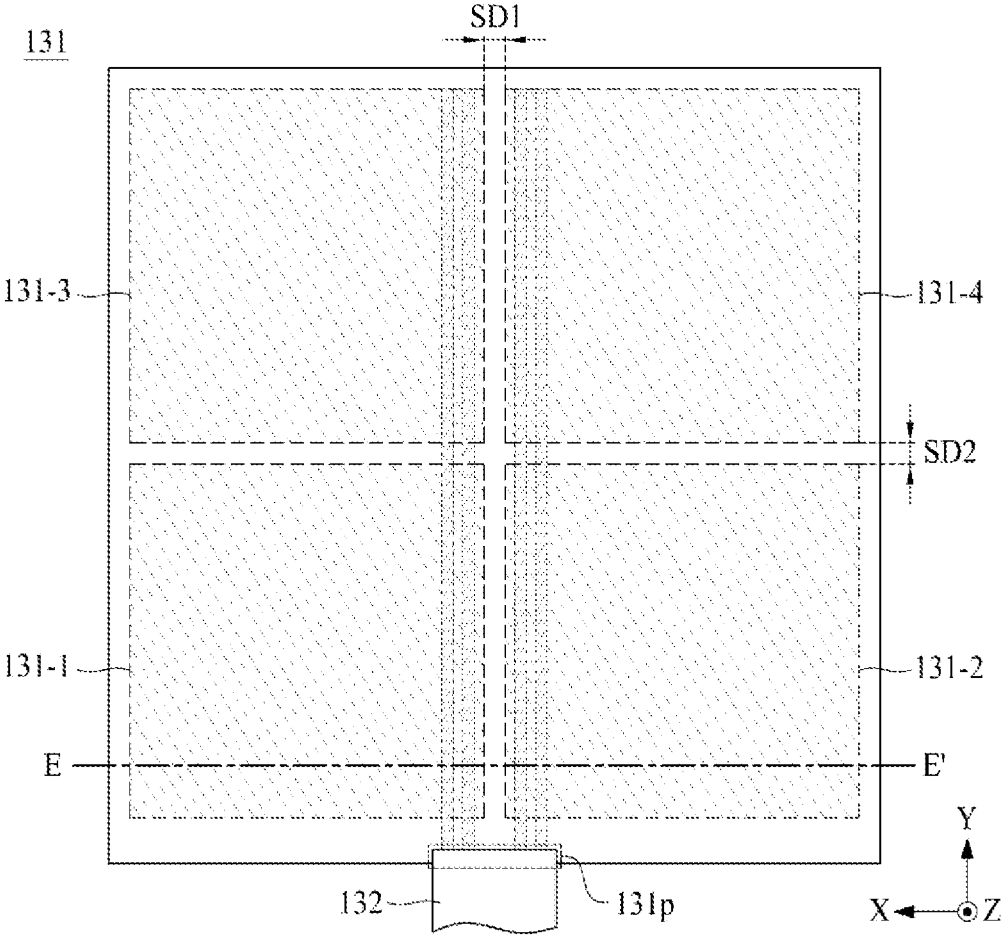
FIG. 23 illustrates a vibration device according to another example embodiment of the present disclosure.

FIG. 23 illustrates a vibration device according to another example embodiment of the present disclosure. FIG. 23 illustrates an example embodiment where four vibration generating portions are provided in the vibration device illustrated in FIGS. 21 and 22. Hereinafter, therefore, the elements except four vibration generating portions and relevant elements may be referred to by like reference numerals, and their repetitive descriptions may be omitted or will be briefly given. An example of a cross-sectional surface taken along line E-E' illustrated in FIG. 23 is illustrated in FIG. 22.

With reference to FIG. 23 in conjunction with FIG. 22, the vibration device 131 according to another example embodiment of the present disclosure may include a plurality of vibration generating portions 131-1 to 131-4.

The plurality of vibration generating portions 131-1 to 131-4 may be electrically disconnected and disposed spaced apart from one another along a first direction X and a second direction Y. For example, the plurality of vibration generating portions 131-1 to 131-4 may be arranged or tiled in an i×j form on the same plane, and thus, the vibration device 131 may be implemented to have a large area based on tiling of the plurality of vibration generating portions 131-1 to 131-4 having a relatively small size. For example, i may be the number of vibration generating portions disposed in the first direction X and may be a natural number of 2 or more, and j may be the number of vibration generating portions disposed along the second direction Y and may be a natural number of 2 or more which is the same as or different from i. For example, the plurality of vibration generating portions 131-1 to 131-4 may be arranged or tiled in a 2×2 form, but embodiments of the present disclosure are not limited thereto. Hereinafter, an example where the vibration device 131 includes first to fourth vibration generating portions 131-1 to 131-4 will be described.

According to an example embodiment of the present disclosure, the first and second vibration generating portions 131-1 and 131-2 may be spaced apart from each other along the first direction X. The third and fourth vibration generating portions 131-3 and 131-4 may be spaced apart from each other along the first direction X and may be spaced apart from each of the first and second vibration generating portions 131-1 and 131-2 along the second direction Y. The first and third vibration generating portions 131-1 and 131-3 may be spaced apart from each other along the second direction Y to face each other. The second and fourth vibration generating portions 131-2 and 131-4 may be spaced apart from each other along the second direction Y to face each other.

The first to fourth vibration generating portions 131-1 to 131-4 may be disposed between the first cover member 131*d* and the second cover member 131*e*. For example, each of the first cover member 131*d* and the second cover member 131*e* may be connected to the first to fourth vibration generating portions 131-1 to 131-4 in common or may support the first to fourth vibration generating portions 131-1 to 131-4 in common, and thus, may drive the first to fourth vibration generating portions 131-1 to 131-4 as one vibration apparatus (or a single vibration apparatus). For example, the first to fourth vibration generating portions 131-1 to 131-4 may be tiled in a certain interval by the cover members 131*d* and 131*e*, and thus, may be driven as one vibration apparatus (or a single vibration apparatus).

According to an example embodiment of the present disclosure, as described above with reference to FIGS. 21 and 22, in order to a complete single body vibration or a large-area vibration, the first to fourth vibration generating portions 131-1 to 131-4 may be disposed (or tiled) at the intervals SD1 and SD2 of 0.1 mm or more and less than 3 cm or may be disposed (or tiled) at the intervals SD1 and SD2 0.1 mm or more and less than 5 mm along each of the first direction X and the second direction Y.

Each of the first to fourth vibration generating portions 131-1 to 131-4 may include a piezoelectric vibration portion 131*a*, a first electrode portion 131*b*, and a second electrode portion 131*c*.

The piezoelectric vibration portion 131*a* of each of the first to fourth vibration generating portions 131-1 to 131-4 may include a piezoelectric material (or an electroactive material) including a piezoelectric effect. The piezoelectric vibration portion 131*a* of each of the first to fourth vibration generating portions 131-1 to 131-4 may be configured substantially the same as any one of the piezoelectric vibration portion 131*a* described above with reference to FIGS. 19 and 20A to 20D, and thus, like reference numerals may refer to like elements, and the repetitive description thereof may be omitted.

According to an example embodiment of the present disclosure, each of the first to fourth vibration generating portions 131-1 to 131-4 may include any one piezoelectric vibration portion 131*a* of the piezoelectric vibration portion 131*a* described above with reference to FIGS. 19 and 20A to 20D, or may include different piezoelectric vibration portion 131*a*.

According to another example embodiment of the present disclosure, one or more of the first to fourth vibration generating portions 131-1 to 131-4 may include different piezoelectric vibration portion 131*a* of the piezoelectric vibration portion 131*a* described above with reference to FIGS. 19 and 20A to 20D.

The first electrode portion 131*b* may be disposed at a first surface of the corresponding piezoelectric vibration portion 131*a* and electrically connected to the first surface of the piezoelectric vibration portion 131*a*. The first electrode portion 131*b* may be substantially the same as the first electrode portion 131*b* described above with reference to FIG. 18, and thus, like reference numerals may refer to like elements, and the repetitive description thereof may be omitted.

The second electrode portion 131*c* may be disposed at a second surface of the corresponding piezoelectric vibration portion 131*a* and electrically connected to the second surface of the piezoelectric vibration portion 131*a*. The second electrode portion 131*c* may be substantially the same as the second electrode portion 131*c* described above with reference to FIG. 18, and thus, like reference numerals may refer to like elements, and the repetitive description thereof may be omitted.

According to an example embodiment of the present disclosure, first and second adhesive layers 131*f* and 131*g* may be connected or coupled to each other between first to fourth vibration generating portions 131-1 to 131-4. Therefore, each of the first to fourth vibration generating portions 131-1 to 131-4 may be surrounded by the first and second adhesive layers 131*f* and 131*g*. For example, the first and second adhesive layers 131*f* and 131*g* may be configured between a first cover member 131*d* and a second cover member 131*e* to completely surround each of the first to fourth vibration generating portions 131-1 to 131-4. For example, each of the first to fourth vibration generating portions 131-1 to 131-4 may be embedded or built-in between the first adhesive layer 131*f* and the second adhesive layer 131*g*.

The vibration device 131 according to another example embodiment of the present disclosure may further include a first power supply line PL1, a second power supply line PL2, and a pad part 131*p*.

Except for an electrical connection structure between the first and second power supply lines PL1 and PL2 and the first to fourth vibration generating portions 131-1 to 131-4, the first and second power supply lines PL1 and PL2 may be substantially the same as the first and second power supply lines PL1 and PL2 described above with reference to FIGS. 21 and 22, and thus, only the electrical connection structure between the first and second power supply lines PL1 and PL2 and the first to fourth vibration generating portions 131-1 to 131-4 will be briefly described below.

The first power supply line PL1 according to an example embodiment of the present disclosure may include first and second upper power lines PL11 and PL12 disposed along a second direction Y. For example, the first upper power line PL11 may be electrically connected to the first electrode portion 131*b* of each of the first and third vibration generating portions 131-1 and 131-3 (or a first group or a first vibration generating group) disposed at a first row parallel to a second direction Y among the first to fourth vibration generating portions 131-1 to 131-4. The second upper power line PL12 may be electrically connected to the first electrode portion 131*b* of each of the second and fourth vibration generating portions 131-2 and 131-4 (or a second group or a second vibration generating group) disposed at a second row parallel to the second direction Y among the first to fourth vibration generating portions 131-1 to 131-4.

The second power supply line PL2 according to an example embodiment of the present disclosure may include first and second lower power lines PL21 and PL22 disposed along a second direction Y. For example, the first lower power line PL21 may be electrically connected to the second electrode portion 131*c* of each of the first and third vibration generating portions 131-1 and 131-3 (or the first group or the first vibration generating group) disposed at the first row parallel to the second direction Y among the first to fourth vibration generating portions 131-1 to 131-4. The second lower power line PL22 may be electrically connected to the second electrode portion 131*c* of each of the second and fourth vibration generating portions 131-2 and 131-4 (or the second group or the second vibration generating group) disposed at the second row parallel to the second direction Y among the first to fourth vibration generating portions 131-1 to 131-4.

The pad part 131*p* may be configured at one periphery portion of any one among the first cover member 131*d* and the second cover member 131*e* so as to be electrically connected to one side (or one end) of each of the first and second power supply lines PL1 and PL2. The pad part 131*p* may be substantially the same as the pad part 131*p* illustrated in FIGS. 21 and 22, and thus, like reference numerals may refer to like elements, and the repetitive description thereof may be omitted.

As described above, the vibration device 131 according to another example embodiment of the present disclosure may have the same effect as that of the vibration device 131 described above with reference to FIGS. 17 to 22, and thus, the repetitive description thereof may be omitted.

Figure 24:
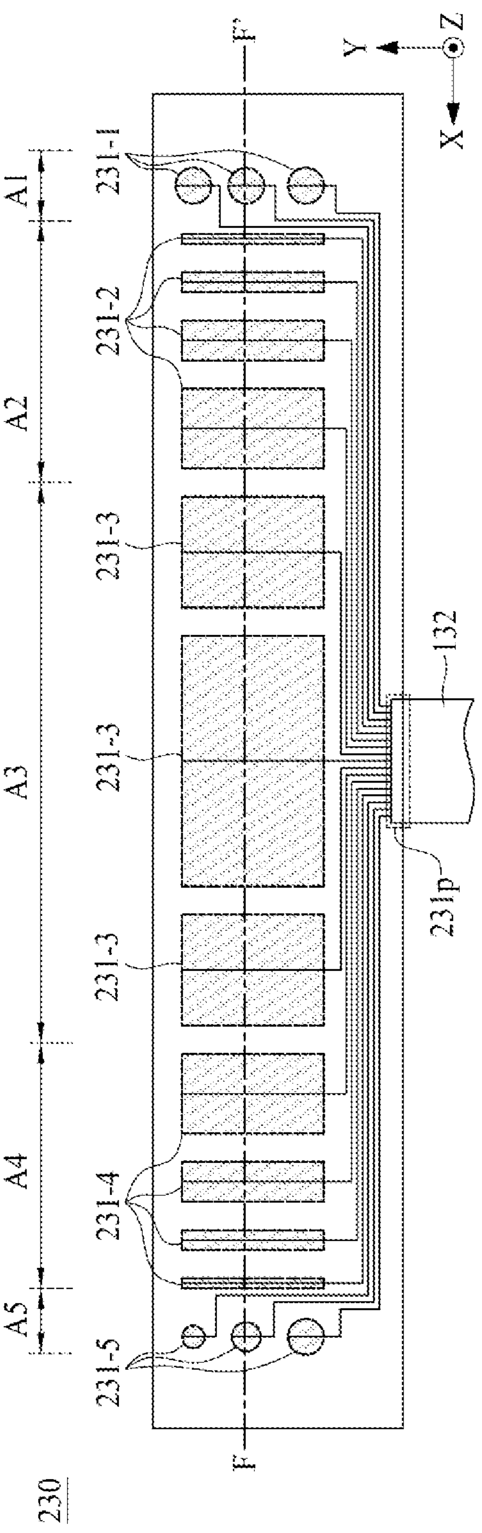
FIG. 24 is an example of a plan view illustrating a vibration device of a vibration apparatus illustrated in FIGS. 14 to 16.
Figure 25:
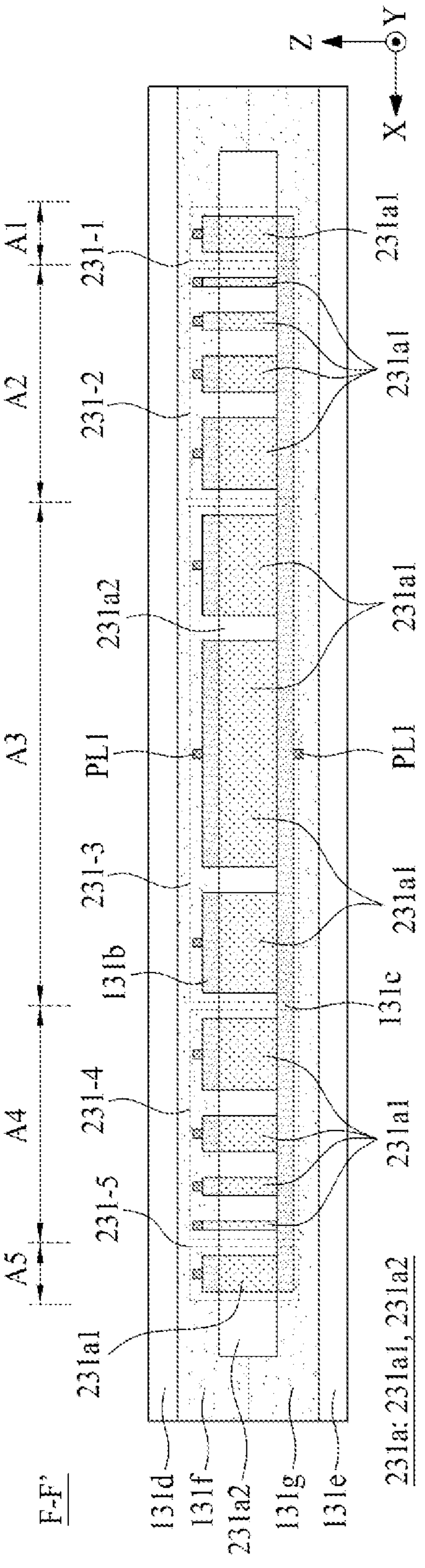
FIG. 25 is an example of a cross-sectional view taken along line F-F' illustrated in FIG. 24.

FIG. 24 is an example of a plan view illustrating a vibration device of a vibration apparatus illustrated in FIGS. 14 to 16. FIG. 25 is an example of a cross-sectional view taken along line F-F' illustrated in FIG. 24.

With reference to FIGS. 24 and 25, a vibration apparatus 230 according to another example embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present disclosure are not limited thereto.

The vibration apparatus 230 may include a plurality of vibration devices 231-1 to 231-5 respectively corresponding to a plurality of regions A1 to A5 of the vibration member. The vibration apparatus 230 may include one or more first to $n^{th}$ vibration devices 231-1 to 231-5 respectively corresponding to first to $n^{th}$ regions A1 to A5 of the vibration member.

The one or more first to $n^{th}$ vibration devices 231-1 to 231-5 may be arranged or tiled to have a separation distance of 0.1 mm or more and less than 3 cm or an interval of 0.1 mm or more and less than 5 mm so as to be driven as one vibration device, based on the reason described above with reference to FIGS. 21 to 23.

Each of the one or more first to $n^{th}$ vibration devices 231-1 to 231-5 may include a vibration generating portion which includes a piezoelectric vibration portion 231*a*, a first electrode portion 231*b*, and a second electrode portion 231*c*.

The piezoelectric vibration portion 231*a* of each of the one or more first to $n^{th}$ vibration devices 231-1 to 231-5 may include a plurality of first portions 231*a*1 and a second portion 231*a*2 between the plurality of first portions 231*a*1. For example, the piezoelectric vibration portion 231*a* of each of the one or more first to $n^{th}$ vibration devices 231-1 to 231-5 may include a plurality of first portions 231*a*1 and one or more second portions 231*a*2 which may surround a lateral surface of each of the plurality of first portions 231*a*1.

In the one or more first vibration devices 231-1, the plurality of first portions 231*a*1 may be configured to have the same size (or diameter) and may be implemented in a circular plate shape suitable for outputting the same ultrasound wave. The second portion 231*a*2 may be configured to surround a lateral surface of each of the plurality of first portions 231*a*1 having a circular plate shape. For example, except for that the piezoelectric vibration portions 231*a* of the one or more first vibration devices 231-1 are arranged in one row along a second direction Y, the piezoelectric vibration portion 231*a* may be configured to be substantially the same as the piezoelectric vibration portion 231*a* illustrated in FIG. 20B.

In the one or more second vibration devices 231-2, the plurality of first portions 231*a*1 may be arranged at a certain interval along a first direction X to have different widths along the first direction X and have the same length along the second direction Y. For example, a width of each of the plurality of first portions 231*a*1 may increase toward a center region of the vibration member along the first direction X. In this regard, in one or more examples, the width of the first portion 231*a*1 (located closest to the center region of the vibration member along the first direction X) may be greater than the width of the first portion 231*a*1 (located second-closest to the center region of the vibration member along the first direction X), which may be greater than the width of the first portion 231*a*1 (located third-closest to the center region of the vibration member along the first direction X), which may be greater than the width of the first portion 231*a*1 (located fourth-closest to the center region of the vibration member along the first direction X). The second portion 231*a*2 may be configured to surround a lateral surface of each of the plurality of first portions 231*a*1 having a line shape. For example, except for that the piezoelectric vibration portions 231*a* of the one or more second vibration devices 231-2 have different widths along the first direction X, the piezoelectric vibration portion 231*a* may be configured to be substantially the same as the piezoelectric vibration portion 131*a* illustrated in FIG. 19.

In the one or more third vibration devices 231-3, the plurality of first portions 231*a*1 may be arranged at a certain interval along the first direction X to have different widths along the first direction X and have the same length along the second direction Y. For example, a width of each of the plurality of first portions 231*a*1 may increase toward the center region of the vibration member along the first direction X. In this regard, in one or more examples, the width of the first portion 231*a*1 (located at the center region of the vibration member along the first direction X) may be greater than the width of the first portion 231*a*1 (located next to the center region of the vibration member along the first direction X). For example, a width of each of the plurality of first portions 231*a*1 may have a horizontal symmetric structure with respect to a center line of the vibration member parallel to the second direction Y. The second portion 231*a*2 may be configured to surround a lateral surface of each of the plurality of first portions 231*a*1 having a line shape. For example, except for that the piezoelectric vibration portions 231*a* of the one or more third vibration devices 231-3 have different widths along the first direction X, the piezoelectric vibration portion 231*a* may be configured to be substantially the same as the piezoelectric vibration portion 131*a* illustrated in FIG. 19.

In the one or more fourth vibration devices 231-4, the plurality of first portions 231*a*1 may be arranged at a certain interval along the first direction X to have different widths along the first direction X and have the same length along the second direction Y. For example, a width of each of the plurality of first portions 231*a*1 may increase toward the center region of the vibration member along the first direction X. The second portion 231*a*2 may be configured to surround a lateral surface of each of the plurality of first portions 231*a*1 having a line shape. For example, a width of each of the plurality of first portions 231*a*1 may have a horizontal symmetric structure with respect to a center line of the vibration member. except for that the piezoelectric vibration portions 231*a* of the one or more fourth vibration devices 231-4 have different widths along the first direction X, the piezoelectric vibration portion 231*a* may be configured to be substantially the same as the piezoelectric vibration portion 131*a* illustrated in FIG. 19.

In the one or more fifth vibration devices 231-5, the plurality of first portions 231*a*1 may be configured to have different sizes (or diameters) and may be implemented in a circular plate shape suitable for outputting different ultrasound waves. The second portion 231*a*2 may be configured to surround a lateral surface of each of the plurality of first portions 231*a*1 having a circular plate shape. For example, except for that the piezoelectric vibration portions 231*a* of the one or more fifth vibration devices 231-5 have different sizes, the piezoelectric vibration portions 231*a* may be configured to be substantially the same as the piezoelectric vibration portions 231*a* of the one or more first vibration devices 231-1.

In the piezoelectric vibration portion 231*a* of each of the one or more first to $n^{th}$ vibration devices 231-1 to 231-5, the plurality of first portions 231*a*1 may include substantially the same piezoelectric material as that of the first portion 131*a*1 described above with reference to FIGS. 17 to 19, and thus, their repetitive descriptions may be omitted.

In the piezoelectric vibration portion 231*a* of each of the one or more first to $n^{th}$ vibration devices 231-1 to 231-5, the second portion 231*a*2 may be configured to fill a gap between the plurality of first portions 231*a*1 provided in the piezoelectric vibration portion 231*a* of each of the one or more first to $n^{th}$ vibration devices 231-1 to 231-5 and may have a wholly connected structure like the second portion 131*a*2 illustrated in FIGS. 20A to 20D. The second portion 231*a*2 may include substantially the same organic material as that of the second portion 231*a*2 described above with reference to FIGS. 17 to 19, and thus, the repetitive description thereof may be omitted.

The first electrode portion 231*b* may be disposed at a first surface of the piezoelectric vibration portion 231*a* disposed at each of the one or more first to $n^{th}$ vibration devices 231-1 to 231-5 and may be individually connected to each of the plurality of first portions 231*a*1 disposed at the piezoelectric vibration portion 231*a*. Except that the first electrode portion 231*b* is individually connected to each of the plurality of first portions 231*a*1 disposed in a corresponding piezoelectric vibration portion 231*a*, the first electrode portion 231*b* may be substantially the same as the first electrode portion 131*b* described above with reference to FIG. 18, and thus, the repetitive description thereof may be omitted.

The second electrode portion 231*c* may be disposed at a second surface of the piezoelectric vibration portion 231*a* disposed at each of the one or more first to $n^{th}$ vibration devices 231-1 to 231-5 and may be connected to the plurality of first portions 231*a*1 disposed at the piezoelectric vibration portion 231*a* in common. Except that the second electrode portion 231*c* is commonly connected to the plurality of first portions 231*a*1 disposed at a corresponding piezoelectric vibration portion 231*a*, the first electrode portion 231*b* may be substantially the same as the first electrode portion 131*b* described above with reference to FIG. 18, and thus, the repetitive description thereof may be omitted.

The vibration apparatus 230 according to another example embodiment of the present disclosure may further include a first cover member 131*d*, which is disposed at a first surface of each of the one or more first to $n^{th}$ vibration devices 231-1 to 231-5 by a first adhesive layer 131*f*, and a second cover member 131*e* which is disposed at a second surface of each of the one or more first to $n^{th}$ vibration devices 231-1 to 231-5 by a second adhesive layer 131*g*. The first cover member 131*d*, the second cover member 131*e*, the first adhesive layer 131*f*, and the second adhesive layer 131*g* may be substantially the same as the first cover member 131*d*, the second cover member 131*e*, the first adhesive layer 131*f*, and the second adhesive layer 131*g* described above with reference to FIGS. 21 to 23, and thus, like reference numerals may refer to like elements, and their repetitive descriptions may be omitted.

The vibration apparatus 230 according to another example embodiment of the present disclosure may further include a plurality of first power supply lines PL1 disposed at the first cover member 131*d*, one second power supply line PL2 disposed at the second cover member 131*e*, and a pad portion 131*p* electrically connected to the plurality of first power supply lines PL1 and the plurality of second power supply lines PL2.

Except that each of the plurality of first power supply lines PL1 may be individually connected to each of the first electrode portion 131*b* configured at each of the one or more first to $n^{th}$ vibration devices 231-1 to 231-5, each of the plurality of first power supply lines PL1 may be substantially the same as the first power supply line PL1 described above with reference to FIGS. 21 to 23, and thus, the repetitive description thereof may be omitted.

Except that the one second power supply lines PL2 may be connected to each of the second electrode portion 131*c* configured at each of the one or more first to $n^{th}$ vibration devices 231-1 to 231-5 in common, the one second power supply line PL2 may be substantially the same as the second power supply line PL2 described above with reference to FIGS. 21 to 23, and thus, the repetitive description thereof may be omitted.

The pad part 131*p* may be configured at one periphery portion of any one among the first cover member 131*d* and the second cover member 131*e* so as to be electrically connected to one side (or one end) of each of the first and second power supply lines PL1 and PL2.

The pad portion 131*p* according to an example embodiment of the present disclosure may include a plurality of first pad electrodes, which electrically and respectively connected to one ends of the plurality of first power supply line PL1, and a plurality of second pad electrodes which electrically and respectively connected to one ends of the plurality of second power supply line PL2. Except that the pad portion 131*p* includes the plurality of first pad electrodes, the pad portion 131*p* may be substantially the same as the pad portion 131*p* described above with reference to FIGS. 21 to 23, and thus, the repetitive description thereof may be omitted.

The vibration apparatus 230 according to another example embodiment of the present disclosure may further include a signal cable 132.

The signal cable 132 may be electrically connected to the pad part 131*p* and may supply each of the one or more first to $n^{th}$ vibration devices 2314 to 231-5 with a vibration driving signal (or a sound signal or a voice signal) provided from a sound processing circuit. The signal cable 132 according to an example embodiment of the present disclosure may include a plurality of first terminal electrically coupled to the plurality of first pad electrode of the pad part 131*p* and a second terminal electrically coupled to the second pad electrode of the pad part 131*p*. Except that the signal cable 132 may have the plurality of first terminal, the signal cable 132 may be substantially the same as the signal cable 132 described above with reference to FIGS. 21 to 23, and thus, the repetitive description thereof may be omitted.

As described above, the vibration apparatus 230 according to another example embodiment of the present disclosure may have the same effect as that of the vibration apparatus including the vibration device 131 described above with reference to FIGS. 17 to 19.

Figure 26:
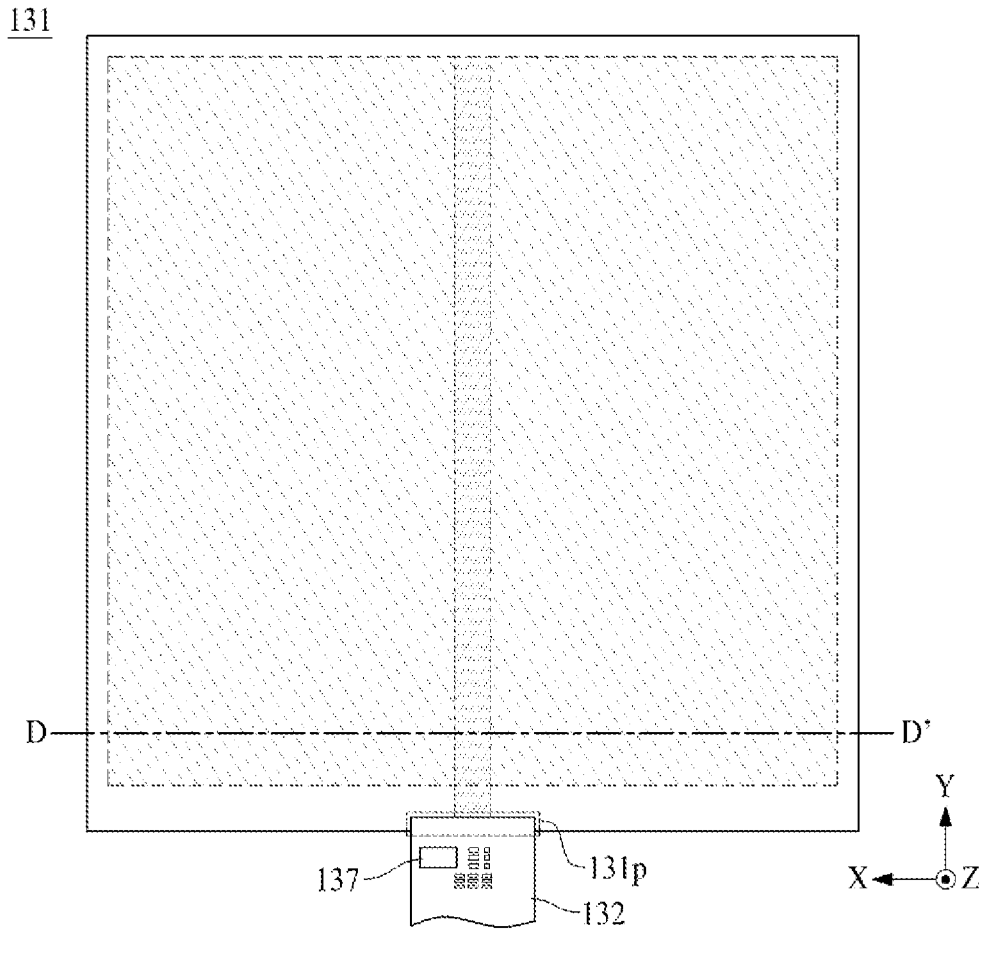
FIG. 26 illustrates a vibration device according to another example embodiment of the present disclosure.

FIG. 26 illustrates a vibration device according to another example embodiment of the present disclosure. FIG. 26 illustrates an example embodiment implemented by modifying a signal cable of the vibration device illustrated in FIGS. 17 to 20D. Hereinafter, therefore, the elements except a signal cable and relevant elements may be referred to by like reference numerals, and their repetitive descriptions may be omitted or will be briefly given. Line D-D' illustrated in FIG. 26 is illustrated in FIG. 18.

Referring to FIG. 26 in conjunction with FIG. 18, in the vibration device 131 according to another example embodiment of the present disclosure, a signal cable 132 may include a sound processing circuit 137.

The sound processing circuit (or a signal generating circuit or a sound generating circuit) 137 may be mounted on the signal cable 132. For example, the sound processing circuit 137 may be mounted on a periphery portion of the signal cable 132 adjacent to a pad portion 131*p* of a vibration device 131. The sound processing circuit 137 may be integrated (or mounted) into the signal cable 132, and thus, the sound processing circuit 137 and the signal cable 132 may be implemented as one element.

The signal cable 132 may be configured as a double-sided flexible printed circuit, but embodiments of the present disclosure are not limited thereto and may be configured as a flexible printed circuit cable, a flexible flat cable, a single-sided flexible printed circuit, a single-sided flexible printed circuit board, a flexible multilayer printed circuit, or a flexible multilayer printed circuit board.

The signal cable 132 according to an example embodiment of the present disclosure may include a line layer, a lower film coupled to a first surface of the line layer by an adhesive, an upper film coupled to a second surface of the line layer by an adhesive, and a plurality of contact pads and first and second terminals which are disposed at the upper film and are connected to the line layer.

The line layer may include a base film, and a plurality of signal lines and first and second driving signal supply lines, or the like formed at one or more of a front surface and a bottom surface of the base film. For example, the plurality of signal lines and the first and second driving signal supply lines, or the like may include a conductive material including copper (Cu), aluminum (Al), silver (Ag), or an alloy material of Cu and Ag, but embodiments of the present disclosure are not limited thereto.

Each of the plurality of contact pads may be disposed at one of the lower film and the upper film and may be selectively connected to the plurality of signal lines and the first and second driving signal supply lines, or the like through a via hole.

Each of the first and second terminals may be electrically connected to first and second pad electrodes of the pad portion 131*p* configured at the vibration device 131.

The sound processing circuit 137 may be mounted on the signal cable 132 and may be electrically connected to a plurality of contact pads. The sound processing circuit 137 may receive sound data (or digital sound data), a clock, an enable signal, and various driving voltages, or the like supplied from an external sound data generating circuit part through some of the plurality of contact pads. The sound processing circuit 137 may generate first and second vibration driving signals based on the sound data and may output the generated first and second vibration driving signals to the first and second terminals through corresponding contact pads and corresponding driving signal supply lines, respectively. Accordingly, the vibration device 131 may vibrate based on the first and second vibration driving signals supplied through a signal line of the signal cable 132, the first and second terminals, the pad portion 131*p*, and the first and second power supply lines PL1 and PL2 from the sound processing circuit 137 mounted on the signal cable 132.

The sound processing circuit 137 according to an example embodiment of the present disclosure may include a decoding part which receives sound data supplied from the external sound data generating circuit part, an audio amplifier circuit which generates and outputs the first and second vibration driving signals based on the sound data supplied from the decoding part, a memory circuit which stores a setting value of the audio amplifier circuit, a control circuit which controls an operation of each of the audio amplifier circuit and the memory circuit, and a passive device such as a resistor, or the like.

The audio amplifier circuit may include a preamplifier circuit which generates the first and second vibration driving signals based on the sound data and a power amplifier circuit which shifts a voltage and/or a current of each of the first and second vibration driving signals, supplied from the preamplifier circuit, to a level suitable for driving of the vibration device 131, but embodiments of the present disclosure are not limited thereto.

Each of the decoding part, the audio amplifier circuit, the memory circuit, and the control circuit may be implemented as an integrated circuit (IC) and may be mounted on the signal cable 132. For example, the decoding part, the audio amplifier circuit, the memory circuit, and the control circuit may be implemented as one integrated circuit (IC) or one semiconductor chip.

As described above, the vibration device 131 according to another example embodiment of the present disclosure includes the sound processing circuit 137 mounted on the signal cable 132, and thus, a connection structure between the vibration device 131, the sound processing circuit 137, and the signal cable 132, and the sound data generating circuit part may be simplified. In addition, the sound processing circuit 137 may be disposed adjacent to the vibration device 131, and thus, a filter circuit including an inductor and a capacitor for preventing electro-magnetic interference (EMI) or the like occurring due to a length of the signal cable 132 based on a distance between the sound processing circuit 137 and the vibration device 131 may be omitted, but embodiments of the present disclosure are not limited thereto.

Additionally, in the vibration device 131 according to another example embodiment of the present disclosure, the signal cable 132 with the sound processing circuit 137 mounted or integrated therein may also be identically applied to the signal cable 132 of the vibration device 131 described above with reference to one or more of FIGS. 17 to 23 or the vibration apparatus 230 illustrated in FIGS. 24 and 25. For example, the signal cable 132 described above with reference to one or more of FIGS. 17 to 25 may include the sound processing circuit 137, and the repetitive repeated description may be omitted.

Figure 27:
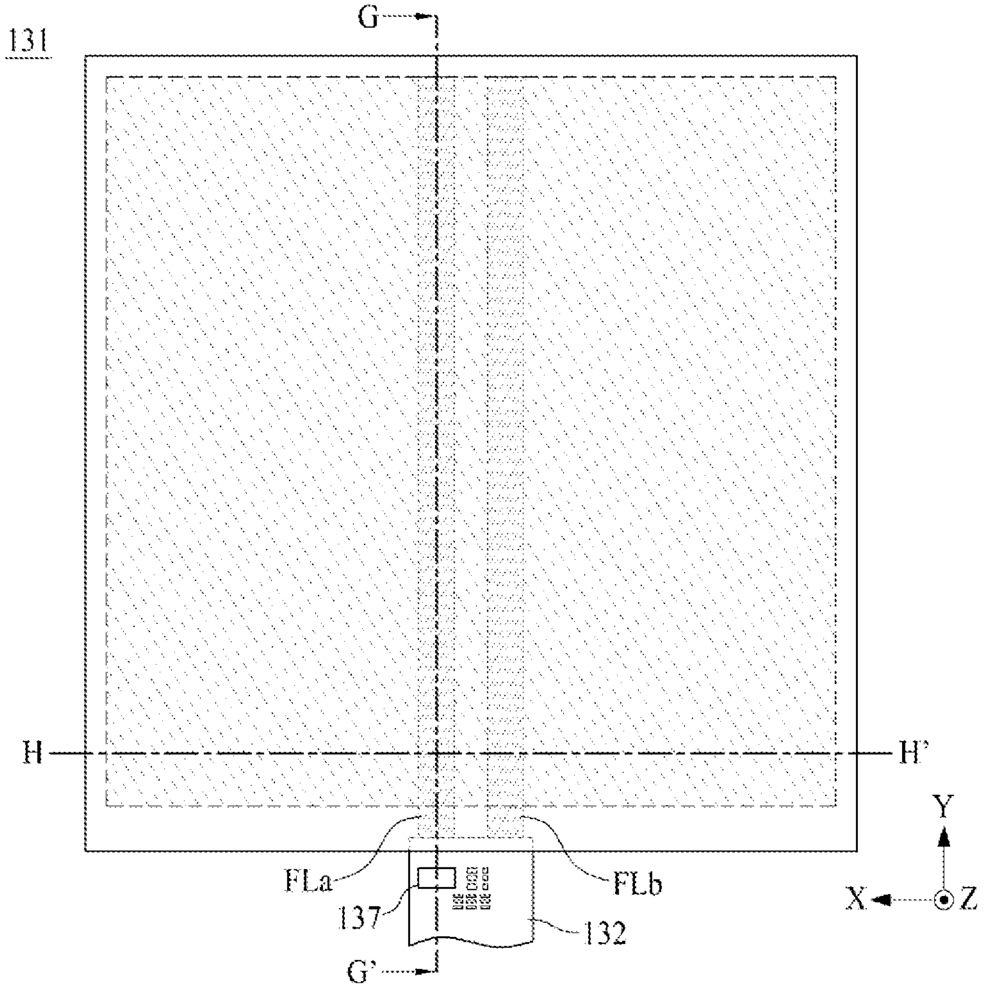
FIG. 27 illustrates a vibration device according to another example embodiment of the present disclosure.
Figure 28:
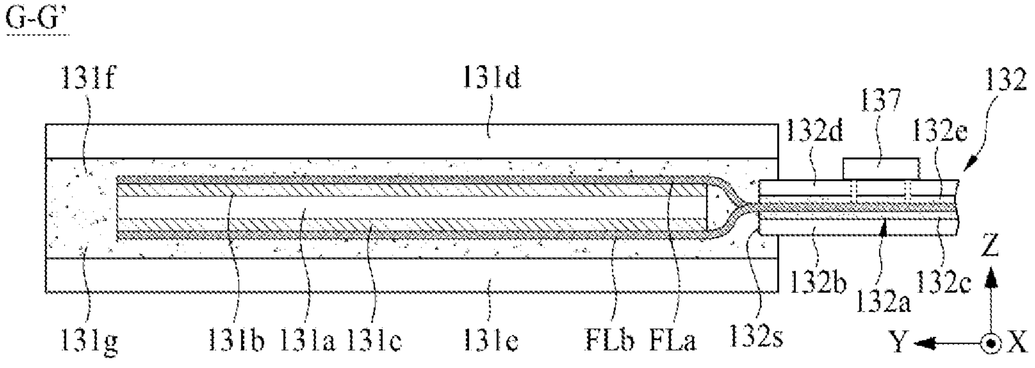
FIG. 28 is an example of a cross-sectional view taken along line G-G' illustrated in FIG. 27.
Figure 29:
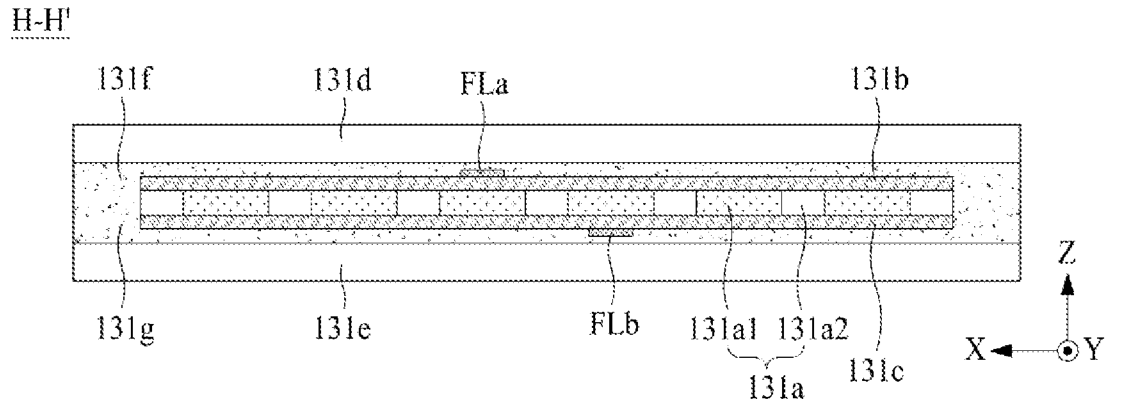
FIG. 29 is an example of a cross-sectional view taken along line H-H' illustrated in FIG. 27.

FIG. 27 illustrates a vibration device 131 according to another example embodiment of the present disclosure. FIG. 28 is an example of a cross-sectional view taken along line G-G' illustrated in FIG. 27. FIG. 29 is an example of a cross-sectional view taken along line H-H' illustrated in FIG. 27. FIGS. 27 to 29 illustrate another example embodiment of the vibration device illustrated in one or more of FIGS. 1 to 13 and illustrate an example embodiment implemented by modifying a connection structure between the electrode portion and the signal cable illustrated in FIG. 26.

With reference to FIGS. 27 to 29, the vibration device 131 according to another example embodiment of the present disclosure may include a vibration generating portion and a signal cable 132.

The vibration generating portion may include a piezoelectric vibration portion 131*a*, a first electrode portion 131*b*, and a second electrode portion 131*c* and may be substantially the same as the vibration generating portion of the vibration device 131 described above with reference to FIGS. 17 to 20D, and thus, like reference numerals may refer to like elements, and their repetitive descriptions may be omitted.

The signal cable 132 may be electrically connected to the first and second electrode portions 131*b* and 131*c* at one side of the vibration device 131, and thus, may be integrated into the vibration generating portion. For example, the signal cable 132 may be electrically and directly connected to the first and second electrode portions 131*b* and 131*c*. For example, the signal cable 132 may be electrically or electrically and directly connected to the first and second electrode portions 131*b* and 131*c* without passing through the power supply line and the pad portion described above with reference to FIGS. 17 to 20D.

The signal cable 132 according to an example embodiment of the present disclosure may include first and second protrusion lines FLa and FLb. For example, the first protrusion line FLa may overlap at least a portion of the first electrode portion 131*b* and may be electrically or electrically and directly connected to the first electrode portion 131*b*. The second protrusion line FLb may overlap at least a portion of the second electrode portion 131*c* and may be electrically or electrically and directly connected to the second electrode portion 131*c*. For example, each of the first and second protrusion lines FLa and FLb may be bent toward corresponding electrode portions 131*b* and 131*c*, but embodiments of the present disclosure are not limited thereto. For example, each of the first and second protrusion lines FLa and FLb may be referred to as the term such as a protrusion electrode, an extension line, an extension electrode, a finger line, or a finger electrode, but embodiments of the present disclosure are not limited thereto.

The signal cable 132 according to an example embodiment of the present disclosure may include a body portion, the first and second protrusion lines FLa and FLb, and a sound processing circuit 137.

The body portion may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The body portion according to an example embodiment of the present disclosure may include a line layer 132*a*, a lower film 132*b* which is coupled to a first surface of a line layer 132*a* by a first adhesive 132*c*, an upper film 132*d* which is coupled to a second surface of the line layer 132*a* by a second adhesive 132*e*, and a plurality of contact pads which are disposed at the upper film 132*d* and are connected to the line layer 132*a*.

The line layer 132*a* may include a base film, and a plurality of signal lines and first and second driving signal supply lines, or the like formed at one or more of a front surface and a bottom surface of the base film. For example, the plurality of signal lines and the first and second driving signal supply lines, or the like may include a conductive material including copper (Cu), aluminum (Al), silver (Ag), or an alloy material of Cu and Ag, but embodiments of the present disclosure are not limited thereto.

Each of the plurality of contact pads may be disposed at one of the lower film and the upper film and may be selectively connected to the plurality of signal lines and the first and second driving signal supply lines, or the like through a via hole.

The first and second protrusion lines FLa and FLb may be respectively connected to first and second driving signal supply lines disposed at a line layer 132*a*, or may extend or protrude to the outside via one surface 132*s* of the body portion from each of first and second driving signal supply lines. Each of the first and second protrusion lines FLa and FLb may protrude to have a certain length from the one surface 132*s* of the body portion. For example, each of the first and second protrusion lines FLa and FLb may protrude or extend along a second direction Y from the one surface 132*s* of the body portion to have a length overlapping at least a portion of each of the first and second electrode portions 131*b* and 131*c*.

The first protrusion line FLa may be bent toward the first electrode 131*b* from the one surface 132*s* of the body portion (or one side of the vibration device 131) and may be electrically connected to at least a portion of the first electrode portion 131*b*. For example, the first protrusion line FLa may be electrically and directly connected to or contact at least a portion of the first electrode portion 131*b*. For example, the first protrusion line FLa may be electrically connected to the first electrode portion 131*b* by a conductive member such as a conductive ball or a conductive double-sided tape, or the like.

The second protrusion line FLb may be bent toward the second electrode 131*c* from the one surface 132*s* of the body portion (or one side of the vibration device 131) and may be electrically connected to at least a portion of the second electrode portion 131*c*. For example, the second protrusion line FLb may be electrically and directly connected to or contact at least a portion of the second electrode portion 131*c*. For example, the second protrusion line FLb may be electrically connected to the second electrode portion 131*c* by a conductive member such as a conductive ball or a conductive double-sided tape, or the like.

The sound processing circuit 137 may be mounted on the signal cable 132 and may be electrically connected to a plurality of contact pads. The sound processing circuit 137 may receive sound data (or digital sound data), a clock, an enable signal, and various driving voltages, or the like supplied from an external sound data generating circuit part through some of the plurality of contact pads. The sound processing circuit 137 may generate first and second vibration driving signals based on the sound data and may output the generated first and second vibration driving signals to the first and second protrusion lines FLa and FLb through corresponding contact pads and corresponding driving signal supply lines, respectively. Accordingly, the vibration device 131 may vibrate based on the first and second vibration driving signals supplied through a signal line of the signal cable 132, the first and second terminals, the pad portion 131*p*, and the first and second protrusion lines FLa and FLb from the sound processing circuit 137 mounted on the signal cable 132.

The sound processing circuit 137 according to an example embodiment of the present disclosure may include a decoding part, an audio amplifier circuit, a memory circuit, a control circuit, and a passive device such as a resistor. This may be substantially the same as the sound processing circuit 137 described above with reference to FIG. 26, and thus, like reference numerals may refer to like elements, and their repetitive descriptions may be omitted.

The signal cable 132 may directly and respectively supply a vibration driving signal to the first and second electrode portions 131*b* and 131*c* through the first and second protrusion lines FLa and FLb, and thus, voltage drop caused by a surface resistance characteristic of each of the first and second electrode portions 131*b* and 131*c* may be reduced, an electrical characteristic of each of the first and second electrode portions 131*b* and 131*c* may be complemented, and the degree of selection freedom of a conductive material used in the first and second electrode portions 131*b* and 131*c* may increase.

The vibration device 131 according to another example embodiment of the present disclosure may further include a first cover member 131*d* and a second cover member 131*e*.

The first cover member 131*d* may be disposed at a first surface of the vibration device 131. For example, the first cover member 131*d* may be configured to cover the first electrode portion 131*b* and the first protrusion line FLa of the signal cable 132. Accordingly, the first cover member 131*d* may protect the first electrode portion 131*b* and the first protrusion line FLa of the signal cable 132 and may electrically connect the first electrode portion 131*b* to the first protrusion line FLa of the signal cable 132 or may maintain an electrical connection state between the first electrode portion 131*b* and the first protrusion line FLa of the signal cable 132.

The second cover member 131*e* may be disposed at a second surface of the vibration device 131. For example, the second cover member 131*e* may be configured to cover the second electrode portion 131*c* and the second protrusion line FLb of the signal cable 132. Accordingly, the second cover member 131*e* may protect the second electrode portion 131*c* and the second protrusion line FLb of the signal cable 132 and may electrically connect the second electrode portion 131*c* to the second protrusion line FLb of the signal cable 132 or may maintain an electrical connection state between the second electrode portion 131*c* and the second protrusion line FLb of the signal cable 132.

The first cover member 131*d* and the second cover member 131*e* according to an example embodiment of the present disclosure may each include one or more materials of a plastic, a fiber, and wood, but embodiments of the present disclosure are not limited thereto. For example, each of the first and second cover member 131*d* and 131*e* may include the same or different material. For example, each of the first cover member 131*d* and the second cover member 131*e* may be a polyimide (PI) film or a polyethylene terephthalate (PET) film, but embodiments of the present disclosure are not limited thereto.

The first cover member 131*d* according to an example embodiment of the present disclosure may connect or couple the first electrode portion 131*b* to the first protrusion line FLa of the signal cable 132 by a first adhesive layer 131*f*. For example, the first cover member 131*d* may connect or couple the first electrode portion 131*b* to the first protrusion line FLa of the signal cable 132 through a film laminating process using the first adhesive layer 131*f*. Accordingly, the first protrusion line (or a first finger line) FLa of the signal cable 132 may be disposed between the first electrode portion 131*b* and the first cover member 131*d* and may be integrated as one body with the vibration device 131.

The second cover member 131*e* according to an example embodiment of the present disclosure may be connected or coupled to the second protrusion line FLb of the signal cable 132 and the second electrode portion 131*c* by a second adhesive layer 131*g*. For example, the second cover member 131*e* may be connected or coupled to the second protrusion line FLb of the signal cable 132 and the second electrode portion 131*c* by a film laminating process using the second adhesive layer 131*g*. Accordingly, the second protrusion line (or a second finger line) FLb of the signal cable 132 may be disposed between the second electrode portion 131*c* and the second cover member 131*e* and may be integrated as one body with the vibration device 131.

Each of the first and second cover members 131*d* and 131*e* according to an example embodiment of the present disclosure may not include or need a pad portion and a power supply line for receiving the vibration driving signal from the signal cable 132, and thus, may each be a protection film or an insulation film for protecting the piezoelectric vibration portion 131*a* and the first and second electrode portions 131*b* and 131*c*. For example, each of the first cover member 131*d* and the second cover member 131*e* may be a polyimide (PI) film or a polyethylene terephthalate (PET) film, but embodiments of the present disclosure are not limited thereto.

Each of the first and second cover members 131*d* and 131*e* according to an example embodiment of the present disclosure may be electrically insulated from the first and second electrode portions 131*b* and 131*c* by the first and second adhesive layers 131*f* and 131*g*, and thus, one or more of the first and second cover members 131*d* and 131*e* may include a metal film or a metal plate including a metal material. Each of the first and second cover members 131*d* and 131*e* including a metal material may reinforce a mass of the vibration device 131 or the piezoelectric vibration portion 131*a* to reduce a resonance frequency of the vibration device 131 or the piezoelectric vibration portion 131*a* caused by an increase in mass, and thus, a sound characteristic and/or a sound pressure level characteristic of a low-pitched sound band generated based on a vibration of the vibration device 131 or the piezoelectric vibration portion 131*a* may increase. Each of the first and second cover members 131*d* and 131*e* including a metal material may include any one or more materials of stainless steel, aluminum (Al), an Al alloy, magnesium (Mg), a Mg alloy, and a magnesium-lithium (Mg—Li) alloy, but embodiments of the present disclosure are not limited thereto.

According to an example embodiment of the present disclosure, each of the first and second adhesive layers 131*f* and 131*g* may include an electric insulating material which has adhesiveness and is capable of compression and decompression. For example, each of the first and second adhesive layers 131*f* and 131*g* may include an epoxy resin, an acrylic resin, a silicone resin, or a urethane resin, but embodiments of the present disclosure are not limited thereto.

Optionally, at least a portion of the signal cable 132 may be disposed or inserted between the first cover member 131*d* and the second cover member 131*e*. For example, each of the first and second protrusion lines FLa and FLb and the one surface 132*s* of the body portion (or one edge portion of the body portion) of the signal cable 132 may be disposed or inserted between the first cover member 131*d* and the second cover member 131*e*. For example, each of the first and second protrusion lines FLa and FLb and the one surface 132*s* of the body portion of the signal cable 132 may be accommodated or inserted into the vibration device 131. Accordingly, at least a portion of each of the first and second protrusion lines FLa and FLb and the signal cable 132 may not be exposed at the outside of each of the first cover member 131*d* and the second cover member 131*e*, and thus, a disconnection of each of the first and second protrusion lines FLa and FLb caused by a stress such as the movement or bending of the signal cable 132 may be prevented.

As described above, the vibration device 131 according to another example embodiment of the present disclosure may not need a patterning process of forming a pad portion and a power supply line in the first cover member 131*d* and the second cover member 131*e* based on an integration structure between the first and second electrode portions 131*b* and 131*c* and the signal cable 132 and a soldering process performed between the pad portion and the signal cable 132, and thus, a structure and a manufacturing process may be simplified. In addition, in the vibration device 131 according to another example embodiment of the present disclosure, the vibration driving signal may be directly supplied to the first and second electrode portions 131*b* and 131*c* through the first and second protrusion lines FLa and FLb protruding from the signal cable 132, and thus, an electrical characteristic of each of the first and second electrode portions 131*b* and 131*c* may be complemented. Moreover, the vibration device 131 according to another example embodiment of the present disclosure includes the sound processing circuit 137 mounted on the signal cable 132, and thus, a connection structure between the vibration device 131, the sound processing circuit 137, and the signal cable 132, and the sound data generating circuit part may be simplified. In addition, the sound processing circuit 137 may be disposed adjacent to the vibration device 131, and thus, a filter circuit including an inductor and a capacitor for preventing electro-magnetic interference (EMI) or the like occurring due to a length of the signal cable 132 based on a distance between the sound processing circuit 137 and the vibration device 131 may be omitted, but embodiments of the present disclosure are not limited thereto.

Additionally, in the vibration device 131 according to another example embodiment of the present disclosure, the signal cable 132 including the protrusion lines FLa and FLb may be identically applied to the signal cable 132 illustrated in FIGS. 24 and 25.

Figure 30:
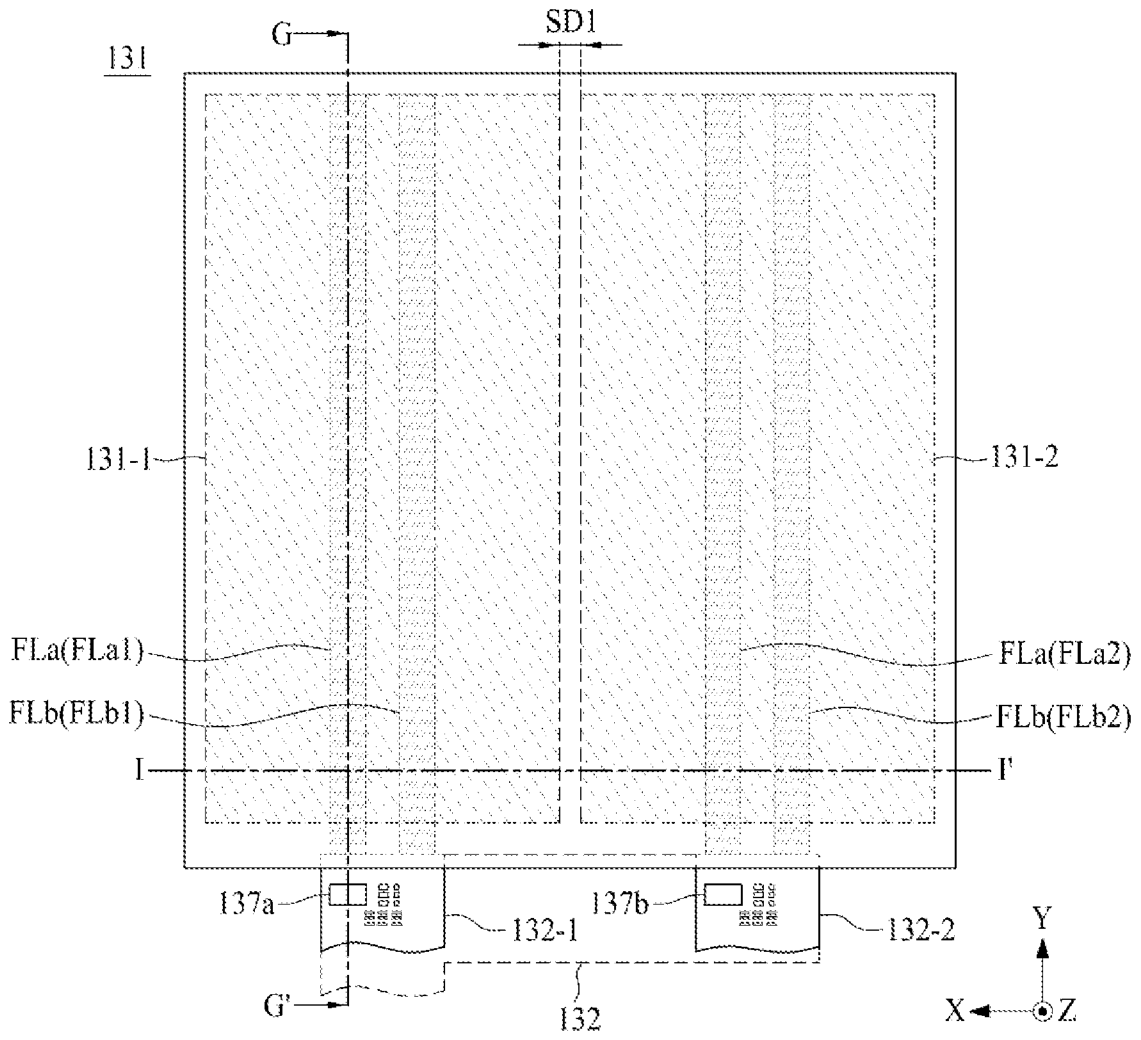
FIG. 30 illustrates a vibration device according to another example embodiment of the present disclosure.
Figure 31:
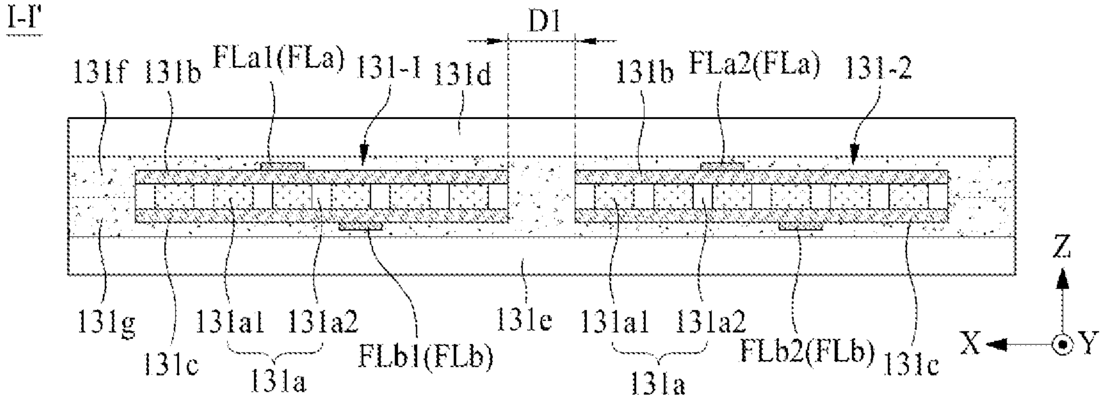
FIG. 31 is an example of a cross-sectional view taken along line I-I' illustrated in FIG. 30.

FIG. 30 illustrates a vibration device according to another example embodiment of the present disclosure. FIG. 31 is an example of a cross-sectional view taken along line I-I' illustrated in FIG. 30. An example of a cross-sectional view taken along line G-G' illustrated in FIG. 30 is illustrated in FIG. 28. FIGS. 30 and 31 are diagrams illustrating another example embodiment of the vibration device illustrated in one or more of FIGS. 1 to 13 and illustrates an example embodiment implemented by modifying a connection structure between the electrode portion and the signal cable illustrated in FIG. 23. Hereinafter, therefore, the elements except an electrode portion, a signal cable, and relevant elements may be referred to by like reference numerals, and their repetitive descriptions may be omitted or will be briefly given.

With reference to FIGS. 30 and 31, the vibration device 131 according to another example embodiment of the present disclosure may include first and second vibration generating portions 131-1 and 131-2, a first signal cable 132-1, and a second signal cable 132-2.

Each of the first and second vibration generating portions 131-1 and 131-2 may be electrically separated and disposed while being spaced apart from each other along a first direction X. Each of the first and second vibration generating portions 131-1 and 131-2 may include a piezoelectric vibration portion 131*a*, a first electrode portion 131*b*, and a second electrode portion 131*c*. Each of the first and second vibration generating portions 131-1 and 131-2 may be substantially the same as each of the first and second vibration generating portions 131-1 and 131-2 of the vibration device 131 described above with reference to FIGS. 21 and 22, and thus, like reference numerals may refer to like elements, and their repetitive descriptions may be omitted.

The first signal cable 132-1 may be electrically connected or electrically and directly connected to the first and second electrode portions 131*b* and 131*c* at one side of the vibration device 131, and thus, may be integrated into the first vibration generating portion 131-1. For example, the first signal cable 132-1 may not pass through the power supply line and the pad part described above with reference to FIGS. 21 and 22 and may be electrically connected to the first and second electrode portions 131*b* and 131*c* of the first vibration generating portion 131-1.

The second signal cable 132-2 may be electrically connected or electrically and directly connected to the first and second electrode portions 131*b* and 131*c* at one side of the vibration device 131, and thus, may be integrated into the second vibration generating portion 131-2. For example, the second signal cable 132-2 may not pass through the power supply line and the pad part described above with reference to FIGS. 21 and 22 and may be electrically connected to the first and second electrode portions 131*b* and 131*c* of the second vibration generating portion 131-2.

Each of the first and second signal cables 132-1 and 132-2 may include first and second protrusion lines FLa and FLb. For example, each of the first and second protrusion lines FLa and FLb may be referred to as a protrusion electrode, an extension line, an extension electrode, a flexible protrusion electrode, a flexible connection line, a flexible conductive line, a finger line, or a finger electrode, but embodiments of the present disclosure are not limited thereto.

The first protrusion line FLa of the first signal cable 132-1 (or a first upper protrusion line FLa1) may overlap at least a portion of the first electrode portion 131*b* of the first vibration generating portion 131-1 and may be electrically connected or electrically and directly connected to the first electrode portion 131*b*. The second protrusion line FLb of the first signal cable 132-1 (or a first lower protrusion line FLb1) may overlap at least a portion of the second electrode portion 131*c* of the first vibration generating portion 131-1 and may be electrically connected or electrically and directly connected to the second electrode portion 131*c*. For example, each of the first and second protrusion lines FLa and FLb of the first signal cable 132-1 may be bent toward a corresponding electrode portion of the first and second electrode portions 131*b* and 131*c* of the first vibration generating portion 131-1, but embodiments of the present disclosure are not limited thereto.

The first protrusion line FLa of the second signal cable 132-2 (or a second upper protrusion line FLa2) may overlap at least a portion of the first electrode portion 131*b* of the second vibration generating portion 131-2 and may be electrically connected or electrically and directly connected to the first electrode portion 131*b*. The second protrusion line FLb of the second signal cable 132-2 (or a second lower protrusion line FLb2) may overlap at least a portion of the second electrode portion 131*c* of the second vibration generating portion 131-2 and may be electrically connected or electrically and directly connected to the second electrode portion 131*c*. For example, each of the first and second protrusion lines FLa and FLb of the second signal cable 132-2 may be bent toward a corresponding electrode portion of the first and second electrode portions 131*b* and 131*c* of the second vibration generating portion 131-2, but embodiments of the present disclosure are not limited thereto.

Each of the first and second signal cables 132-1 and 132-2 according to an example embodiment of the present disclosure may include a body portion, the first and second protrusion lines FLa and FLb, and sound processing circuits 137*a* and 137*b*. Each of the first and second signal cables FLa and FLb may be substantially the same as the signal cable 132 described above with reference to FIGS. 27 to 29, and thus, like reference numerals may refer to like elements, and their repetitive descriptions may be omitted or will be briefly given.

The sound processing circuit (or a first sound processing circuit or a first signal generating circuit or a first sound generating circuit) 137*a* mounted on or integrated into the first signal cable 132-1 may generate first and second vibration driving signals based on sound data supplied from an external sound data generating circuit part and may supply the first and second vibration driving signals to the first and second electrode portions 131*b* and 131*c* of the first vibration generating portion 131-1 through the first and second protrusion lines FLa and FLb. The sound processing circuit 137*a* mounted on the first signal cable 132-1 may include a decoding part, an audio amplifier circuit, a memory circuit, a control circuit, and a passive element such as a resistor, or the like. The elements of the sound processing circuit 137*a* may be substantially the same as the elements of the sound processing circuit 137 described above with reference to FIG. 26 or 28, and thus, like reference numerals may refer to like elements, and the repetitive description thereof may be omitted.

The sound processing circuit (or a second sound processing circuit or a second signal generating circuit or a second sound generating circuit) 137*b* mounted on or integrated into the second signal cable 132-2 may generate first and second vibration driving signals based on sound data supplied from an external sound data generating circuit part and may supply the first and second vibration driving signals to the first and second electrode portions 131*b* and 131*c* of the second vibration generating portion 131-2 through the first and second protrusion lines FLa and FLb. The sound processing circuit 137*b* mounted on the second signal cable 132-2 may include a decoding part, an audio amplifier circuit, a memory circuit, a control circuit, and a passive element such as a resistor, or the like. The elements of the sound processing circuit 137*b* may be substantially the same as the elements of the sound processing circuit 137 described above with reference to FIG. 26 or 28, and thus, like reference numerals may refer to like elements, and the repetitive description thereof may be omitted.

The vibration device 131 according to another example embodiment of the present disclosure may further include a first cover member 131*d* and a second cover member 131*e*. Except that the first and second cover member 131*d* and 131*e* are configured to respectively cover the first and second vibration generating portions 131-1 and 131-2 and the first and second protrusion lines FLa and FLb of each of the first and second signal cables 132-1 and 132-2, the first and second cover member 131*d* and 131*e* may be substantially the same as the first and second cover member 131*d* and 131*e* described above with reference to FIGS. 21 and 22, or 27 to 29, and thus, like reference numerals may refer to like elements, and their repetitive descriptions may be omitted or will be briefly given.

The first cover member 131*d* may be disposed at the first surface of the vibration device 131. For example, the first cover member 131*d* may be configured to cover the first electrode portion 131*b* of each of the first and second vibration generating portions 131-1 and 131-2 and the first protrusion line FLa of each of the first and second signal cables 132-1 and 132-2.

The second cover member 131*e* may be disposed at the second surface of the vibration device 131. For example, the second cover member 131*e* may be configured to cover the second electrode portion 131*c* of each of the first and second vibration generating portions 131-1 and 131-2 and the second protrusion line FLb of each of the first and second signal cables 132-1 and 132-2.

The first cover member 131*d* according to an example embodiment of the present disclosure may be connected or coupled to the first electrode portion 131*b* of each of the first and second vibration generating portions 131-1 and 131-2 and the first protrusion line FLa of each of the first and second signal cables 132-1 and 132-2 by a first adhesive layer 131*f*. Accordingly, the first protrusion line (or a first finger line) FLa of each of the first and second signal cables 132-1 and 132-2 may be disposed between the first electrode portion 131*b* and the first cover member 131*d* of each of the first and second vibration generating portions 131-1 and 131-2 and may be integrated as one body with the vibration device 131.

The second cover member 131*e* according to an example embodiment of the present disclosure may be connected or coupled to the second electrode portion 131*c* of each of the first and second vibration generating portions 131-1 and 131-2 and the second protrusion line FLb of each of the first and second signal cables 132-1 and 132-2 by a second adhesive layer 131*g*. Accordingly, the second protrusion line (or a second finger line) FLb of each of the first and second signal cables 132-1 and 132-2 may be disposed between the second electrode portion 131*c* and the second cover member 131*e* of each of the first and second vibration generating portions 131-1 and 131-2 and may be integrated as one body with the vibration device 131.

The first adhesive layer 131*f* may be disposed between the first and second vibration generating portions 131-1 and 131-2 and disposed at a first surface of each of the first and second vibration generating portions 131-1 and 131-2. The second adhesive layer 131*g* may be disposed between the first and second vibration generating portions 131-1 and 131-2 and disposed at a second surface of each of the first and second vibration generating portions 131-1 and 131-2. For example, the first and second adhesive layers 131*f* and 131*g* may be configured between the first cover member 131*d* and the second cover member 131*e* to completely surround each of the first and second vibration generating portions 131-1 and 131-2. The first and second adhesive layers 131*f* and 131*g* may be connected or coupled to each other between the first and second vibration generating portions 131-1 and 131-2.

Optionally, as described above with reference to FIGS. 27 to 29, at least a portion of each of the first and second signal cables 132-1 and 132-2 may be disposed or inserted between the first cover member 131*d* and the second cover member 131*e*, and thus, disconnections of the first and second protrusion lines FLa and FLb caused by a stress such as the movement or bending of the signal cable 132 may be prevented.

As described above, like the vibration device 131 described above with reference to FIGS. 21 and 22, the vibration device 131 according to another example embodiment of the present disclosure may be driven as a large-area vibrator based on a single-body vibration of the first and second vibration generating portions 131-1 and 131-2. In addition, in the vibration device 131 according to another example embodiment of the present disclosure, like the vibration device 131 described above with reference to FIGS. 27 to 29, a structure and a manufacturing process may be simplified, an electrical characteristic of each of the first and second electrode portions 131*b* and 131*c* may be complemented, a connection structure between the first and second vibration generating portions 131-1 and 131-2, the first and second sound processing circuits 137*a* and 137*b*, and the first and second signal cables 132-1 and 132-2, and the sound data generating circuit part may be simplified, and a filter circuit including an inductor and a capacitor for preventing EMI or the like may be omitted.

Optionally, in the vibration device 131 according to another example embodiment of the present disclosure, as in a dotted line illustrated in FIG. 30, the first and second signal cables 132-1 and 132-2 may be modified or configured as one signal cable 132. The one signal cable 132 according to an example embodiment of the present disclosure may be simply configured as one signal cable without changing a structure of each of the first and second signal cables 132-1 and 132-2, and thus, may have a width which is greater than a sum of widths of the first and second signal cables 132-1 and 132-2. The one signal cable 132 according to another example embodiment of the present disclosure may be configured so that one periphery portion of a body portion with the first and second sound processing circuits 137*a* and 137*b* mounted thereon has a relatively wide width and the other portion, except the one periphery portion, of the body portion has the same width as that of any one of the first and second signal cables 132-1 and 132-2.

Additionally, in the vibration device 131 according to another example embodiment of the present disclosure, the first and second signal cables 132-1 and 132-2 including the protrusion lines FLa and FLb may be identically applied to the signal cable 132 of the vibration apparatus 230 illustrated in FIGS. 24 and 25.

Figure 32:
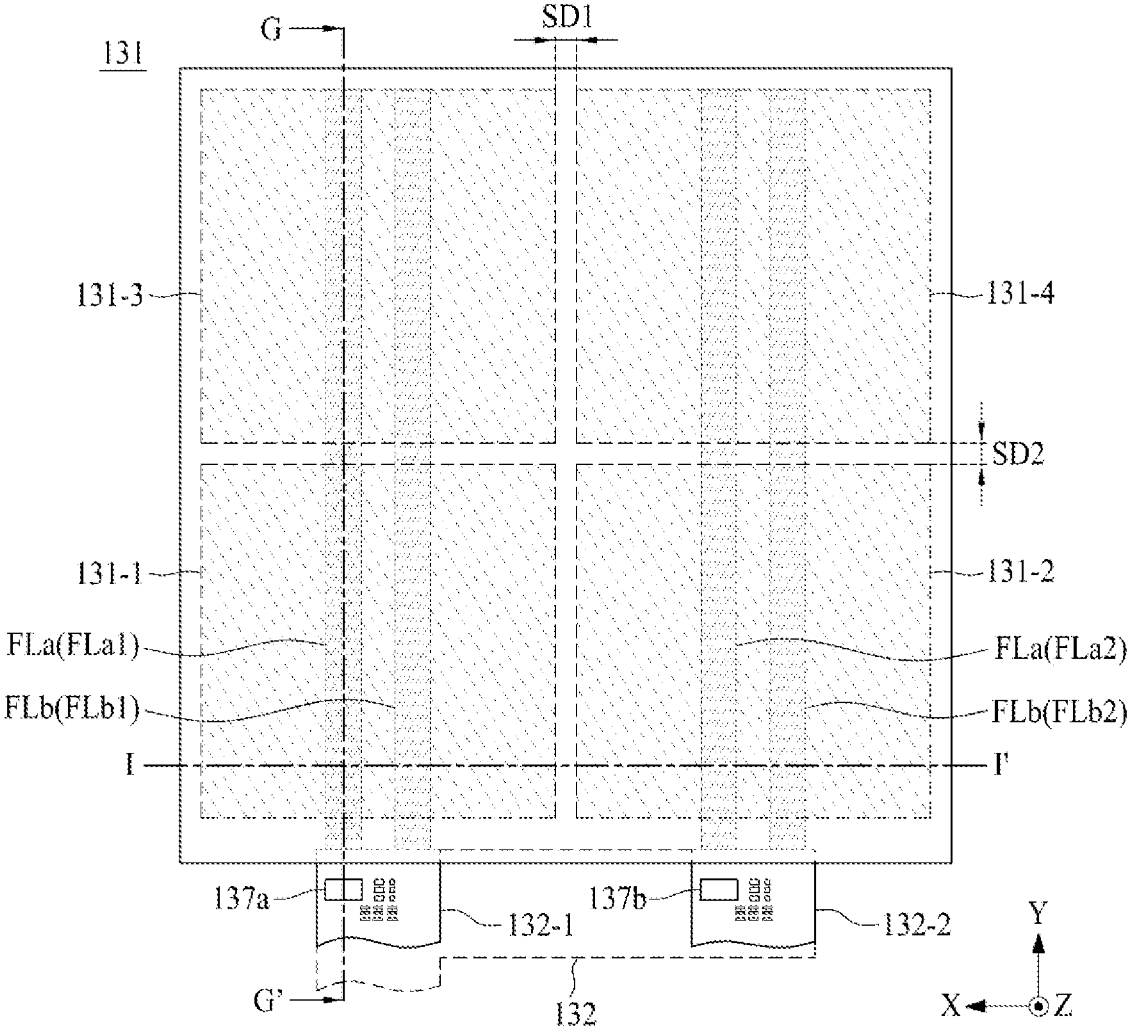
FIG. 32 illustrates a vibration device according to another example embodiment of the present disclosure.

FIG. 32 illustrates a vibration device according to another example embodiment of the present disclosure. FIG. 32 illustrates an example embodiment where four vibration generating portions are provided at the vibration device illustrated in FIGS. 30 and 31. Hereinafter, therefore, the elements except four vibration generating portions and relevant elements may be referred to by like reference numerals, and their repetitive descriptions may be omitted or will be briefly given. An example of a cross-sectional surface taken along line G-G' illustrated in FIG. 32 is illustrated in FIG. 28, and an example of a cross-sectional surface taken along line I-I' illustrated in FIG. 32 is illustrated in FIG. 31.

With reference to FIG. 32 in conjunction with FIGS. 28 and 31, the vibration device 131 according to another example embodiment of the present disclosure may include a plurality of vibration generating portions 131-1 to 131-4, a first signal cable 132-1, and a second signal cable 132-2.

Each of the plurality of vibration generating portions 131-1 to 131-4 may be electrically disconnected and disposed spaced apart from one another along a first direction X and a second direction Y. For example, the plurality of vibration generating portions 131-1 to 131-4 may be arranged or tiled in an i×j form on the same plane. Each of the plurality of vibration generating portions 131-1 to 131-4 may include a piezoelectric vibration portion 131*a*, a first electrode portion 131*b*, and a second electrode portion 131*c*. Each of the plurality of vibration generating portions 131-1 to 131-4 may be substantially the same as each of the plurality of vibration generating portions 131-1 to 131-4 of the vibration device 131 described above with reference to FIG. 23, and thus, like reference numerals may refer to like elements, and their repetitive descriptions may be omitted. Hereinafter, an example where the vibration device 131 includes first to fourth vibration generating portions 131-1 to 131-4 will be described.

The first signal cable 132-1 may be electrically connected or electrically and directly connected to the first and second electrode portions 131*b* and 131*c* of each of the first and third vibration generating portions 131-1 and 131-3 at one side of the vibration device 131, and thus, may be integrated into the first and third vibration generating portions 131-1 and 131-3. For example, the first signal cable 132-1 may not pass through the power supply line and the pad part described above with reference to FIG. 23 and may be electrically connected to the first and second electrode portions 131*b* and 131*c* of each of the first and third vibration generating portions 131-1 and 131-3.

The second signal cable 132-2 may be electrically connected or electrically and directly connected to the first and second electrode portions 131*b* and 131*c* of each of the second and fourth vibration generating portions 131-2 and 131-4 at one side of the vibration device 131, and thus, may be integrated into the second and fourth vibration generating portions 131-2 and 131-4. For example, the second signal cable 132-2 may not pass through the power supply line and the pad part described above with reference to FIG. 23 and may be electrically connected to the first and second electrode portions 131*b* and 131*c* of each of the second and fourth vibration generating portions 131-2 and 131-4.

Each of the first and second signal cables 132-1 and 132-2 according to an example embodiment of the present disclosure may include first and second protrusion lines FLa and FLb. For example, each of the first and second protrusion lines FLa and FLb may be referred to as a protrusion electrode, an extension line, an extension electrode, a flexible protrusion electrode, a flexible connection line, a flexible conductive line, a finger line, or a finger electrode, but embodiments of the present disclosure are not limited thereto.

The first protrusion line FLa of the first signal cable 132-1 (or a first upper protrusion line FLa1) may overlap at least a portion of the first electrode portion 131*b* of each of the first and third vibration generating portions 131-1 and 131-3 and may be electrically connected or electrically and directly connected to the first electrode portion 131*b*. The second protrusion line FLb of the first signal cable 132-1 (or a first lower protrusion line FLb1) may overlap at least a portion of the second electrode portion 131*c* of each of the first and third vibration generating portions 131-1 and 131-3 and may be electrically connected or electrically and directly connected to the second electrode portion 131*c*. For example, each of the first and second protrusion lines FLa and FLb of the first signal cable 132-1 may be bent toward a corresponding electrode portion of the first and second electrode portions 131*b* and 131*c* of each of the first and third vibration generating portions 131-1 and 131-3, but embodiments of the present disclosure are not limited thereto.

The first protrusion line FLa of the second signal cable 132-2 (or a second upper protrusion line FLa2) may overlap at least a portion of the first electrode portion 131*b* of each of the second and fourth vibration generating portions 131-2 and 131-4 and may be electrically connected or electrically and directly connected to the first electrode portion 131*b*. The second protrusion line FLb of the second signal cable 132-2 (or a second lower protrusion line FLb2) may overlap at least a portion of the second electrode portion 131*c* of each of the second and fourth vibration generating portions 131-2 and 131-4 and may be electrically connected or electrically and directly connected to the second electrode portion 131*c*. For example, each of the first and second protrusion lines FLa and FLb of the second signal cable 132-2 may be bent toward a corresponding electrode portion of the first and second electrode portions 131*b* and 131*c* of each of the second and fourth vibration generating portions 131-2 and 131-4, but embodiments of the present disclosure are not limited thereto.

Each of the first and second signal cables 132-1 and 132-2 according to an example embodiment of the present disclosure may include a body portion, the first and second protrusion lines FLa and FLb, and sound processing circuits 137*a* and 137*b*. Each of the first and second signal cables 132-1 and 132-2 may be substantially the same as the signal cable 132 described above with reference to FIGS. 27 to 29, and thus, like reference numerals may refer to like elements, and their repetitive descriptions may be omitted or will be briefly given.

The sound processing circuit (or a first sound processing circuit) 137*a* mounted on or integrated into the first signal cable 132-1 may generate first and second vibration driving signals based on sound data supplied from an external sound data generating circuit part and may supply the first and second vibration driving signals to the first and second electrode portions 131*b* and 131*c* of each of the first and third vibration generating portions 131-1 and 131-3 through the first and second protrusion lines FLa and FLb. The sound processing circuit 137*a* mounted on the first signal cable 132-1 may include a decoding part, an audio amplifier circuit, a memory circuit, a control circuit, and a passive element such as a resistor, or the like. The elements of the sound processing circuit 137*a* may be substantially the same as the elements of the sound processing circuit 137 described above with reference to FIGS. 26 to 28, and thus, like reference numerals may refer to like elements, and the repetitive description thereof may be omitted.

The sound processing circuit (or a second sound processing circuit) 137*b* mounted on or integrated into the second signal cable 132-2 may generate first and second vibration driving signals based on sound data supplied from an external sound data generating circuit part and may supply the first and second vibration driving signals to the first and second electrode portions 131*b* and 131*c* of each of the second and fourth vibration generating portions 131-2 and 131-4 through the first and second protrusion lines FLa and FLb. The sound processing circuit 137*b* mounted on the second signal cable 132-2 may include a decoding part, an audio amplifier circuit, a memory circuit, a control circuit, and a passive element such as a resistor, or the like. The elements of the sound processing circuit 137*b* may be substantially the same as the elements of the sound processing circuit 137 described above with reference to FIGS. 26 to 28, and thus, like reference numerals may refer to like elements, and the repetitive description thereof may be omitted.

The vibration device 131 according to another example embodiment of the present disclosure may further include a first cover member 131*d* and a second cover member 131*e*. Except that the first and second cover member 131*d* and 131*e* are configured to respectively cover the first to fourth vibration generating portions 131-1 to 131-4 and the first and second protrusion lines FLa and FLb of each of the first and second signal cables 132-1 and 132-2, the first and second cover member 131*d* and 131*e* may be substantially the same as the first and second cover member 131*d* and 131*e* described above with reference to FIG. 23 or 27 to 28, and thus, like reference numerals may refer to like elements, and their repetitive descriptions may be omitted or will be briefly given.

The first cover member 131*d* may be disposed at the first surface of the vibration device 131. For example, the first cover member 131*d* may be configured to cover the first electrode portion 131*b* of each of the first to fourth vibration generating portions 131-1 to 131-4 and the first protrusion line FLa of each of the first and second signal cables 132-1 and 132-2.

The second cover member 131*e* may be disposed at the second surface of the vibration device 131. For example, the second cover member 131*e* may be configured to cover the second electrode portion 131*c* of each of the first to fourth vibration generating portions 131-1 to 131-4 and the second protrusion line FLb of each of the first and second signal cables 132-1 and 132-2.

The first cover member 131*d* according to an example embodiment of the present disclosure may be connected or coupled to the first electrode portion 131*b* of each of the first to fourth vibration generating portions 131-1 to 131-4 and the first protrusion line FLa of each of the first and second signal cables 132-1 and 132-2 by a first adhesive layer 131*f*. Accordingly, the first protrusion line (or a first finger line) FLa of each of the first and second signal cables 132-1 and 132-2 may be disposed between the first electrode portion 131*b* and the first cover member 131*d* of each of the first to fourth vibration generating portions 131-1 to 131-4 and may be integrated as one body with the vibration device 131.

The second cover member 131*e* according to an example embodiment of the present disclosure may be connected or coupled to the second electrode portion 131*c* of each of the first to fourth vibration generating portions 131-1 to 131-4 and the second protrusion line FLb of each of the first and second signal cables 132-1 and 132-2 by a second adhesive layer 131*g*. Accordingly, the second protrusion line (or a second finger line) FLb of each of the first and second signal cables 132-1 and 132-2 may be disposed between the second electrode portion 131*c* and the second cover member 131*e* of each of the first to fourth vibration generating portions 131-1 to 131-4 and may be integrated as one body with the vibration device 131.

The first adhesive layer 131*f* may be disposed between the first to fourth vibration generating portions 131-1 to 131-4 and disposed at a first surface of each of the first to fourth vibration generating portions 131-1 to 131-4. The second adhesive layer 131*g* may be disposed between the first to fourth vibration generating portions 131-1 to 131-4 and disposed at a second surface of each of the first to fourth vibration generating portions 131-1 to 131-4. For example, the first and second adhesive layers 131*f* and 131*g* may be configured between the first cover member 131*d* and the second cover member 131*e* to completely surround each of the first to fourth vibration generating portions 131-1 to 131-4. The first and second adhesive layers 131*f* and 131*g* may be connected or coupled to each other between the first to fourth vibration generating portions 131-1 to 131-4.

Optionally, as described above with reference to FIGS. 27 to 29, at least a portion of each of the first and second signal cables 132-1 and 132-2 may be disposed or inserted between the first cover member 131*d* and the second cover member 131*e*, and thus, disconnections of the first and second protrusion lines FLa and FLb caused by a stress such as the movement or bending of the signal cable 132 may be prevented.

As described above, like the vibration device 131 described above with reference to FIG. 23, the vibration device 131 according to another example embodiment of the present disclosure may be driven as a large-area vibration body based on a single-body vibration of the first to fourth vibration generating portions 131-1 to 131-4. In addition, like the vibration device 131 described above with reference to FIGS. 27 to 29, in the vibration device 131 according to another example embodiment of the present disclosure, a structure and a manufacturing process may be simplified, an electrical characteristic of each of the first and second electrode portions 131*b* and 131*c* may be complemented, a connection structure between the first to fourth vibration generating portions 131-1 to 131-4, the sound processing circuits 137*a* and 137*b*, the signal cables 132-1 and 132-2, and the sound data generating circuit part may be simplified, and a filter circuit including an inductor and a capacitor for preventing EMI or the like may be omitted.

Optionally, in the vibration device 131 according to another example embodiment of the present disclosure, as in a dotted line illustrated in FIG. 32, the first and second signal cables 132-1 and 132-2 may be modified or configured as one signal cable 132. The one signal cable 132 according to an example embodiment of the present disclosure may be configured as one without modifying a structure of the first and second signal cables 132-1 and 132-2, and thus, may have a width which is wider than a sum of widths of the first and second signal cables 132-1 and 132-2. The one signal cable 132 according to an example embodiment of the present disclosure may be configured so that one periphery portion of a body portion with the first and second sound processing circuits 137*a* and 137*b* mounted thereon has a relatively wide width and the other portion, except the one periphery portion, of the body portion has the same width as that of any one of the first and second signal cables 132-1 and 132-2.

Additionally, in the vibration device 131 according to another example embodiment of the present disclosure, the first and second signal cables 132-1 and 132-2 including the protrusion lines FLa and FLb may be identically applied to the signal cable 132 of the vibration apparatus 230 illustrated in FIGS. 24 and 25.

Figure 33:
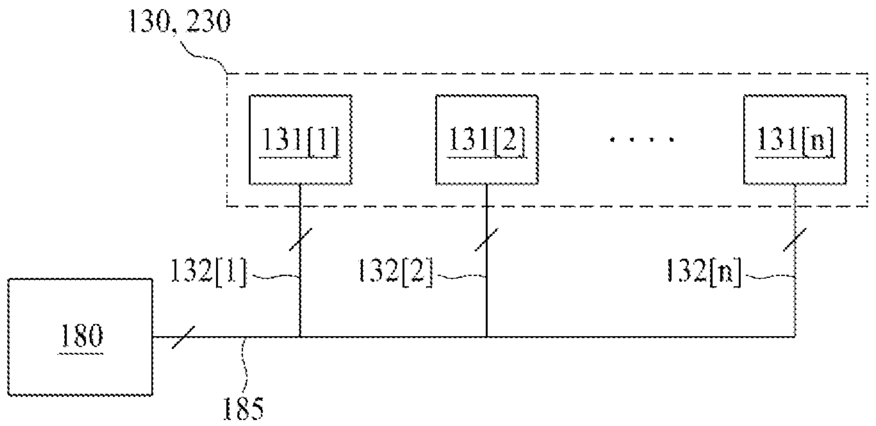
FIG. 33 illustrates a sound apparatus according to another example embodiment of the present disclosure.
Figure 34:
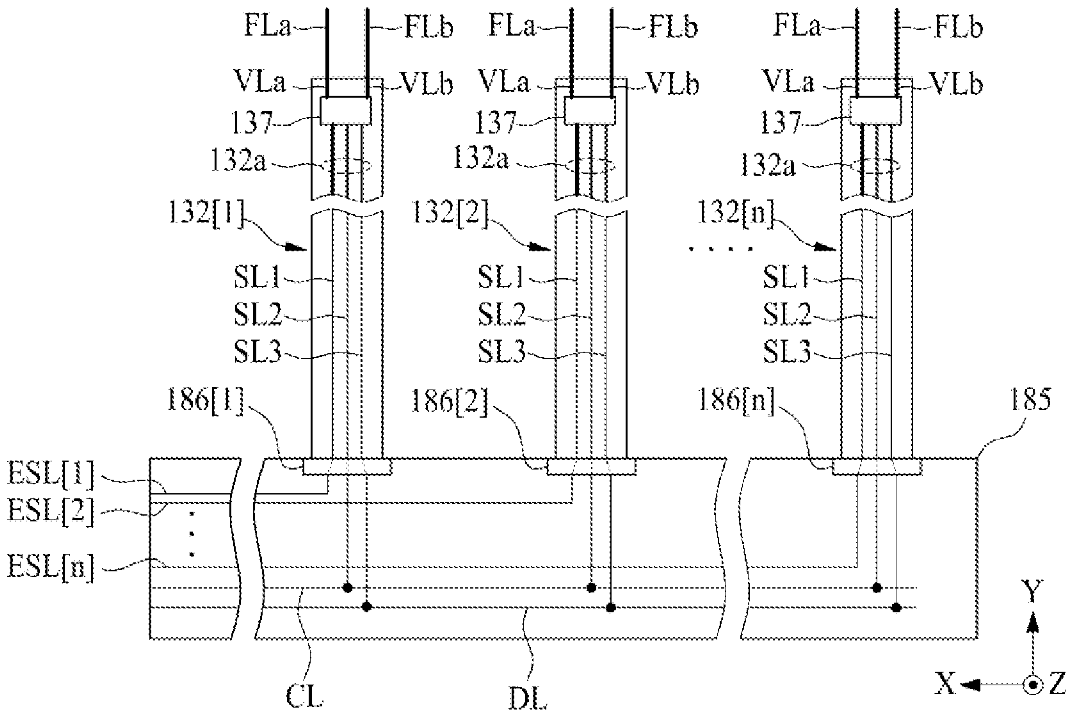
FIG. 34 illustrates an example of a main cable and first to $n^{th}$ signal cables illustrated in FIG. 33.
Figure 35:
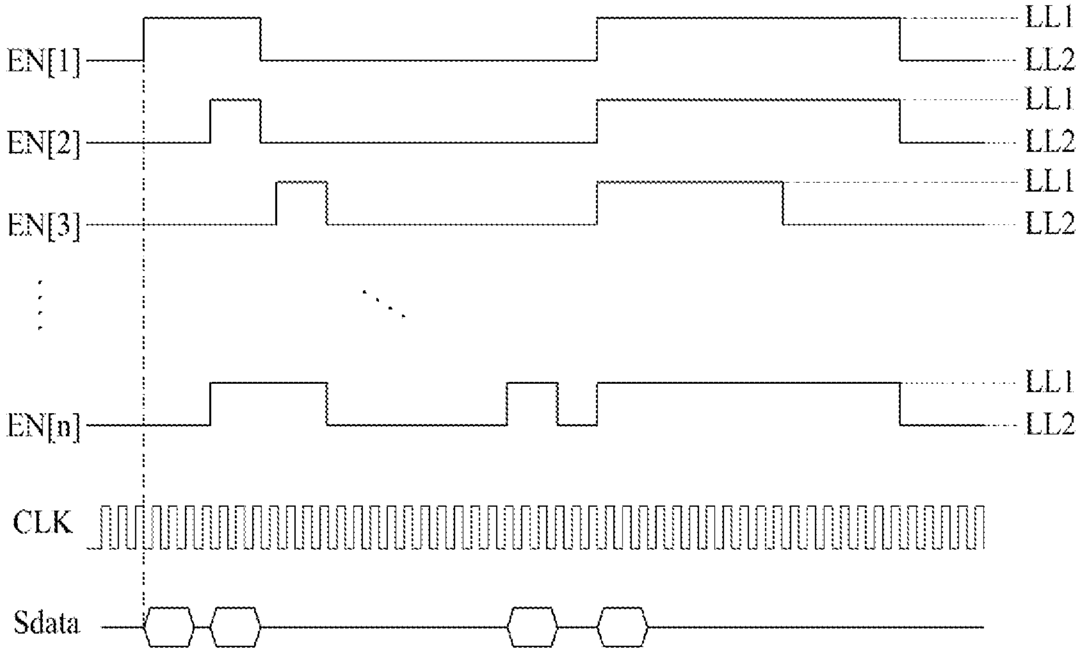
FIG. 35 is an example of a waveform diagram showing an output signal of a sound data generating circuit part illustrated in FIG. 33.

FIG. 33 illustrates an apparatus according to an example embodiment of the present disclosure. FIG. 34 illustrates an example of a main cable and first to $n^{th}$ signal cables illustrated in FIG. 33. FIG. 35 is an example of a waveform diagram showing an output signal of the sound data generating circuit part illustrated in FIG. 33. FIGS. 33 to 35 illustrate an apparatus including or applying the vibration apparatus illustrated in one or more of FIGS. 1 to 32.

With reference to FIGS. 33 to 35, the apparatus according to an example embodiment of the present disclosure may include a vibration apparatus 130 or 230, a sound data generating circuit part 180, a main cable 185, and first to $n^{th}$ signal cables 132[1] to 132[*n*].

The vibration apparatuses 130 or 230 may each be a vibration apparatus provided in one of the sound apparatuses 10, 20, and 30 described above with reference to FIGS. 1 to 32.

The vibration apparatuses 130 or 230 may include first to $n^{th}$ vibration devices 131[1] to 131[*n*]. Each of the first to $n^{th}$ vibration devices 131[1] to 131[*n*] may include one of the vibration devices 131 and 231-1 to 231-5 described above with reference to FIGS. 26 to 32. For example, the first to $n^{th}$ vibration devices 131[1] to 131[*n*] may be the same or different from each other. The one or more of the first to $n^{th}$ vibration devices 131[1] to 131[*n*] may differ from each other. Therefore, the repetitive description of each of the first to $n^{th}$ vibration devices 131[1] to 131[*n*] may be omitted.

The sound data generating circuit part 180 (or a sound card) may generate sound data Sdata based on a sound source (or a digital sound source). The sound data generating circuit part 180 may generate first to $n^{th}$ enable signals EN[1] to EN[n] corresponding to a driving mode of the apparatus based on the sound source or the sound data. The sound data generating circuit part 180 may encode a reference clock CLK, the sound data Sdata, and the first to $n^{th}$ enable signals EN[1] to EN[n] based on a predetermined serial interface type (or a digital serial interface type) and may supply the encoded reference clock CLK, sound data Sdata, and first to $n^{th}$ enable signals EN[1] to EN[n] to the first to $n^{th}$ vibration devices 131[1] to 131[*n*]. For example, the sound data generating circuit part 180 may transfer the sound data Sdata corresponding to each of the first to $n^{th}$ vibration devices 131[1] to 131[*n*] based on the serial interface type. For example, the serial interface type may be an integrated interchip sound (I2S), but embodiments of the present disclosure are not limited thereto.

The main cable 185 may be connected to the sound data generating circuit part 180. For example, the main cable 185 may have a length corresponding to a longest distance between the sound data generating circuit part 180 and each of the first to $n^{th}$ vibration devices 131[1] to 131[*n*].

The main cable 185 according to an example embodiment of the present disclosure may include first to $n^{th}$ enable signal lines ESL[1] to ESL[n], a clock line CL, and a data line DL.

The sound data generating circuit part 180 may supply the first to $n^{th}$ enable signals EN[1] to EN[n] respectively corresponding to the first to $n^{th}$ enable signal lines ESL[1] to ESL[n], supply the reference clock CLK to the clock line CL, and supply the sound data Sdata to the data line DL.

Each of the first to $n^{th}$ signal cables 132[1] to 132[*n*] may be connected between the main cable 185 and a corresponding vibration device of the first to $n^{th}$ vibration devices 131[1] to 131[*n*].

Each of the first to $n^{th}$ signal cables 132[1] to 132[*n*] according to an example embodiment of the present disclosure may branch or extend from the main cable 185 to a corresponding vibration device of the first to $n^{th}$ vibration devices 131[1] to 131[*n*]. For example, each of the first to $n^{th}$ signal cables 132[1] to 132[*n*] may branch or extend from the main cable 185 and may be individually connected to a corresponding vibration device of the first to $n^{th}$ vibration devices 131[1] to 131[*n*].

According to another example embodiment of the present disclosure, each of the first to $n^{th}$ signal cables 132[1] to 132[*n*] may be connected to the main cable 185 based on a connector scheme. For example, the main cable 185 may further include first to $n^{th}$ connectors 186[1] to 186[*n*].

Each of the first to $n^{th}$ connectors 186[1] to 186[*n*] may include first to third connection terminals. The first connection terminal of each of the first to $n^{th}$ connectors 186[1] to 186[*n*] may be electrically connected to a corresponding enable signal line of the first to $n^{th}$ enable signal lines ESL[1] to ESL[n]. The second connection terminal of each of the first to $n^{th}$ connectors 186[1] to 186[*n*] may be electrically connected to the clock line CL in common. The third connection terminal of each of the first to $n^{th}$ connectors 186[1] to 186[*n*] may be electrically connected to the data line DL in common.

According to an example embodiment of the present disclosure, at least a portion of each of the first to $n^{th}$ signal cables 132[1] to 132[*n*] connected to the main cable 185 by the connector scheme may be inserted between the first and second cover members 131*d* and 131*e* of the vibration device 131 as described above with reference to FIG. 28, and thus, their repetitive descriptions may be omitted.

Each of the first to $n^{th}$ signal cables 132[1] to 132[*n*] according to an example embodiment of the present disclosure may include a body portion, first and second protrusion lines FLa and FLb, and a sound processing circuit 137.

The body portion, as illustrated in FIG. 28, may include a line layer 132*a*, a lower film 132*b* coupled to a first surface of the line layer 132*a* by a first adhesive 132*c*, an upper film 132*d* coupled to a second surface of the line layer 132*a* by a second adhesive 132*e*, and a plurality of contact pads disposed at the upper film 132*d* and connected to the line layer 132*a*.

The line layer 132*a* may include first to third signal lines SL1, SL2, and SL3 and first and second driving signal supply lines VLa and VLb.

The first to third signal lines SL1 to SL3 may be disposed to be parallel to each other.

The first signal line SL1 of each of the first to $n^{th}$ signal cables 132[1] to 132[*n*] may be individually connected to a corresponding enable signal line of the first to $n^{th}$ enable signal lines ESL[1] to ESL[n] of the main cable 185. For example, the first signal line SL1 of the first signal cable 132[1] may be electrically connected to the first enable signal line ESL[1] of the main cable 185, and the first signal line SL1 of the $n^{th}$ signal cable 132[*n*] may be electrically connected to the $n^{th}$ enable signal line ESL[n] of the main cable 185.

The second signal line SL2 of each of the first to $n^{th}$ signal cables 132[1] to 132[*n*] may be connected to the clock line CL of the main cable 185 in common.

The third signal line SL3 of each of the first to $n^{th}$ signal cables 132[1] to 132[*n*] may be connected to the data line DL of the main cable 185 in common.

Each of the first and second driving signal supply lines VLa and VLb may be disposed in parallel with an end portion of a corresponding signal cable of the first to $n^{th}$ signal cables 132[1] to 132[*n*].

The first and second protrusion lines FLa and FLb may be respectively and electrically connected to the first and second driving signal supply lines VLa and VLb, or may pass through one surface of the body portion from each of the first and second driving signal supply lines VLa and VLb and may extend or protrude to the outside.

The first protrusion line FLa may be electrically connected to a first electrode portion of any one of the vibration devices 131 and 231-1 to 231-5 of a corresponding vibration apparatus, and the second protrusion line FLb may be electrically connected to a second electrode portion of any one of the vibration devices 131 and 231-1 to 231-5 of a corresponding vibration apparatus. This is as described above, and thus, their repetitive descriptions may be omitted.

The sound processing circuit 137 may be mounted on each of the first to $n^{th}$ signal cables 132[1] to 132[*n*] and may be electrically connected to each of the first to third signal lines SL1 to SL3 and each of the first and second driving signal supply lines VLa and VLb.

The sound processing circuit 137 may decode the reference clock CLK, the sound data Sdata, and the first to $n^{th}$ enable signals EN[1] to EN[n] supplied from the sound data generating circuit part 180 through the first to third signal lines SL1 to SL3, generate first and second vibration driving signals for vibrating each of the first to $n^{th}$ vibration devices 131[1] to 131[*n*] based on the decoded reference clock CLK, sound data Sdata, and first to $n^{th}$ enable signals EN[1] to EN[n], and output the first and second vibration driving signals to the first and second driving signal supply lines VLa and VLb. Therefore, each of the first to $n^{th}$ vibration devices 131[1] to 131[*n*] may vibrate based on the first and second vibration driving signals supplied through the first and second driving signal supply lines VLa and VLb and the first and second protrusion lines FLa and FLb of a corresponding signal cable of the first to $n^{th}$ signal cables 132[1] to 132[*n*] to output a sound corresponding to the sound data Sdata. For example, each of the first to $n^{th}$ vibration devices 131[1] to 131[*n*] may be sequentially or simultaneously driven based on corresponding enable signals EN[1] to EN[n].

According to an example embodiment of the present disclosure, the sound processing circuit 137 mounted on each of the first to $n^{th}$ signal cables 132[1] to 132[*n*] may be enabled based on an enable signal having a first logic level LL1 supplied through the first signal line SL1 of a corresponding signal cable to generate the first and second vibration driving signals, or may be disabled based on a disable signal having a second logic level LL2. For example, the sound processing circuit 137 mounted on the first signal cable 132[1] may be enabled based on the first enable signal EN[1] having the first logic level LL1 supplied through the first signal line SL1 of the first enable signal EN[1], generate the first and second vibration driving signals based on the reference clock CLK and the sound data Sdata, and output the first and second vibration driving signals to the first and second driving signal supply lines VLa and VLb. Likewise, the sound processing circuit 137 mounted on the $n^{th}$ signal cable 132[*n*] may be enabled based on the $n^{th}$ enable signal EN[n] having the first logic level LL1 supplied through the first signal line SL1 of the $n^{th}$ enable signal EN[1], generate the first and second vibration driving signals based on the reference clock CLK and the sound data Sdata, and output the first and second vibration driving signals to the first and second driving signal supply lines VLa and VLb.

As described above, in the vibration apparatus according to an example embodiment of the present disclosure, the sound data Sdata output from the sound data generating circuit part 180 may be transferred to each of the first to $n^{th}$ vibration devices 131[1] to 131[*n*] based on a serial interface type using the main cable 185 and the first to $n^{th}$ signal cables 132[1] to 132[*n*], and thus, a line structure between the sound data generating circuit part 180 and the first to $n^{th}$ vibration devices 131[1] to 131[*n*] may be simplified and assemblability may be enhanced. In addition, as the sound processing circuit 137 is mounted on each of the first to $n^{th}$ signal cables 132[1] to 132[*n*], a circuit configuration may be simplified, and a filter circuit including an inductor and a capacitor for preventing EMI or the like occurring due to a length of each of the main cable 185 and the first to $n^{th}$ signal cables 132[1] to 132[*n*] may be omitted.

Figure 36:
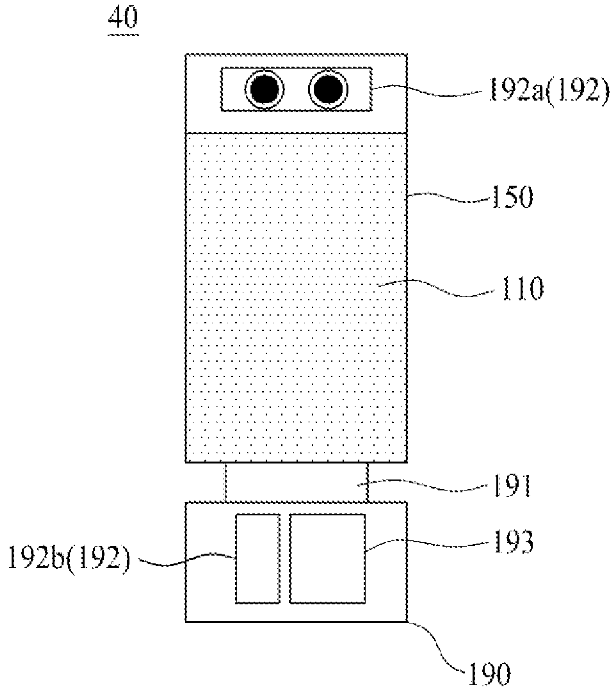
FIG. 36 illustrates a sound apparatus according to another example embodiment of the present disclosure.

FIG. 36 illustrates a sound apparatus 40 according to another example embodiment of the present disclosure.

With reference to FIG. 36, the sound apparatus 40 according to another example embodiment of the present disclosure may include a stand 190, a motor 191, a sensing part 192, and a motor driver 193.

The stand 190 may rotatably support the housing 150 of any of the sound apparatuses 10, 20, and 30 described above with reference to one of FIGS. 1 to 35. For example, the stand 190 may include a rotation shaft which is rotatably connected to a lateral portion of the housing 150.

The motor 191 may be accommodated into the stand 190 so as to be connected to the rotation shaft. The motor 191 may rotate the rotation shaft to rotate the housing 150, and thus, may rotate a front surface of a vibration member 110.

The sensing part 192 may be disposed at the housing 150 or the stand 190 and may sense one or more of a position and a motion of a listener (or a user) to generate sensing information.

The sensing part 192 according to an example embodiment of the present disclosure may sense one or more of the position and the motion of the listener (or the user) through ultrasound sensing to generate the sensing information. For example, the sensing part 192 may include an ultrasound sensor 192*a*, which may transfer (or transmit) and receive an ultrasound wave, and a sensing circuit 192*b*, which may be accommodated into the stand 190 (or the housing 150) and generate the sensing information based on the ultrasound wave received from the ultrasound sensor 192*a*.

The sensing part 192 according to another example embodiment of the present disclosure may sense one or more of the position and the motion of the listener (or the user) through a motion track camera to generate the sensing information. For example, the sensing part 192 may include a motion track camera, which may track one or more of the position and the motion of the listener (or the user), and a data processing circuit, which may generate the sensing information corresponding to one or more of the position and the motion of the listener (or the user) based on data signal supplied from the motion track camera.

While examples of the sensing part 192 are described above, embodiments of the present disclosure are not limited thereto.

The motor driver 193 may generate a motor driving signal based on the sensing information supplied from the sensing part 192 to drive the motor 191. Therefore, in response to the motor driving signal supplied from the motor driver 193, the motor 191 may rotate the rotation shaft so that the front surface of the vibration member 110 corresponds to one or more of the position and the motion of the listener (or the user).

As described above, the sound apparatus 40 according to another example embodiment of the present disclosure may rotate the housing 150 based on the sensing information about one or more of the position and the motion of the listener (or the user) sensed through the sensing part 192, and thus, may provide the listener (or the user) with a sound optimized for one or more of the position and the motion of the listener (or the user).

Figure 37:
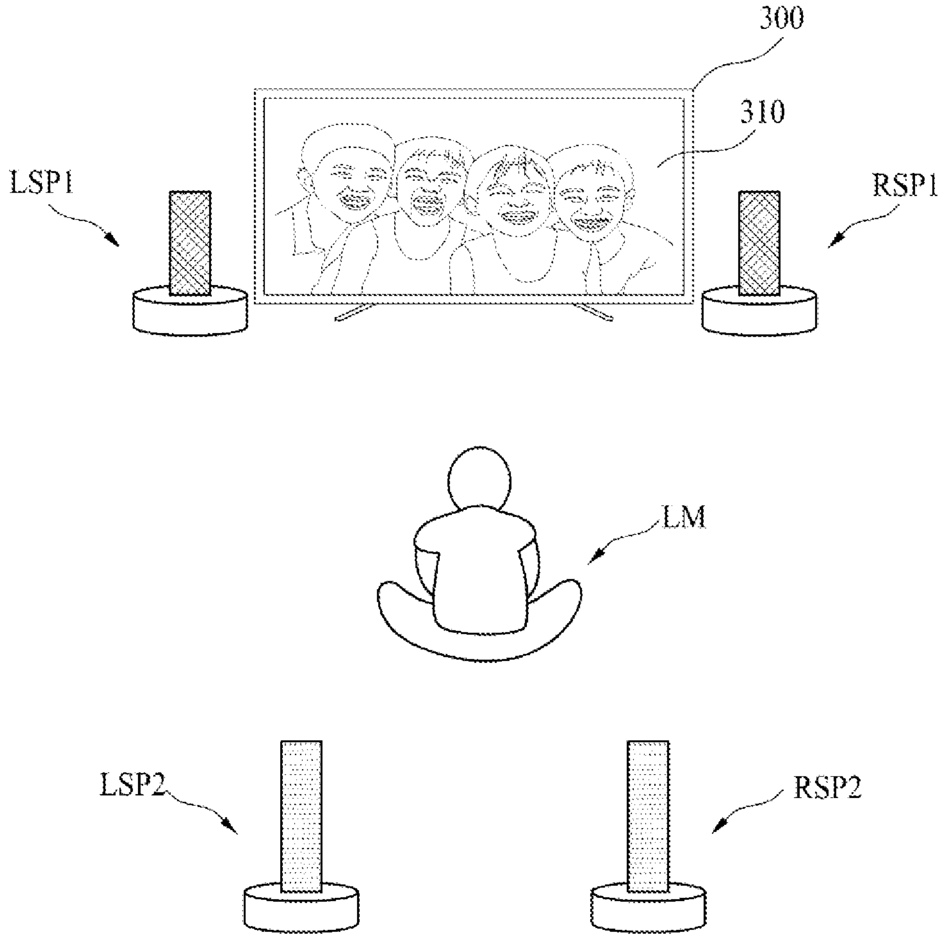
FIG. 37 illustrates a sound system according to an example embodiment of the present disclosure.
Figure 38:
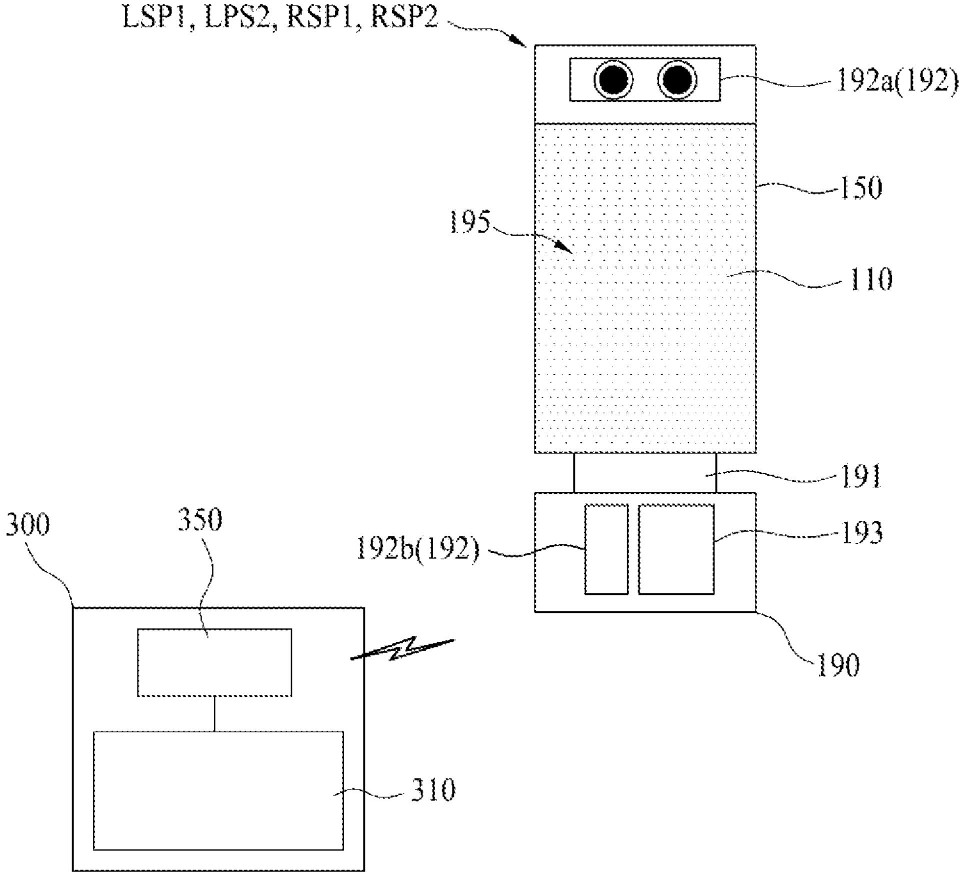
FIG. 38 illustrates an example of a speaker apparatus and a panel driving circuit of a display apparatus illustrated in FIG. 37.
Figure 39:
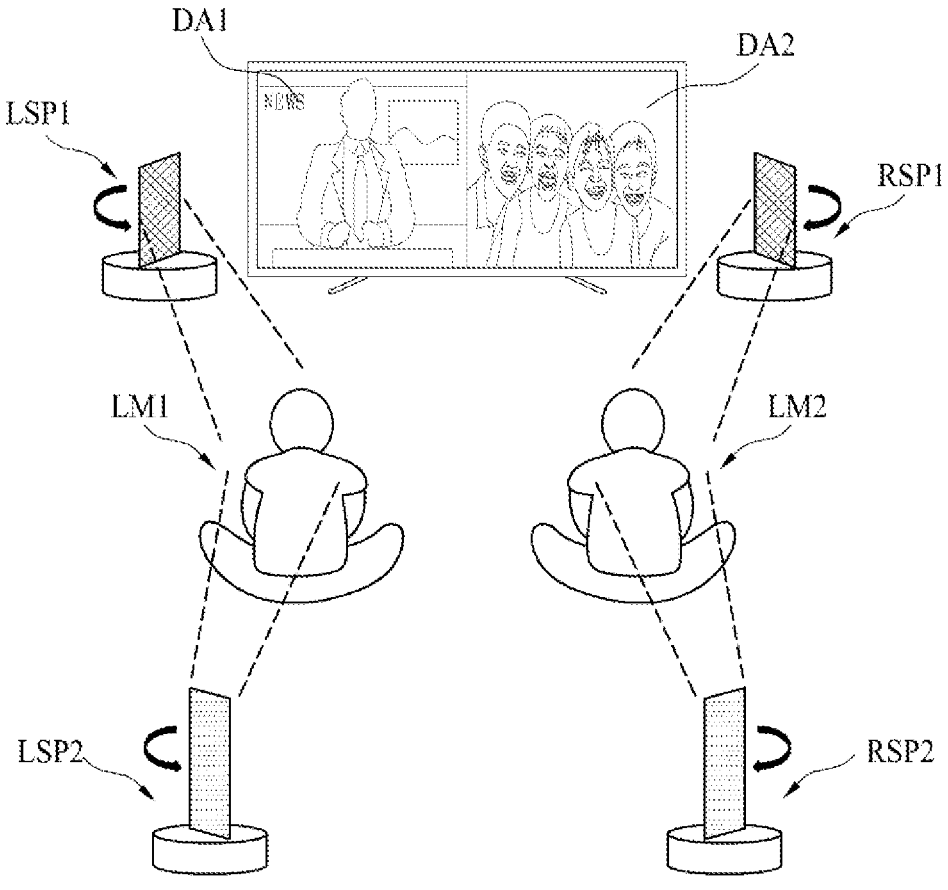
FIG. 39 is a conceptual diagram illustrating an orientation-based sound of a sound system according to an example embodiment of the present disclosure.

FIG. 37 illustrates a sound system according to an example embodiment of the present disclosure. FIG. 38 illustrates an example of a speaker apparatus and a panel driving circuit of a display apparatus illustrated in FIG. 37. FIG. 39 is a conceptual diagram illustrating an orientation-based sound of a sound system according to an example embodiment of the present disclosure.

With reference to FIGS. 37 to 39, the sound system according to an example embodiment of the present disclosure may include a display apparatus 300, one or more first speaker apparatuses LSP1 and LSP2, and one or more second speaker apparatuses RSP1 and RSP2.

The display apparatus 300 may include a display panel 310 and a display driving circuit 350.

The display panel 310 may include a screen including a plurality of pixels for displaying an image.

The display driving circuit 350 may be configured to display an image corresponding to an input image source on the display panel 310. In addition, the display driving circuit 350 may display different images on a first region DA1 and a second region DA2 of a screen of the display panel 310, may generate a screen division mode signal, and may transfer (or transmit) the screen division mode signal to the one or more first speaker apparatuses LSP1 and LSP2 and the one or more second speaker apparatuses RSP1 and RSP2 through, for example, close-distance wireless communication. In addition, the display driving circuit 350 may transfer (or transmit) the screen division mode signal and sound data corresponding to the image displayed on each of the first region DA1 and the second region DA2 of the screen.

The one or more first speaker apparatuses LSP1 and LSP2 may include a sound output apparatus 195 which is rotatably disposed near a first side of the display apparatus 300. For example, the one or more first speaker apparatuses LSP1 and LSP2 may be one or more left speakers. The one or more first speaker apparatuses LSP1 and LSP2 may rotate the sound output apparatus 195 toward a first listener LM1 near the first region of the display panel 310 in response to the sound data and the screen division mode signal transferred from the display driving circuit 350.

The one or more second speaker apparatuses RSP1 and RSP2 may include a sound output apparatus 195 which is rotatably disposed near a second side of the display apparatus 300. For example, the one or more second speaker apparatuses RSP1 and RSP2 may be one or more right speakers. The one or more second speaker apparatuses RSP1 and RSP2 may rotate the sound output apparatus 195 toward a second listener LM2 near the second region of the display panel 310 in response to the sound data and the screen division mode signal transferred from the display driving circuit 350.

Each of the one or more first speaker apparatuses LSP1 and LSP2 and the one or more second speaker apparatuses RSP1 and RSP2 according to an example embodiment of the present disclosure may include the stand 190 including the rotation shaft which rotatably supports the housing 150 of the sound output apparatus 195, the sensing part 192 which is disposed at the sound output apparatus 195 or the stand 190 and senses one or more of a position and a motion of each of the first and second listeners LM1 and LM2 to generate sensing information, and the motor driver 193 which drives the motor 191 based on the sensing information supplied from the sensing part 192, in response to the screen division mode signal.

According to an example embodiment of the present disclosure, the sound output apparatus 195 may be substantially the same as any one of the sound apparatuses 10, 20, and 30 described above with reference to one or more of FIGS. 1 to 35 or may be substantially the same as the sound apparatus 40 described above with reference to FIG. 35, and thus, like reference numerals may refer to like elements, and their repetitive descriptions may be omitted or will be briefly given below.

According to an example embodiment of the present disclosure, except that each of the stand 190, the motor 191, the sensing part 192, and the motor driver 193 rotates the sound output apparatus 195 in response to the screen division mode signal transferred from the display driving circuit 350 of the display apparatus 300, the stand 190, the motor 191, the sensing part 192, and the motor driver 193 may be substantially the same as the stand 190, the motor 191, the sensing part 192, and the motor driver 193 of the sound apparatus 40 described above with reference to FIG. 35, and thus, like reference numerals may refer to like elements, and their repetitive descriptions may be omitted or will be briefly given below.

With reference to FIG. 38, the sound system according to an example embodiment of the present disclosure may rotate a sound output direction of each of the one or more first speaker apparatuses LSP1 and LSP2 toward the first listener LM1 near the first region DA1 of the display panel 310 and may rotate a sound output direction of each of the one or more second speaker apparatuses RSP1 and RSP2 toward the second listener LM2 near the second region DA2 of the display panel 310, based on a screen division mode of the display apparatus 300 which displays different images on the first region DA1 and the second region DA2 of the display panel 310, thereby providing a sound corresponding to a viewing screen of each of the first and second listeners LM1 and LM2 despite the screen division mode.

In addition, the sound system according to an example embodiment of the present disclosure may automatically adjust the sound output direction of each of the first speaker apparatuses LSP1 and LSP2 and the second speaker apparatuses RSP1 and RSP2 based on a sensing information about one or more of positions and motions of the listeners LM1 and LM2 sensed through the sensing part 192 provided at each of the first speaker apparatuses LSP1 and LSP2 and the second speaker apparatuses RSP1 and RSP2 based on a single screen mode of the display apparatus 300, thereby providing the listeners LM1 and LM2 with a sound optimized for one or more of the positions and motions of the listeners LM1 and LM2.

A sound apparatus according to an example embodiment of the present disclosure may be connected to all electronic devices by wire or wireless and used as a sound apparatus for electronic devices. An apparatus connectable with the sound device according to the present specification may include mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like.

In one or more examples, a vibration member (e.g., 110) may include a plurality of regions (e.g., A1 to A3 as shown in FIG. 12, or A1 to A5 as shown in FIGS. 14, 16, 24, and 25). The plurality of regions may include first to $n^{th}$ regions. In one or more examples, n of the first to $n^{th}$ regions may be a natural number of 3 or more. In one or more examples, $n^{th}$ may be referred to as $n^{rd}$ or the like (e.g., 3rd when n is 3). In one or more examples, n of the first to $n^{th}$ regions may be a natural number of 5 or more. In one or more examples, n of the first to $n^{th}$ regions may be a natural number of 2 or more. In one or more examples, $n^{th}$ may be referred to as $n^{nd}$ or the like (e.g., $2^{nd}$ when n is 2). In one or more examples, a vibration member may include only one region. These are examples, and embodiments of the present disclosure are not limited thereto.

In one or more examples, a vibration apparatus (e.g., 130 or 230) may include a plurality of vibration devices (e.g., 131, 130A to 130B, 231-1 to 231-5, or 131[1] to 131[*n*]). In one or more examples, the plurality of vibration devices may include first to $n^{th}$ vibration devices. In one or more examples, the plurality of vibration devices may include one or more first to $n^{th}$ vibration devices. In one or more examples, n of the first to $n^{th}$ vibration devices may be a natural number of 2 or more. In one or more examples, $n^{th}$ may be referred to as $n^{nd}$, $n^{rd}$, or the like (e.g., $2^{nd}$ or $3^{rd}$ when n is 2 or 3). In one or more examples, a vibration apparatus may include only one vibration device. These are examples, and embodiments of the present disclosure are not limited thereto.

In one or more examples, n of the first to $n^{th}$ regions may be different from n of the first to $n^{th}$ vibration devices. In one or more examples, n of the first to $n^{th}$ regions may be the same as n of the first to $n^{th}$ vibration devices.

In one or more examples, each of the plurality of regions of a vibration member may be associated with corresponding one or more vibration devices. In one or more examples, each of the plurality of regions of a vibration member may correspond to respective one or more vibration devices. In one or more examples, each of the plurality of regions of a vibration member may be connected to corresponding (or respective) one or more vibration devices. The corresponding one or more vibration devices may be part of a vibration apparatus (or a plurality of vibration devices). The respective one or more vibration devices may be part of a vibration apparatus (or a plurality of vibration devices). In one or more examples, each of the plurality of regions of a vibration member may be connected to a different number of vibration device(s).

In one or more examples, each of some regions of the plurality of regions of a vibration member may be connected to corresponding one or more vibration devices, wherein the some regions include one or more regions (but not all regions) of the plurality of regions. In this regard, in one or more examples, at least one of the plurality of regions is not associated with any vibration device. In one or more examples, at least one of the plurality of regions is not connected to any vibration device, and each of the other one or more of the plurality of regions is connected to corresponding one or more vibration devices.

In one or more examples, a phrase "one or more first to $n^{th}$ vibration devices" may refer to one or more first vibration devices to one or more $n^{th}$ vibration devices. In one example, n of the one or more first to $n^{th}$ vibration devices may be a natural number of 2 or more. In one or more examples, a phrase "one or more first to third vibration devices" may refer to one or more first vibration devices, one or more second vibration devices, and one or more third vibration devices. In one or more examples, a phrase "one or more first to third vibration devices 130A, 130B and 130C" may refer to one or more first vibration devices 130A, one or more second vibration devices 130B, and one or more third vibration devices 130C. In one or more examples, each or some of the one or more first to $n^{th}$ vibration devices may be the same or different.

In one or more aspects, the phrase "first to $n^{th}$ regions" uses the variable "n" simply for convenience, and a different variable (e.g., r, s, t) can be used in its place. In one or more aspects, the phrase "first to $n^{th}$ vibration devices" uses the variable "n" simply for convenience, and a different variable (e.g., f, g, h) can be used in its place.

A sound apparatus and a sound system including the same according to example embodiments of the present disclosure will be described below.

A sound apparatus according to an example embodiment of the present disclosure may include a vibration member, a housing configured to cover a rear surface of the vibration member, and a vibration apparatus including one or more vibration devices configured to vibrate the vibration member, the vibration member may include a non-planar structure.

According to some example embodiments of the present disclosure, a front surface opposite to the rear surface of the vibration member may have the non-planar structure.

According to some example embodiments of the present disclosure, the non-planar structure may include a curved structure or a slope structure.

According to some example embodiments of the present disclosure, the vibration member may include any one shape of a circular shape, an oval shape, and a polygonal shape including three or more apexes.

According to some example embodiments of the present disclosure, the vibration member may have the non-planar structure by one or more of one or more concave portions and one or more convex portions.

According to some example embodiments of the present disclosure, the vibration apparatus may include first to $n^{th}$ (where n is a natural number of 2 or more) vibration devices connected to the rear surface of the vibration member, and an interval between the first to $n^{th}$ vibration devices may be 3 mm to 5 mm.

According to some example embodiments of the present disclosure, the interval between the first to $n^{th}$ vibration devices may be an interval between adjacent vibration devices of the first to $n^{th}$ vibration devices.

According to some example embodiments of the present disclosure, with respect to a first direction, an interval between an end of the vibration member and the vibration device located closest to the end may be smaller than a length of one vibration device of the first to $n^{th}$ vibration devices and may be greater than the interval between the adjacent vibration devices of the first to $n^{th}$ vibration devices. The vibration device located closest to the end may be one of the first to $n^{th}$ vibration devices.

According to some example embodiments of the present disclosure, the vibration member may include first to $n^{th}$ regions connected to the first to $n^{th}$ vibration devices (or to each of the first to $n^{th}$ vibration devices), and a sound output from one or more region of the first to $n^{th}$ regions may have a pitched sound band which differs from a pitched sound band of a sound output from the other region of the first to $n^{th}$ regions.

According to some example embodiments of the present disclosure, the vibration member may include first to $n^{th}$ regions connected to the first to $n^{th}$ vibration devices (or to each of the first to $n^{th}$ vibration devices). One or more regions of the first to $n^{th}$ regions may be configured to output a sound having a pitched sound band which differs from a pitched sound band of a sound output from the other one or more regions of the first to $n^{th}$ regions.

According to some example embodiments of the present disclosure, the vibration apparatus may include first to $n^{th}$ (where n is a natural number of 2 or more) vibration devices connected to the rear surface of the vibration member, and the first to $n^{th}$ vibration devices may be disposed at a certain interval along a first direction. With respect to the first direction, an interval between an end of the vibration member and the vibration device located closest to the end may be smaller than a length of one vibration device of the first to $n^{th}$ vibration devices. The vibration device located closest to the end may be one of the first to $n^{th}$ vibration devices.

A sound apparatus according to some example embodiments of the present disclosure may include a housing including an accommodation space, a vibration member configured to cover the accommodation space of the housing, the vibration member including first to $n^{th}$ (where n is a natural number of 3 or more) regions, and a vibration apparatus including one or more first to $n^{th}$ vibration devices configured to vibrate the first to $n^{th}$ regions of the vibration member. The housing may include a space separation portion separating the accommodation space into first to $n^{th}$ spaces respectively corresponding to the first to $n^{th}$ regions.

A sound apparatus according to some example embodiments of the present disclosure may include a housing including an accommodation space, a vibration member configured to cover the accommodation space of the housing, the vibration member including a plurality of regions, and a vibration apparatus including a plurality of vibration devices configured to vibrate the plurality of regions of the vibration member. The housing may include a space separation portion separating the accommodation space into a plurality of spaces. Each of the plurality of spaces may correspond to a respective one of the plurality of regions. The plurality of regions of the vibration member may include three or more regions. The plurality of vibration devices of the vibration apparatus may include three or more vibration devices. The plurality of spaces include three or more spaces.

According to some example embodiments of the present disclosure, each of the plurality of regions may correspond to respective one or more vibration devices of the plurality of vibration devices.

According to some example embodiments of the present disclosure, the plurality of regions may include first to $n^{th}$ regions. In one or more examples, n may be a natural number of three or more.

According to some example embodiments of the present disclosure, the plurality of vibration devices may include one or more first vibration devices to one or more $n^{th}$ vibration devices. In some examples, n of the one or more first vibration devices to one or more $n^{th}$ vibration devices may be a natural number of three or more.

According to some example embodiments of the present disclosure, the plurality of regions may include first to third regions.

According to some example embodiments of the present disclosure, the plurality of spaces may include first, second and third spaces.

According to some example embodiments of the present disclosure, the plurality of vibration devices may include one or more first vibration devices, one or more second vibration devices, and one or more third vibration devices.

According to some example embodiments of the present disclosure, a sound output from one or more region among the first to $n^{th}$ regions of the vibration member may have a pitched sound band which differs from a pitched sound band of a sound output from the other region among the first to $n^{th}$ regions of the vibration member.

According to some example embodiments of the present disclosure, one or more regions of the plurality of regions of the vibration member are configured to output a sound having a pitched sound band which differs from a pitched sound band of a sound output from the other one or more regions of the plurality of regions of the vibration member.

According to some example embodiments of the present disclosure, the vibration member may include first to third regions disposed along a first direction, and the space separation portion may include a first partition wall disposed between the first space and the second space, and a second partition wall disposed between the second space and the third space.

According to some example embodiments of the present disclosure, the housing may include a floor portion covering a rear surface of the vibration member and the vibration apparatus, a first lateral portion connected to a first periphery portion of the floor portion parallel to a first direction, a second lateral portion connected to a second periphery portion of the floor portion parallel to the first periphery portion of the floor portion, a third lateral portion connected to a third periphery portion of the floor portion parallel to a second direction intersecting with the first direction, and a fourth lateral portion connected to a fourth periphery portion of the floor portion parallel to the third periphery portion of the floor portion, and the space separation portion may include a first partition wall connected between the first lateral portion and the second lateral portion to separate the first space and the second space, and a second partition wall connected between the first lateral portion and the second lateral portion to separate the second space and the third space.

According to some example embodiments of the present disclosure, the vibration member may include first to third regions disposed along the first direction, the one or more first vibration devices may be configured to vibrate the first region of the vibration member, the one or more second vibration devices may be configured to vibrate the second region of the vibration member, and the one or more third vibration devices may be configured to vibrate the third region of the vibration member.

According to some example embodiments of the present disclosure, the housing may include a first sound separation portion disposed at the first space between the one or more first vibration devices and the first partition wall, and a second sound separation portion disposed at the third space between the one or more third vibration devices and the second partition wall.

According to some example embodiments of the present disclosure, each of the first and second sound separation portions may include one or more ribs protruding from inner surfaces (or one or more inner surfaces) of one or more among the first lateral portion and the second lateral portion along the second direction, and one or more sound separation members disposed between the one or more ribs and the rear surface of the vibration member.

According to some example embodiments of the present disclosure, each of the first and second sound separation portions may include a plurality of ribs protruding from inner surfaces of one or more among the first lateral portion and the second lateral portion to have different lengths along the second direction, and a plurality of sound separation members. Each of the plurality of sound separation members may be disposed between a respective one of the plurality of ribs and the rear surface of the vibration member.

According to some example embodiments of the present disclosure, a length of each of the plurality of ribs may vary toward the space separation portion.

According to some example embodiments of the present disclosure, a length of each of the plurality of ribs may increase toward the space separation portion.

According to some example embodiments of the present disclosure, the housing may include a first sound limitation portion disposed near the one or more first vibration devices, and a second sound limitation portion disposed near the one or more third vibration devices.

According to some example embodiments of the present disclosure, the first sound limitation portion may include one or more first protrusion portions protruding toward the first space from inner surfaces of one or more among the first partition wall and the first to third lateral portions surrounding the first space, and one or more first sound limitation members disposed between the one or more first protrusion portions and the rear surface of the vibration member, and the first sound limitation portion may include one or more second protrusion portions protruding toward the third space from inner surfaces of one or more among the second partition wall, the first lateral portion, the second lateral portion, and the fourth lateral portion surrounding the third space, and one or more second sound limitation members disposed between the one or more second protrusion portions and the rear surface of the vibration member.

According to some example embodiments of the present disclosure, the one or more first protrusion portions may face inner surfaces of one or more among the first lateral portion and the second lateral portion between the one or more first vibration devices and the first partition wall, and the one or more second protrusion portions may face inner surfaces of one or more among the first lateral portion and the second lateral portion between the one or more third vibration devices and the second partition wall.

According to some example embodiments of the present disclosure, the one or more first protrusion portions may face a center portion of the one or more first vibration devices from inner surfaces of one or more among the first partition wall and the third lateral portion, and the one or more second protrusion portions may face a center portion of the one or more third vibration devices from inner surfaces of one or more among the second partition wall and the fourth lateral portion.

According to some example embodiments of the present disclosure, a space, where the one or more first protrusion portions at the third lateral portion and the one or more second protrusion portions at the fourth lateral portion are provided, may output a frequency of a high-pitched sound band.

According to some example embodiments of the present disclosure, a space, where the one or more first protrusion portions and the one or more second protrusion portions at the first lateral portion and the second lateral portion are provided, may output a frequency of a low-pitched sound band.

According to some example embodiments of the present disclosure, the first region of the vibration member may include a first periphery region of the vibration member, and the $n^{th}$ region of the vibration member may include a second periphery region of the vibration member, and a pitched sound band of a sound output from each of the first to $n^{th}$ regions of the vibration member may increase toward the first region and the $n^{th}$ region from a center region of the vibration member.

According to some example embodiments of the present disclosure, the first region of the vibration member may include a first periphery region of the vibration member, and the $n^{th}$ region of the vibration member include a second periphery region of the vibration member, and a size of each of the one or more first to $n^{th}$ vibration may decrease toward the first region and the $n^{th}$ region from a center region of the vibration member.

According to some example embodiments of the present disclosure, the one or more first vibration devices may vibrate the first region to generate an ultrasound wave, the one or more $n^{th}$ vibration devices may vibrate the $n^{th}$ region to generate a plurality of ultrasound waves having different frequencies, and at least one of the plurality of ultrasound waves output from the $n^{th}$ region may have the same frequency as the ultrasound wave output from the first region, and each of the other of the plurality of ultrasound waves output from the $n^{th}$ region may have a frequency which is higher than the frequency of the ultrasound wave output from the first region.

According to some example embodiments of the present disclosure, the one or more first vibration devices disposed at the first region may be configured to transmit and receive an ultrasound wave, and the one or more $n^{th}$ vibration devices disposed at the $n^{th}$ region may be configured to transmit and receive an ultrasound wave.

According to some example embodiments of the present disclosure, the sound apparatus may further include a stand including a rotation shaft configured to rotatably support the housing, a motor disposed at the stand to rotate the rotation shaft, a sensing part disposed at the housing or the stand to sense one or more of a position and a motion of a listener to generate sensing information, and a motor driver configured to drive the motor based on the sensing information supplied from the sensing part.

According to some example embodiments of the present disclosure, the sensing part may include an ultrasound sensor configured to transmit and receive an ultrasound wave, and a sensing circuit configured to generate the sensing information based on the ultrasound wave received from the ultrasound sensor.

According to some example embodiments of the present disclosure, the sound apparatus may further include a first connection member and a second connection member disposed in parallel between the vibration member and the housing. The first connection member may have a first hardness, and the second connection member may have a second hardness different from the first hardness.

According to some example embodiments of the present disclosure, the first connection member may be surrounded by the second connection member. The first hardness of the first connection member may be less than the second hardness of the second connection member.

According to some example embodiments of the present disclosure, the first connection member may be surrounded by the second connection member. The first hardness of the first connection member may be greater than the second hardness of the second connection member.

According to some example embodiments of the present disclosure, the vibration device may include a piezoelectric vibration portion including a plurality of piezoelectric portions and a ductile portion connected between the plurality of piezoelectric portions, a first electrode portion at a first surface of the piezoelectric vibration portion, and a second electrode portion at a second surface opposite to the first surface of the piezoelectric vibration portion.

According to some example embodiments of the present disclosure, the vibration device may include two or more vibration generating portions arranged along one or more directions of a first direction and a second direction intersecting with the first direction, and each of the two or more vibration generating portions may include a piezoelectric vibration portion including a plurality of piezoelectric portions and a ductile portion connected between the plurality of piezoelectric portions, a first electrode portion at a first surface of the piezoelectric vibration portion, and a second electrode portion at a second surface opposite to the first surface of the piezoelectric vibration portion.

According to some example embodiments of the present disclosure, the vibration device may include one or more signal cables electrically connected to each of the first electrode portion and the second electrode portion, and a signal generating circuit mounted on the one or more signal cables.

According to some example embodiments of the present disclosure, the vibration device may further include a first cover member covering the first electrode portion, and a second cover member covering the second electrode portion, and the one or more signal cables may include a first protrusion line disposed between the first cover member and the first electrode portion and electrically connected to the first electrode portion, and a second protrusion line disposed between the second cover member and the second electrode portion and electrically connected to the second electrode portion.

According to some example embodiments of the present disclosure, a portion of each of the one or more signal cables may be accommodated between the first cover member and the second cover member.

According to some example embodiments of the present disclosure, the vibration member may include one or more materials of metal, plastic, fiber, leather, wood, cloth, paper, and glass.

According to some example embodiments of the present disclosure, the vibration member may include any one of a display panel including pixels configured to display an image, a screen panel on which an image is to be projected from a display apparatus, a lighting panel, a signage panel, a glass, and a mirror.

A sound system according to some example embodiments of the present disclosure may include a display apparatus configured to display an image, one or more first speaker apparatuses rotatably disposed near a first side of the display apparatus, each of the one or more first speaker apparatuses including a first sound output apparatus, and one or more second speaker apparatuses rotatably disposed near a second side of the display apparatus, each of the one or more second speaker apparatuses including a second sound output apparatus, the display apparatus may include a display panel and a display driving circuit configured to display different images at first and second regions of the display panel and configured to provide a screen division mode signal to each of the one or more first speaker apparatuses and the one or more second speaker apparatuses. The one or more first speaker apparatuses may rotate the first sound output apparatus toward a first listener near the first region of the display panel in response to the screen division mode signal, and the one or more second speaker apparatuses may rotate the second sound output apparatus toward a second listener near the second region of the display panel in response to the screen division mode signal.

According to some example embodiments of the present disclosure, each of the one or more first speaker apparatuses and the one or more second speaker apparatuses may include a stand including a rotation shaft configured to rotatably support the sound output apparatus, a motor disposed at the stand to rotate the rotation shaft, a sensing part disposed at the sound output apparatus or the stand to sense one or more of a position and a motion of a corresponding listener to generate sensing information, and a motor driver configured to drive the motor based on the sensing information supplied from the sensing part in response to the screen division mode signal.

According to some example embodiments of the present disclosure, the sensing part may include an ultrasound sensor configured to transmit and receive an ultrasound wave, and a sensing circuit configured to generate the sensing information based on the ultrasound wave received from the ultrasound sensor.

According to some example embodiments of the present disclosure, each of the first and second sound output apparatuses may include the sound apparatus, the rotation shaft may rotatably supports a housing of the sound output apparatus, and the sensing part may be disposed at the housing or the stand. The sound apparatus may include a vibration member, a housing configured to cover a rear surface of the vibration member, and a vibration apparatus including one or more vibration devices configured to vibrate the vibration member, the vibration member may include a non-planar structure.

According to some example embodiments of the present disclosure, the sound output apparatus may include the sound apparatus, the rotation shaft may rotatably support a housing of the sound output apparatus, and the sensing part may be disposed at the housing or the stand, the sound apparatus may include a housing including an accommodation space, a vibration member configured to cover the accommodation space of the housing, the vibration member including first to $n^{th}$ (where n is a natural number of 3 or more) regions, and a vibration apparatus including one or more first to $n^{th}$ vibration devices configured to vibrate each of the first to $n^{th}$ regions of the vibration member, the housing may include a space separation portion separating the accommodation space into first to $n^{th}$ spaces respectively corresponding to the first to $n^{th}$ regions.

It will be apparent to those skilled in the art that various modifications and variations can be made in the present disclosure without departing from the spirit or scope of the present disclosure. Thus, it is intended that the present disclosure covers the modifications and variations of this disclosure provided they come within the scope of the appended claims and their equivalents.

What is claimed is:

1. A sound apparatus, comprising:

a vibration member;

a housing configured to cover a rear surface of the vibration member;

a vibration apparatus including one or more vibration devices configured to vibrate the vibration member; and a first connection member and a second connection member disposed in parallel between the vibration member and the housing, wherein the vibration member includes a non-planar structure, and wherein the first connection member has a first hardness, and the second connection member has a second hardness different from the first hardness.

2. The sound apparatus of claim 1, wherein a front surface opposite to the rear surface of the vibration member has the non-planar structure.

3. The sound apparatus of claim 2, wherein the non-planar structure comprises a curved structure or a slope structure.

4. The sound apparatus of claim 1, wherein the vibration member includes any one shape of a circular shape, an oval shape, and a polygonal shape including three or more apexes.

5. The sound apparatus of claim 1, wherein the vibration member has the non-planar structure by one or more of one or more concave portions and one or more convex portions.

6. The sound apparatus of claim 1, wherein:

the vibration apparatus comprises first to $n^{th}$ vibration devices connected to the rear surface of the vibration member, wherein n of the first to $n^{th}$ vibration devices is a natural number of 2 or more; and an interval between the first to $n^{th}$ vibration devices is 3 mm to 5 mm.

7. The sound apparatus of claim 6, wherein:

the interval between the first to $n^{th}$ vibration devices is an interval between adjacent vibration devices of the first to $n^{th}$ vibration devices;

with respect to a first direction, an interval between an end of the vibration member and the vibration device located closest to the end is smaller than a length of one vibration device of the first to $n^{th}$ vibration devices and is greater than the interval between the adjacent vibration devices of the first to $n^{th}$ vibration devices; and the vibration device located closest to the end is one of the first to $n^{th}$ vibration devices.

8. The sound apparatus of claim 6, wherein:

the vibration member comprises first to $n^{th}$ regions connected to the first to $n^{th}$ vibration devices, wherein n of the first to $n^{th}$ regions is a natural number; and one or more regions of the first to $n^{th}$ regions are configured to output a sound having a pitched sound band which differs from a pitched sound band of a sound output from the other one or more regions of the first to $n^{th}$ regions.

9. The sound apparatus of claim 1, wherein:

the vibration apparatus comprises first to $n^{th}$ vibration devices connected to the rear surface of the vibration member, wherein n of the first to $n^{th}$ vibration devices is a natural number of 2 or more;

the first to $n^{th}$ vibration devices are disposed at a certain interval along a first direction;

with respect to the first direction, an interval between an end of the vibration member and the vibration device located closest to the end is smaller than a length of one vibration device of the first to $n^{th}$ vibration devices; and the vibration device located closest to the end is one of the first to $n^{th}$ vibration devices.

10. A sound apparatus, comprising:

a housing including an accommodation space;

a vibration member configured to cover the accommodation space of the housing, the vibration member including a plurality of regions; and a vibration apparatus including a plurality of vibration devices configured to vibrate the plurality of regions of the vibration member, wherein:

the housing comprises a space separation portion separating the accommodation space into a plurality of spaces;

each of the plurality of spaces corresponds to a respective one of the plurality of regions;

the plurality of regions of the vibration member include three or more regions;

the plurality of vibration devices of the vibration apparatus include three or more vibration devices;

the plurality of spaces include three or more spaces;

the plurality of regions comprise first to $n^{th}$ regions, wherein n is a natural number of three or more;

the first region of the vibration member includes a first periphery region of the vibration member, and the $n^{th}$ region of the vibration member includes a second periphery region of the vibration member; and a size of each of the one or more first to $n^{th}$ vibration decreases toward the first region and the $n^{th}$ region from a center region of the vibration member.

11. The sound apparatus of claim 10, wherein one or more regions of the plurality of regions of the vibration member are configured to output a sound having a pitched sound band which differs from a pitched sound band of a sound output from the other one or more regions of the plurality of regions of the vibration member.

12. The sound apparatus of claim 10, wherein the plurality of regions comprise first to third regions, wherein the plurality of spaces comprise first, second and third spaces, wherein the first to third regions are disposed along a first direction, and wherein the space separation portion comprises:

a first partition wall disposed between the first space and the second space; and a second partition wall disposed between the second space and the third space.

13. The sound apparatus of claim 10, wherein the plurality of spaces comprise first, second and third spaces, wherein the housing comprises:

a floor portion covering a rear surface of the vibration member and the vibration apparatus;

a first lateral portion connected to a first periphery portion of the floor portion parallel to a first direction;

a second lateral portion connected to a second periphery portion of the floor portion parallel to the first periphery portion of the floor portion;

a third lateral portion connected to a third periphery portion of the floor portion parallel to a second direction intersecting with the first direction; and a fourth lateral portion connected to a fourth periphery portion of the floor portion parallel to the third periphery portion of the floor portion, and wherein the space separation portion comprises:

a first partition wall connected between the first lateral portion and the second lateral portion to separate the first space and the second space; and a second partition wall connected between the first lateral portion and the second lateral portion to separate the second space and the third space.

14. The sound apparatus of claim 13, wherein:

the plurality of regions comprise first to third regions;

the plurality of vibration devices comprise one or more first vibration devices, one or more second vibration devices, and one or more third vibration devices;

the first to third regions are disposed along the first direction;

the one or more first vibration devices are configured to vibrate the first region of the vibration member;

the one or more second vibration devices are configured to vibrate the second region of the vibration member; and the one or more third vibration devices are configured to vibrate the third region of the vibration member.

15. The sound apparatus of claim 14, wherein the housing comprises:

a first sound separation portion disposed at the first space between the one or more first vibration devices and the first partition wall; and a second sound separation portion disposed at the third space between the one or more third vibration devices and the second partition wall.

16. The sound apparatus of claim 15, wherein each of the first and second sound separation portions comprises:

one or more ribs protruding from one or more inner surfaces of one or more among the first lateral portion and the second lateral portion along the second direction; and one or more sound separation members disposed between the one or more ribs and the rear surface of the vibration member.

17. The sound apparatus of claim 15, wherein each of the first and second sound separation portions comprises:

a plurality of ribs protruding from inner surfaces of one or more among the first lateral portion and the second lateral portion to have different lengths along the second direction; and a plurality of sound separation members, and wherein each of the plurality of sound separation members is disposed between a respective one of the plurality of ribs and the rear surface of the vibration member.

18. The sound apparatus of claim 17, wherein a length of each of the plurality of ribs varies toward the space separation portion.

19. The sound apparatus of claim 17, wherein a length of each of the plurality of ribs increases toward the space separation portion.

20. The sound apparatus of claim 14, wherein the housing comprises:

a first sound limitation portion disposed near the one or more first vibration devices; and a second sound limitation portion disposed near the one or more third vibration devices.

21. The sound apparatus of claim 20, wherein the first sound limitation portion comprises:

one or more first protrusion portions protruding toward the first space from inner surfaces of one or more among the first partition wall and the first to third lateral portions surrounding the first space; and one or more first sound limitation members disposed between the one or more first protrusion portions and the rear surface of the vibration member, and wherein the first sound limitation portion comprises:

one or more second protrusion portions protruding toward the third space from inner surfaces of one or more among the second partition wall, the first lateral portion, the second lateral portion, and the fourth lateral portion surrounding the third space; and one or more second sound limitation members disposed between the one or more second protrusion portions and the rear surface of the vibration member.

22. The sound apparatus of claim 21, wherein the one or more first protrusion portions face inner surfaces of one or more among the first lateral portion and the second lateral portion between the one or more first vibration devices and the first partition wall, and wherein the one or more second protrusion portions face inner surfaces of one or more among the first lateral portion and the second lateral portion between the one or more third vibration devices and the second partition wall.

23. The sound apparatus of claim 21, wherein the one or more first protrusion portions face a center portion of the one or more first vibration devices from inner surfaces of one or more among the first partition wall and the third lateral portion, and wherein the one or more second protrusion portions face a center portion of the one or more third vibration devices from inner surfaces of one or more among the second partition wall and the fourth lateral portion.

24. The sound apparatus of claim 21, wherein a space, where the one or more first protrusion portions at the third lateral portion and the one or more second protrusion portions at the fourth lateral portion are provided, is configured to output a frequency of a high-pitched sound band.

25. The sound apparatus of claim 21, wherein a space, where the one or more first protrusion portions and the one or more second protrusion portions at the first lateral portion and the second lateral portion are provided, is configured to output a frequency of a low-pitched sound band.

26. The sound apparatus of claim 10, wherein:

the plurality of regions comprise first to $n^{th}$ regions, wherein n is a natural number of three or more;

the first region of the vibration member includes a first periphery region of the vibration member, and the $n^{th}$ region of the vibration member includes a second periphery region of the vibration member; and each of the first to $n^{th}$ regions of the vibration member is configured to output a sound having a pitched sound band, and the pitched sound band of the sound output from each of the first to $n^{th}$ regions of the vibration member increases toward the first region and the $n^{th}$ region from a center region of the vibration member.

27. The sound apparatus of claim 10, wherein:

the plurality of regions comprise first to $n^{th}$ regions, wherein n of the first to $n^{th}$ regions is a natural number of three or more;

the plurality of vibration devices comprise one or more first vibration devices to one or more $n^{th}$ vibration devices, wherein n of the one or more first vibration devices to one or more $n^{th}$ vibration devices is a natural number of three or more;

the one or more first vibration devices are configured to vibrate the first region to generate an ultrasound wave;

the one or more $n^{th}$ vibration devices are configured to vibrate the $n^{th}$ region to generate a plurality of ultrasound waves having different frequencies; and the $n^{th}$ region is configured to output at least one of the plurality of ultrasound waves, the at least one of the plurality of ultrasound waves output from the $n^{th}$ region has the same frequency as the ultrasound wave output from the first region, and each of the other of the plurality of ultrasound waves output from the $n^{th}$ region has a frequency which is higher than the frequency of the ultrasound wave output from the first region.

28. The sound apparatus of claim 10, wherein:

the plurality of regions comprise first to $n^{th}$ regions, wherein n of the first to $n^{th}$ regions is a natural number of three or more;

the plurality of vibration devices comprise one or more first vibration devices to one or more $n^{th}$ vibration devices, wherein n of the one or more first vibration devices to one or more $n^{th}$ vibration devices is a natural number of three or more;

the one or more first vibration devices disposed at the first region are configured to transmit and receive an ultrasound wave; and the one or more $n^{th}$ vibration devices disposed at the $n^{th}$ region are configured to transmit and receive an ultrasound wave.

29. The sound apparatus of claim 10, further comprising:

a stand including a rotation shaft configured to rotatably support the housing;

a motor disposed at the stand to rotate the rotation shaft;

a sensing part disposed at the housing or the stand to sense one or more of a position and a motion of a listener to generate sensing information; and a motor driver configured to drive the motor based on the sensing information supplied from the sensing part.

30. The sound apparatus of claim 29, wherein the sensing part comprises:

an ultrasound sensor configured to transmit and receive an ultrasound wave; and a sensing circuit configured to generate the sensing information based on the ultrasound wave received from the ultrasound sensor.

31. The sound apparatus of claim 1, wherein:

the first connection member is surrounded by the second connection member; and the first hardness of the first connection member is less than the second hardness of the second connection member.

32. The sound apparatus of claim 1, wherein:

the first connection member is surrounded by the second connection member; and the first hardness of the first connection member is greater than the second hardness of the second connection member.

33. The sound apparatus of claim 1, wherein the vibration device of the one or more vibration devices comprises:

a piezoelectric vibration portion including a plurality of piezoelectric portions and a ductile portion connected between the plurality of piezoelectric portions;

a first electrode portion at a first surface of the piezoelectric vibration portion; and a second electrode portion at a second surface opposite to the first surface of the piezoelectric vibration portion.

34. The sound apparatus of claim 1, wherein the vibration device of the one or more vibration devices comprises two or more vibration generating portions arranged along one or more directions of a first direction and a second direction intersecting with the first direction, and wherein each of the two or more vibration generating portions comprises:

a piezoelectric vibration portion including a plurality of piezoelectric portions and a ductile portion connected between the plurality of piezoelectric portions;

a first electrode portion at a first surface of the piezoelectric vibration portion; and a second electrode portion at a second surface opposite to the first surface of the piezoelectric vibration portion.

35. The sound apparatus of claim 34, wherein the vibration device comprises:

one or more signal cables electrically connected to each of the first electrode portion and the second electrode portion; and a signal generating circuit mounted on the one or more signal cables.

36. The sound apparatus of claim 35, wherein the vibration device further comprises:

a first cover member covering the first electrode portion; and a second cover member covering the second electrode portion, and wherein the one or more signal cables comprises:

a first protrusion line disposed between the first cover member and the first electrode portion and electrically connected to the first electrode portion; and a second protrusion line disposed between the second cover member and the second electrode portion and electrically connected to the second electrode portion.

37. The sound apparatus of claim 36, wherein a portion of each of the one or more signal cables is accommodated between the first cover member and the second cover member.

38. The sound apparatus of claim 1, wherein the vibration device of the one or more vibration devices comprises one or more materials of metal, plastic, fiber, leather, wood, cloth, paper, and glass.

39. The sound apparatus of claim 1, wherein the vibration member comprises any one of a display panel including pixels configured to display an image, a screen panel on which an image is to be projected from a display apparatus, a lighting panel, a signage panel, a glass, and a mirror.

40. A sound system, comprising:

a display apparatus configured to display an image;

one or more first speaker apparatuses rotatably disposed near a first side of the display apparatus, each of the one or more first speaker apparatuses including a first sound output apparatus; and one or more second speaker apparatuses rotatably disposed near a second side of the display apparatus, each of the one or more second speaker apparatuses including a second sound output apparatus, wherein the display apparatus comprises a display panel and a display driving circuit configured to display different images at first and second regions of the display panel and configured to provide a screen division mode signal to each of the one or more first speaker apparatuses and the one or more second speaker apparatuses, wherein the one or more first speaker apparatuses are configured to rotate the first sound output apparatus toward a first listener near the first region of the display panel in response to the screen division mode signal, and wherein the one or more second speaker apparatuses are configured to rotate the second sound output apparatus toward a second listener near the second region of the display panel in response to the screen division mode signal.

41. The sound system of claim 40, wherein each of the one or more first speaker apparatuses and the one or more second speaker apparatuses comprises:

a stand including a rotation shaft configured to rotatably support the respective sound output apparatus;

a motor disposed at the stand to rotate the rotation shaft;

a sensing part disposed at the respective sound output apparatus or the stand to sense one or more of a position and a motion of a corresponding listener to generate sensing information; and a motor driver configured to drive the motor based on the sensing information supplied from the sensing part in response to the screen division mode signal.

42. The sound system of claim 41, wherein the sensing part comprises:

an ultrasound sensor configured to transmit and receive an ultrasound wave; and a sensing circuit configured to generate the sensing information based on the ultrasound wave received from the ultrasound sensor.

43. The sound system of claim 41, wherein each of the first and second sound output apparatuses comprises a sound apparatus, the sound apparatus comprising:

a vibration member;

a housing configured to cover a rear surface of the vibration member; and a vibration apparatus including one or more vibration devices configured to vibrate the vibration member, wherein the vibration member includes a non-planar structure, wherein the rotation shaft is configured to rotatably support the housing of the respective sound output apparatus, and wherein the sensing part is disposed at the housing of the respective sound output apparatus or at the stand.

* * * * *